(12) United States Patent
Suzuki et al.

(10) Patent No.: US 6,262,752 B1
(45) Date of Patent: *Jul. 17, 2001

(54) IMAGE RECORDING OR READING APPARATUS WITH U-SHAPED ARRANGEMENTS OF FEED MECHANISM AND A PLURALITY OF SHEET STORAGE UNITS

(75) Inventors: Kenichi Suzuki, Isehara; Keiji Ohkoda, Yokohama; Tomohiro Kudo, Tama; Kazuhiro Matsumoto, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/622,184

(22) Filed: Mar. 25, 1996

Related U.S. Application Data

(63) Continuation of application No. 08/270,658, filed on Jul. 5, 1994, now abandoned.

(30) Foreign Application Priority Data

| Jul. 8, 1993 | (JP) | .................................................... 5-169197 |
| Sep. 24, 1993 | (JP) | .................................................... 5-238019 |
| Nov. 26, 1993 | (JP) | .................................................... 5-296836 |

(51) Int. Cl.⁷ .......................... G01D 15/24; G01D 15/26; G01D 15/34; B41J 2/47
(52) U.S. Cl. ............................................ 346/134; 347/260
(58) Field of Search .................................... 347/264, 262, 347/139, 260, 261, 259; 271/3, 3.01–3.13, 3.1; 346/134; 399/151, 211

(56) References Cited

U.S. PATENT DOCUMENTS

| 3,897,053 | * | 7/1975 | Guy . |
| 4,013,284 | * | 3/1977 | Demetre . |
| 4,367,948 | | 1/1983 | Suzuki . |
| 4,597,516 | * | 7/1986 | Mayhall, Jr. et al. . |
| 4,918,466 | * | 4/1990 | Takahashi et al. . |
| 4,969,048 | * | 11/1990 | Hoshino . |
| 4,999,673 | * | 3/1991 | Bares . |
| 5,151,713 | * | 9/1992 | Kawasaki et al. . |
| 5,210,616 | | 5/1993 | Kawasaki et al. . |

FOREIGN PATENT DOCUMENTS

| 61-136371 | 6/1986 | (JP) . |
| 61-60624 | 12/1986 | (JP) . |
| 63-175570 | 7/1988 | (JP) . |

* cited by examiner

*Primary Examiner*—John Barlow
*Assistant Examiner*—Raquel Yvette Gordon
(74) *Attorney, Agent, or Firm*—Fitzpatrick, Cella, Harper & Scinto

(57) ABSTRACT

An image recording or reading apparatus is disclosed. The apparatus is provided with a non-processed sheet storage portion, a processed sheet storage portion arranged to be parallel to the non-processed sheet storage portion, a sheet processing unit for performing recording processing or reading processing of recorded information for a sheet, the sheet processing unit having an optical unit for executing optical scanning for reading or reading in a main scanning direction of the sheet, and being arranged vertically and in parallel between the non-processed and processed sheet storage portion, and a sheet feed mechanism for feeding a non-processed sheet from the non-processed sheet storage portion to the sheet processing unit, and feeding a processed sheet from the sheet processing unit to the processed sheet storage portion. The sheet processing unit executes processing on a sheet which is being picked up from the non-processed sheet storage portion by the sheet feed mechanism or on a sheet which is being stored in the processed sheet storage portion.

16 Claims, 39 Drawing Sheets

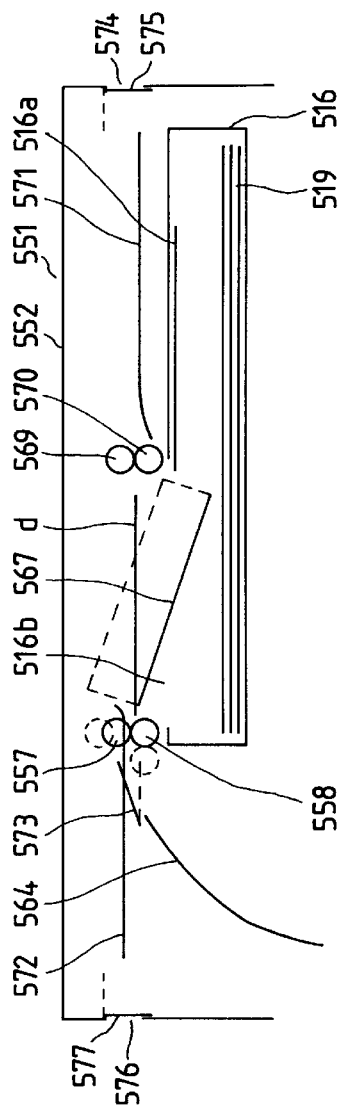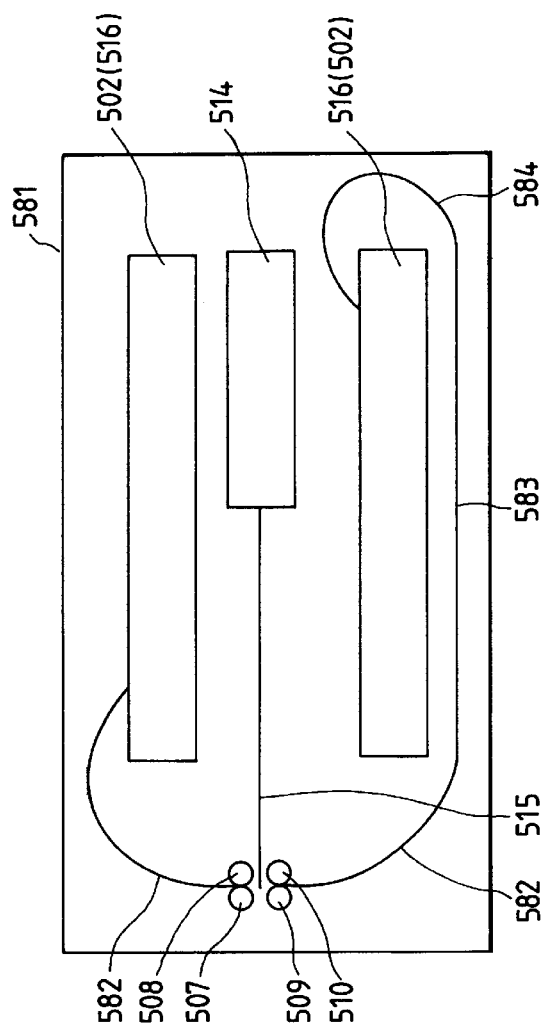
FIG. 45
FIG. 46

IMAGE RECORDING OR READING APPARATUS WITH U-SHAPED ARRANGEMENTS OF FEED MECHANISM AND A PLURALITY OF SHEET STORAGE UNITS

This application is a continuation of application Ser. No. 08/270,658, filed Jul. 5, 1994, now abandoned.

BACKGROUND OF THE INVENTION

1. Field of the Invention

The present invention relates to a recording or reading apparatus. The present invention is suitable for the arrangement of an image recording apparatus for recording an image on, e.g., a sheet film, or an image reading apparatus for reading an image on a sheet film.

2. Related Background Art

As a conventional image recording apparatus for recording an image on a sheet film or an image reading apparatus for reading an image on a sheet film, various apparatuses are known. FIGS. 1 and 2 are views showing the prior art of an image recording apparatus described in U.S. Pat. No. 5,151,713. Referring to FIGS. 1 and 2, a supply magazine 103 stores a large number of stacked unused sheet films, and its lid 103a can be opened inside the apparatus. A suction disk 105 enters the supply magazine 103 from the opening portion, and picks up, by suction, the stacked films one by one. The sucking disk 105 can insert the picked-up film to a position between a feed roller 107 and a planetary roller 108 located at a position b. The rollers 107 and 108 which clamp the film therebetween are integrally rotated clockwise to have the rotation shaft of the roller 107 as the center, and when the roller 108 reaches a position a, the planetary rotation of the roller 108 is stopped. The shaft of the roller 108 is fixed at this position, and the roller 107 is further rotated clockwise, thereby feeding the film in an obliquely upward direction along a guide plate 121. When the leading end of the film is clamped between a feed roller 112 and a planetary roller 113, which have been rotating in advance, the lower planetary roller 108 is retracted to a position c to release the film. The rollers 112 and 113 are integrally rotated clockwise to have the rotation shaft of the roller 112 as the center, and when the roller 113 reaches a position e, the planetary rotation of the roller 113 is stopped. The shaft of the roller 113 is fixed at this position, and the roller 112 is further rotated clockwise, thereby feeding the film until the trailing end of the film comes out from the supply magazine 103. Thereafter, the roller 112 is rotated in the reverse direction to return the film to a position where the leading end of the film does not shield a light beam L.

If a recording operation is performed without executing the reverse feeding operation while the film is present in the supply magazine, the film initially has a shape indicated by m in FIG. 2. However, when the trailing end of the film leaves a roller 118, it immediately leaps to a position indicated by n. When the recording operation is performed in this state, scanning pitch nonuniformity is generated, thus deteriorating image quality. For this reason, the above-mentioned reverse feeding operation is performed.

Thereafter, the feed roller 112 is rotated clockwise again. When the leading end of the film is clamped between a pair of sub-scanning rollers 102, the rotation of the roller 112 is stopped, and the planetary roller is retracted to a position f. A roller 138 whose shaft position is fixed is used for regulating the position of the film. Thereafter, the film is fed to the right in FIG. 1 by the sub-scanning rollers 102, and the recording operation is performed by deflecting and radiating the light beam L radiated from an optical unit 101 in a direction substantially perpendicular to the feed direction. After the recording operation, the rollers 102 are rotated in the reverse direction until the film end is clamped between the rollers 113 and 112 at the position e. Then, the rollers 113 and 112 are integrally rotated counterclockwise, and when the roller 113 reaches a position g, the planetary rotation of the roller 113 is stopped. The roller 112 is further rotated counterclockwise, and is stopped after the film is fed into a receive magazine 104. When a lid 104a is closed inside the apparatus, the interior of the receive magazine is kept shielded from light. Thus, the receive magazine including the films can be unloaded from the apparatus, and can be conveyed to a developing machine.

FIG. 3 shows the prior art of a radiation image information reading apparatus described in Japanese Laid-Open Patent Application No. 63-175570. Referring to FIG. 3, a sheet supply magazine 152 stores a plurality of stacked phosphorescent sheets 151 on each of which radiation image information is recorded. A sheet pickup means 153 such as a suction disk picks up the sheets one by one, and transfers the picked-up sheet to sub-scanning rollers 154 and 155. A roller 157 is rotated by a motor (not shown), and can transmit its driving force to the roller 155 via a belt or chain 158. The roller 154 and a roller 156 can respectively bias or be retracted from the rollers 155 and 157 by rotary solenoids (not shown). In addition, a guide plate 159 is arranged. The sheet 151 is scanned with excitation light 162 deflected and radiated by a main scanning means 161 while it is fed to the left in FIG. 3 by the rollers 154, 155, 156, and 157. Stimulated emission is generated from a portion irradiated with the excitation light, and is detected by a photodetection means 160. The fed sheet is stored in a sheet storage magazine 163.

FIG. 4 shows the prior art of an original reading apparatus described in Japanese Patent Publication No. 61-60624. Referring to FIG. 4, non-processed originals 181 are stacked on a hopper 182 which is slightly inclined from the vertical direction. A negative pressure chamber 183 presses the lowermost one of the originals 181 against a paper feed roller 184. When the paper feed roller 184 and an auxiliary paper feed roller 185 are rotated clockwise in FIG. 4, an original 181 is fed to a send roller 186 and a separation roller 187. The original 181 which has passed between these rollers is conveyed between original guide plates 193 and 194 by a constant-speed feed roller 188, a counter roller 189, a back roller 190, an exhaust roller 191, and a pinch roller 192, and is exhausted and stacked onto a stacker 195. An illumination device 196 illuminates an original via an exposure opening portion 199. Light reflected by the original is received by a reading element 198 via an imaging lens 197.

The prior art shown in FIG. 1 has the above-mentioned effect. However, after the entire sheet film is completely fed from the supply magazine and is fed in the reverse direction, scanning is performed, and the sheet film is reversed again to be returned to the receive magazine upon completion of an operation. For this reason, a space for repetitively returning the sheet film is required. Also, the operation time is prolonged, and it is disadvantageous to improve the throughput.

In the prior art shown in FIG. 3, since an almost linear feed path is adopted, the floor area corresponding to at least two magazines is required, and the apparatus becomes larger than the prior art shown in FIG. 1.

In the prior art shown in FIG. 4, in order to pick up the lowermost sheet from the supply magazine, gravity is utilized. For this reason, the hopper must be inclined, and the size of the apparatus increases accordingly. Since the lowermost sheet is picked up from the supply magazine, the frictional resistance upon picking up of the sheet is large, and causes recording/reading pitch nonuniformity.

SUMMARY OF THE INVENTION

The present invention has been made in consideration of the above-mentioned prior arts, and has as its first object to provide a recording or reading apparatus which can greatly reduce the apparatus size by integrating the arrangement of magazines and the feed path.

Other objects of the present invention will become apparent from the following description of the embodiments.

BRIEF DESCRIPTION OF THE DRAWINGS

FIG. 45 is a partial detailed view for explaining another modification of the eighth embodiment;

FIG. 46 is an explanatory view of the ninth embodiment of the present invention;

DETAILED DESCRIPTION OF THE PREFERRED EMBODIMENTS

Figure 5:
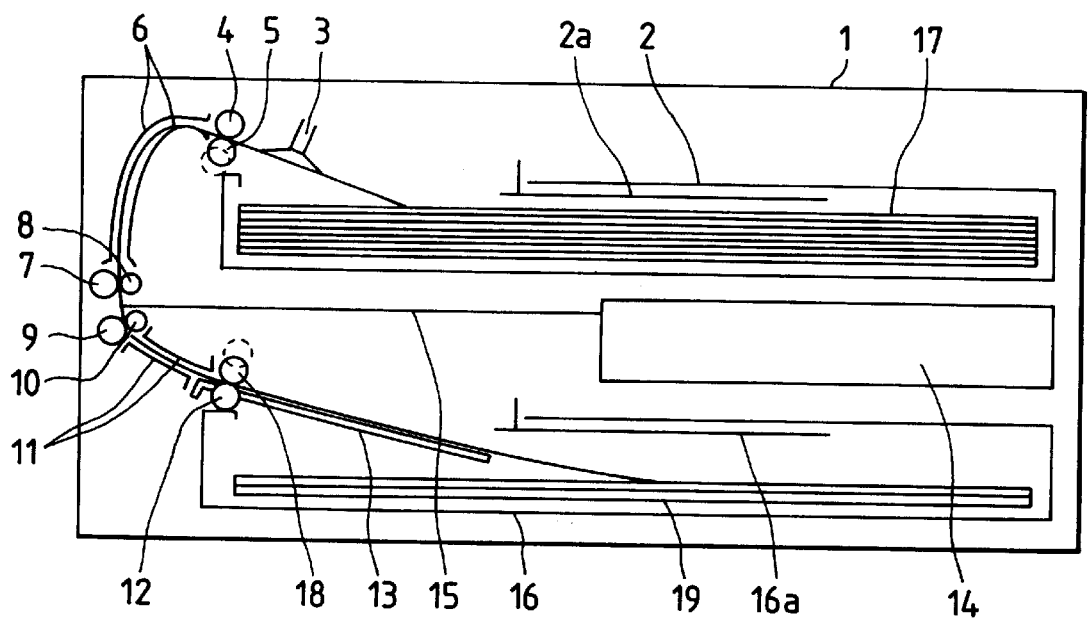
FIG. 5 is a schematic sectional view showing the arrangement of an information recording apparatus according to the first embodiment of the present invention.
Figure 6A:
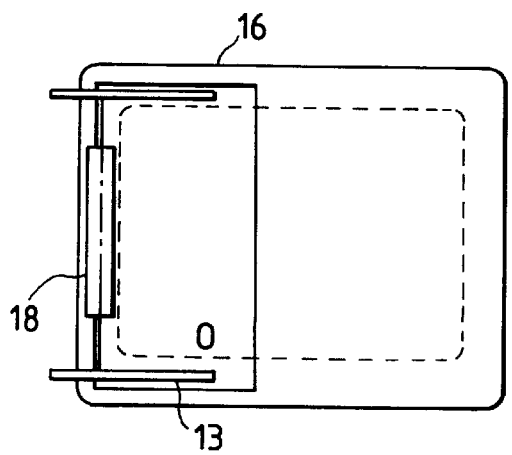
FIGS. 6A and 6B are explanatory views of the operation of a sheet guide of the apparatus of the first embodiment.
Figure 6B:
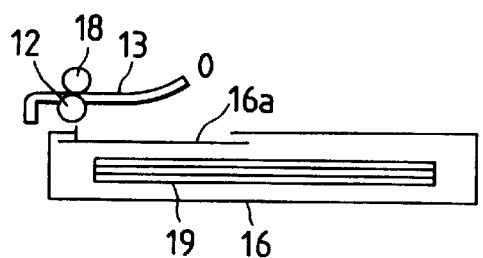
Figure 7A:
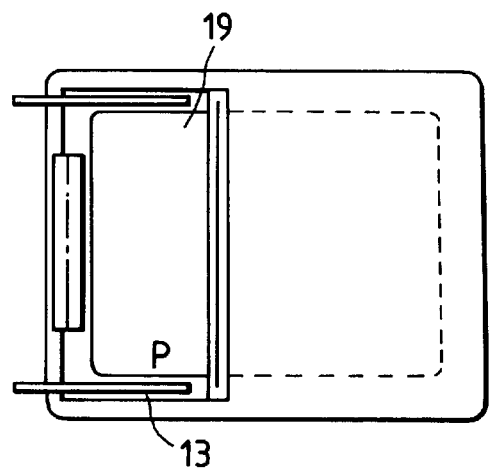
FIGS. 7A and 7B are explanatory views of the operation of the sheet guide of the apparatus of the first embodiment.
Figure 7B:
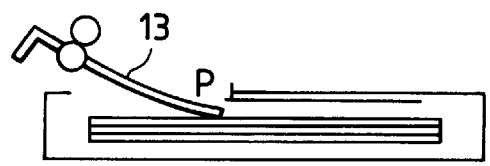
Figure 8A:
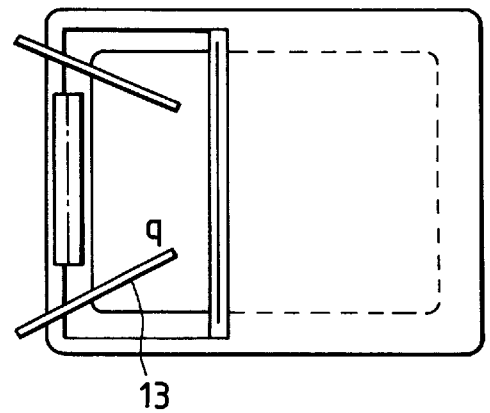
FIGS. 8A and 8B are explanatory views of the operation of the sheet guide of the apparatus of the first embodiment.
Figure 8B:
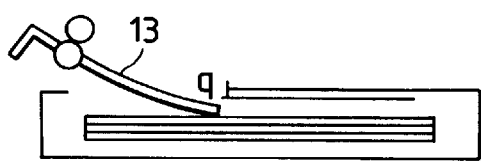

FIG. 5 is a schematic sectional view showing the first embodiment of the present invention. The arrangement of the apparatus will be briefly described below with reference to FIG. 5. Referring to FIG. 5, an image recording apparatus horizontally incorporates a supply magazine 2 including stacked unused recording sheets 17 and a receive magazine 16 for storing recorded sheets 19. Lids 2a and 16a are respectively attached to the supply and receive magazines 2 and 16 to be freely opened/closed, and when each lid is closed, the interior of the magazine is kept shielded from light. Therefore, both the magazines including sheets can be unloaded from the apparatus without exposing the sheets to external light. A suction disk 3 is movable by a mechanism (not shown), so that the suction disk 3 enters the interior of the supply magazine 2, sucks the uppermost one of stacked unused sheets to take it outside the supply magazine 2, and inserts the leading end of the sheet between a pair of feed rollers 4 and 5. The feed rollers 4 and 5 are pivoted by a driving source (not shown), and can feed the sheet to the left in FIG. 5. The feed roller 5 can be retracted from the sheet feed path to a position indicated by a dotted line in FIG. 5 by a mechanism (not shown). Guide plates 6 and 11 each consist of inner and outer plates, and form a gap through which the sheet passes. Pairs of sub-scanning rollers 7, 8, 9, and 10 are pivotal by a driving source and a power transmission means (neither are shown), and perform a sub-scanning operation by clamping the sheet and feeding it downward in FIG. 5. An optical unit 14 deflects and radiates a light beam 15 onto the sheet between the feed rollers 8 and 10 in a direction substantially perpendicular to the sheet feed direction, thus achieving a main scanning operation. Feed rollers 12 and 18 are pivoted by a driving source (not shown), and can feed the sheet to the right in FIG. 5. The roller 18 can be retracted from the sheet feed path to a position indicated by a dotted line in FIG. 5 by a mechanism (not shown). A sheet guide 13 can be retracted into the receive magazine 16 by a mechanism (not shown), as shown in FIGS. 6A to 8B. FIGS. 6A and 6B are respectively a top view (upper figure) and a side view (lower figure) showing the attachment/detachment state of the receive magazine 16. In this state, the sheet guide 13 is retracted to a position o. FIGS. 7A and 7B are respectively a top view (upper figure) and a side view (lower figure) showing a state wherein the lid 16a of the receive magazine 16 is opened after the receive magazine 16 is attached to the apparatus. In this state (p in FIGS. 7A and 7B), the sheet guide 13, which is rotated to have its left end in FIGS. 7A and 7B as a fulcrum, enters the interior of the magazine, and is located outside (below) the feed path of the sheet 19. FIGS. 8A and 8B are respectively a top view (upper figure) and a side view (lower figure) showing a state (q in FIGS. 8A and 8B) wherein the sheet guide 13 is rotated from the state illustrated in FIGS. 7A and 7B to have the left end in FIGS. 8A and 8B as a fulcrum, so that the right end of the sheet guide 13 enters the sheet feed path.

Figure 1:
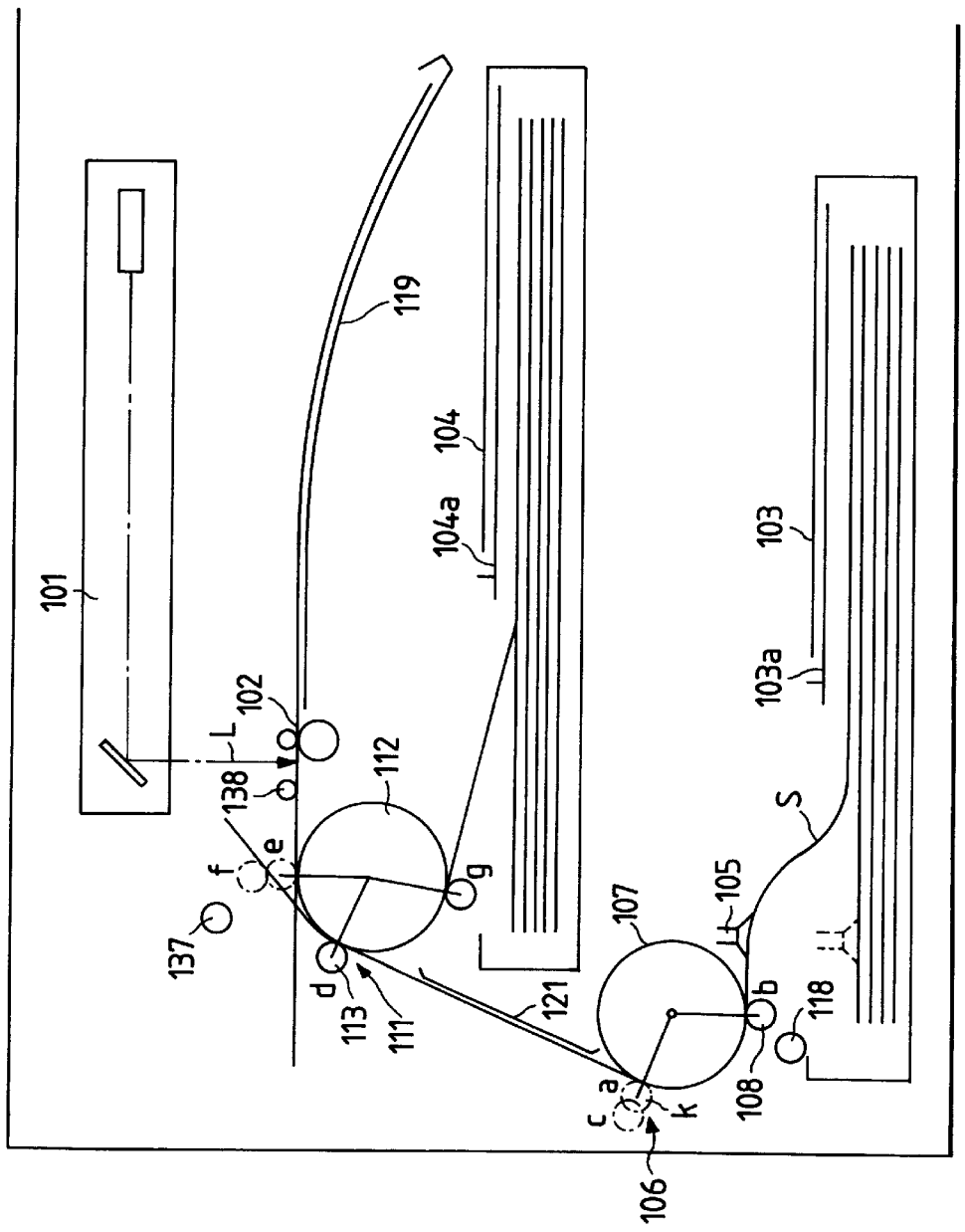
FIG. 1 is a schematic sectional view showing a prior art.
Figure 2:
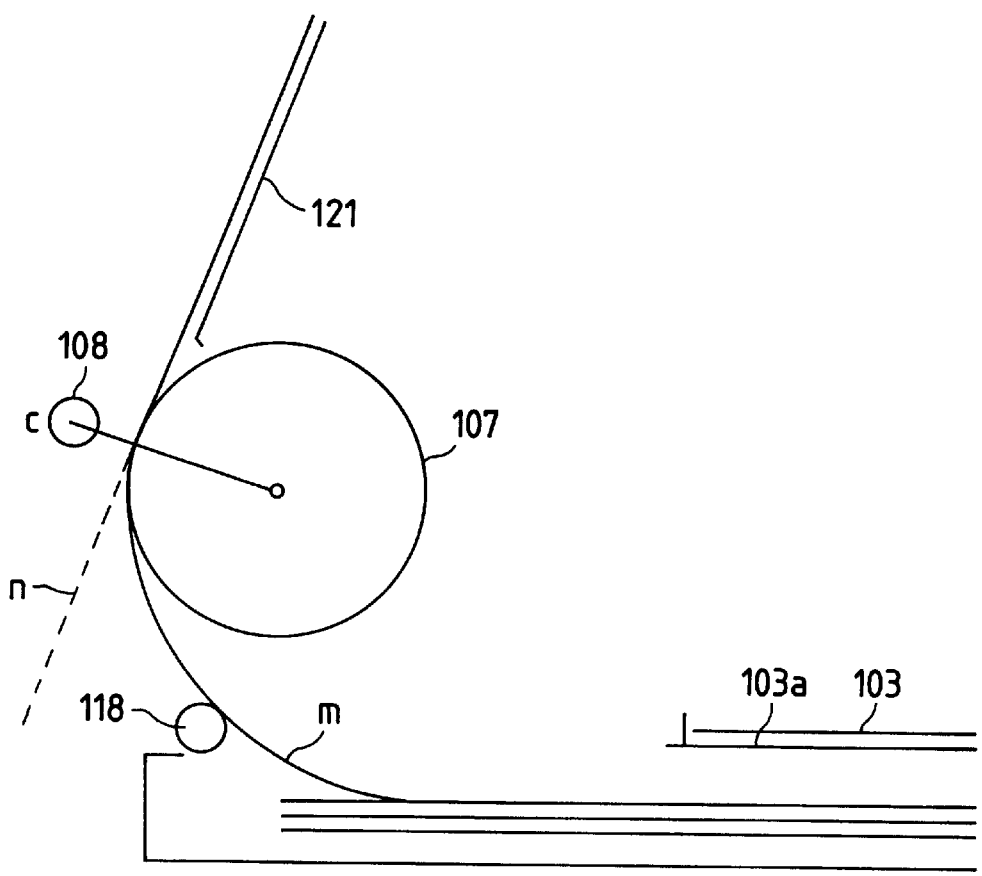
FIG. 2 is a partially enlarged view of FIG. 1.
Figure 3:
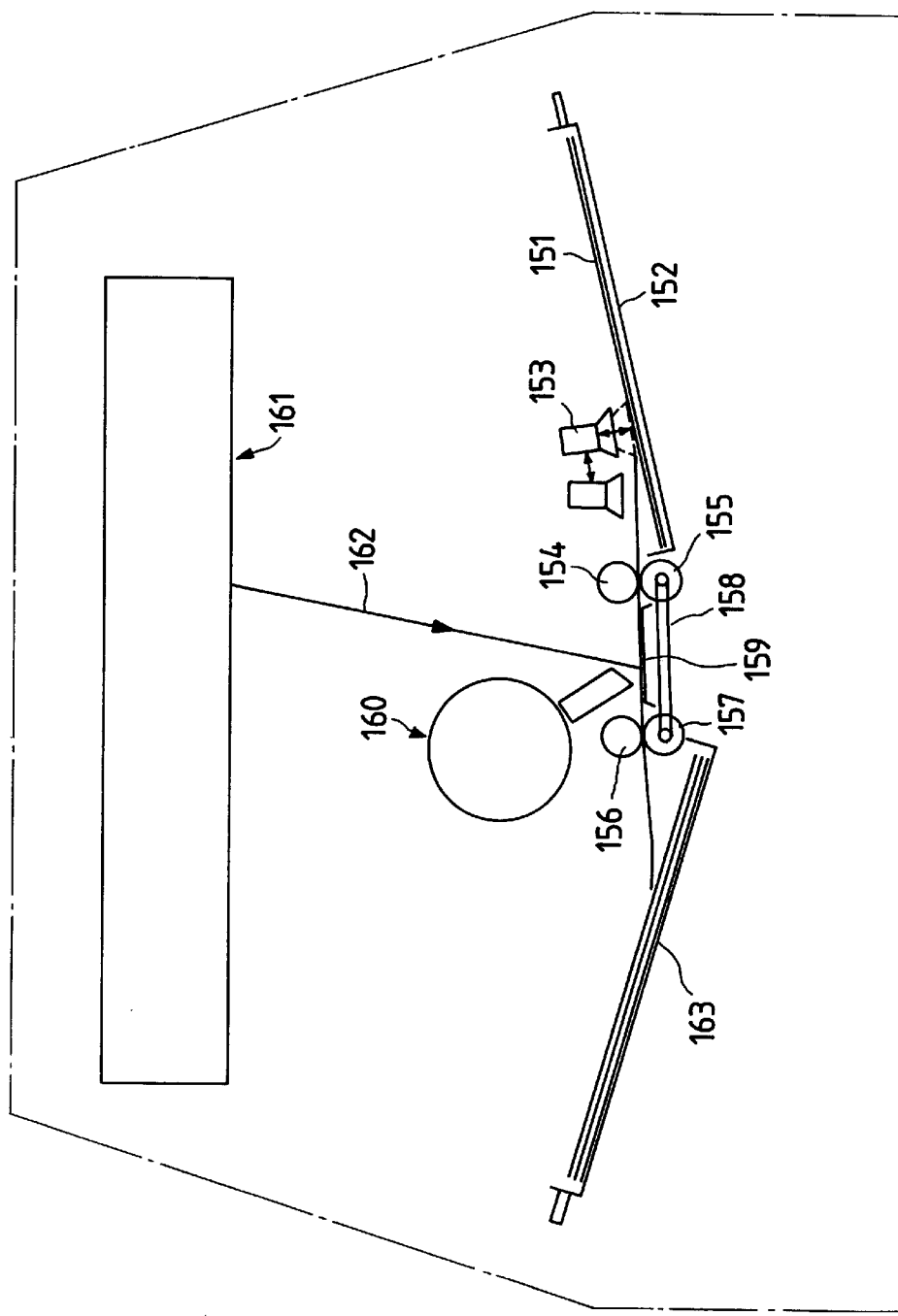
FIG. 3 is a schematic sectional view showing another prior art.
Figure 4:
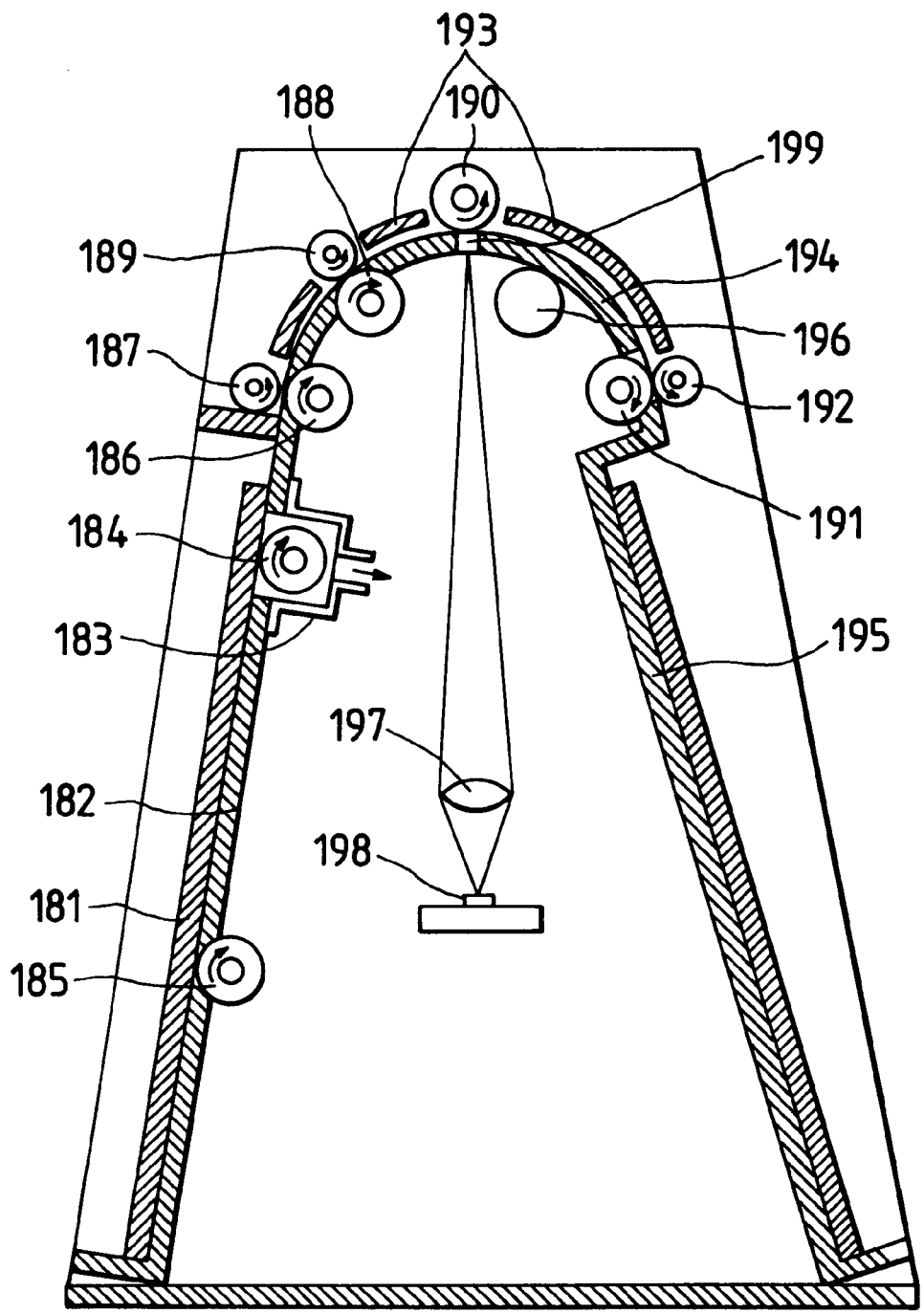
FIG. 4 is a schematic sectional view showing still another prior art.
Figure 9A:
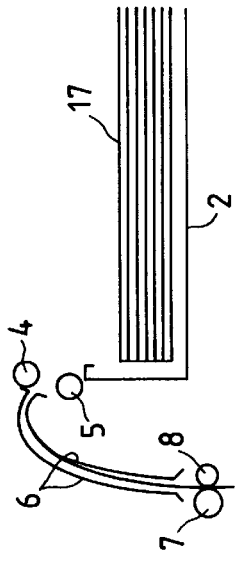
FIGS. 9A to 9F are explanatory views of the sheet feed state of the apparatus of the first embodiment.
Figure 9B:
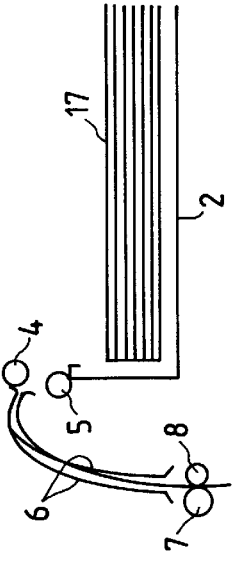
Figure 9C:
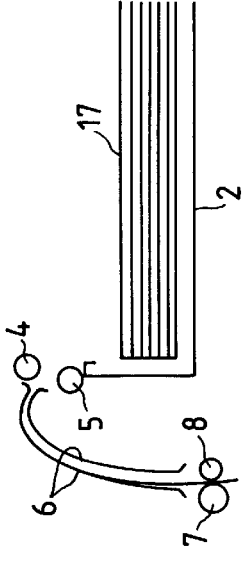
Figure 9D:
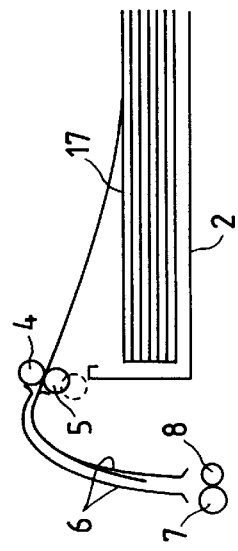
Figure 9E:
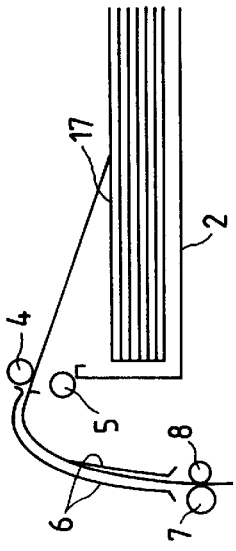
Figure 9F:
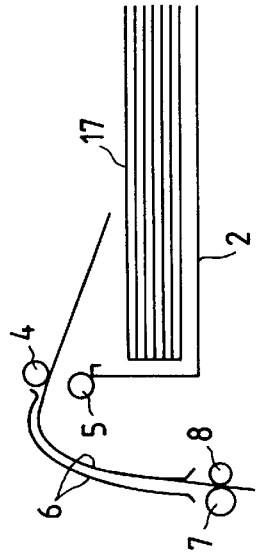

The operation of the present invention will be described below. The uppermost one of unused recording sheets 17 in the supply magazine 2 is picked up by the suction disk 3, and is inserted between the feed rollers 4 and 5. The recording sheet is fed between the guide plates 6 by the driving force of these rollers, and the leading end of the recording sheet is then clamped by the sub-scanning rollers 7 and 8. The feed roller 5 is then retracted from the feed path, and the rotations of the rollers 4 and 5 are stopped. At this time, the feed roller 18 is also kept retracted from the sheet feed path, and the rollers 12 and 18 are not rotated. In this state, the sheet is fed downward in FIG. 5 while the trailing end of the sheet is moving in the supply magazine 2 and the sheet is being transferred from the sub-scanning rollers 7 and 8 to the sub-scanning rollers 9 and 10. During this interval, the light beam 15 is radiated, and an image is recorded on the sheet. At this time, the sheet guide 13 is located at the position q, and guides the leading end of the sheet into the receive magazine 16. At this time, the leading end of the sheet moves along the sheet guide 13, and the sheet becomes substantially parallel to the recorded sheet 19 in the receive magazine, thus minimizing the shock upon contact of these sheets during recording. Since the trailing end of the sheet moves along the feed path defined by the guide plates 6 in the order of FIGS. 9A to 9F, the trailing end portion can be prevented from leaping during recording unlike in FIG. 2. This effect will be explained below. When the trailing end of the sheet is separated from other unused recording sheets 17, the sheet is regulated by the guide plates 6 and the roller 4, and has a shape shown in FIG. 9C via states shown in FIGS. 9A and 9B. This shape is defined so that the trailing end of the sheet has substantially the same inclination as that in the states shown in FIGS. 9A and 9B in which the trailing end of the sheet contacts another unused recording sheet 17, thus avoiding leaping, fluttering, and the like of the trailing end of the sheet as much as possible. In the states shown in FIGS. 9D, 9E, and 9F in which the trailing end of the sheet is present between the guide plates 6, the trailing end of the sheet moves along the inner surfaces of the guide plates 6, which are continuously and smoothly formed, while being regulated from the two sides. For this reason, the trailing end portion of the sheet can be prevented from leaping unlike in FIG. 2. Therefore, a variation in load acting on the sheet can be minimized, and scanning pitch nonuniformity can be suppressed within an allowable range. When the trailing end of the sheet has passed the light beam radiation position, the feed rollers 12 and 18 begin to rotate, and the roller 18 enters the sheet feed path. Immediately before the trailing end of the sheet reaches the clamping position of the rollers 12 and 18, the sheet guide 13 is retracted to the position p. When the trailing end of the sheet is exhausted by the feed rollers 12 and 18, the exhausted sheet is stacked on the recorded sheets 19 already stored in the receive magazine.

Both the supply and receive magazines are arranged to substantially horizontally store sheets, and are parallelly arranged in the vertical direction. Sheets are fed from the supply magazine in turn from the uppermost one via the feed path which has a substantially U-shaped horizontal pattern, and a recorded sheet is stored in the receive magazine with its upper surface, in the supply magazine, facing down. For this reason, a switch back arrangement, oblique sheet arrangement, and the like are not required, and the apparatus arrangement can be further integrated, thus realizing a compact apparatus arrangement.

In order to prevent a sheet from being attached to the guide plates 6, grooves, holes, embossed portions, or the like may be formed on the inner surfaces of the guide plates.

The magazines may be aligned in the vertical or oblique direction in place of the horizontal direction.

Figure 10:
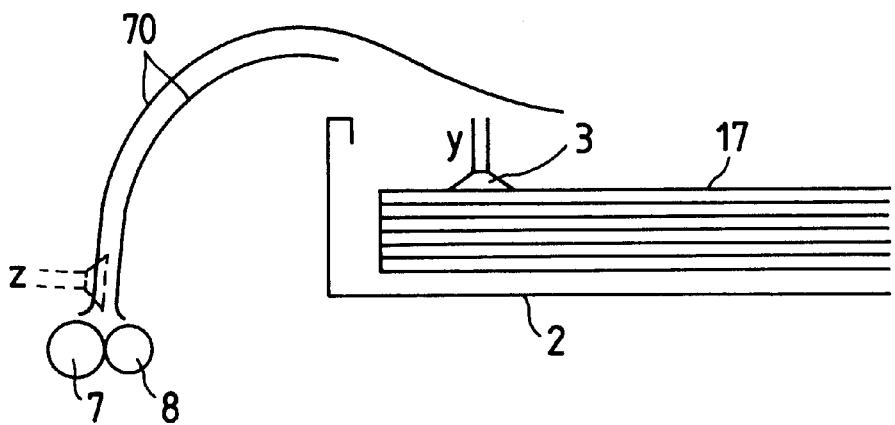
FIG. 10 is a schematic view showing a modification of a guide plate.

The guide plates for regulating the position of the trailing end of a sheet may have a shape, as indicated by 70 in FIG. 10. Referring to FIG. 10, the guide plates 70 has a notch through which the suction disk 3 can pass, and the suction disk 3 moves from a position y to a position z along the notch.

Figure 12:
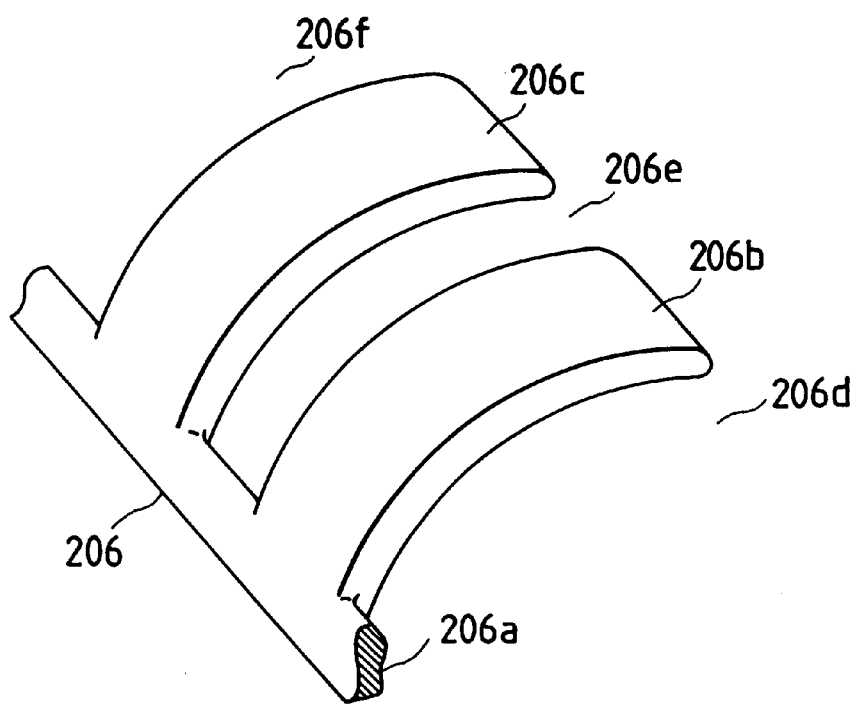
FIG. 12 is a partial detailed view of a sheet guide according to the second embodiment of the present invention.
Figure 11:
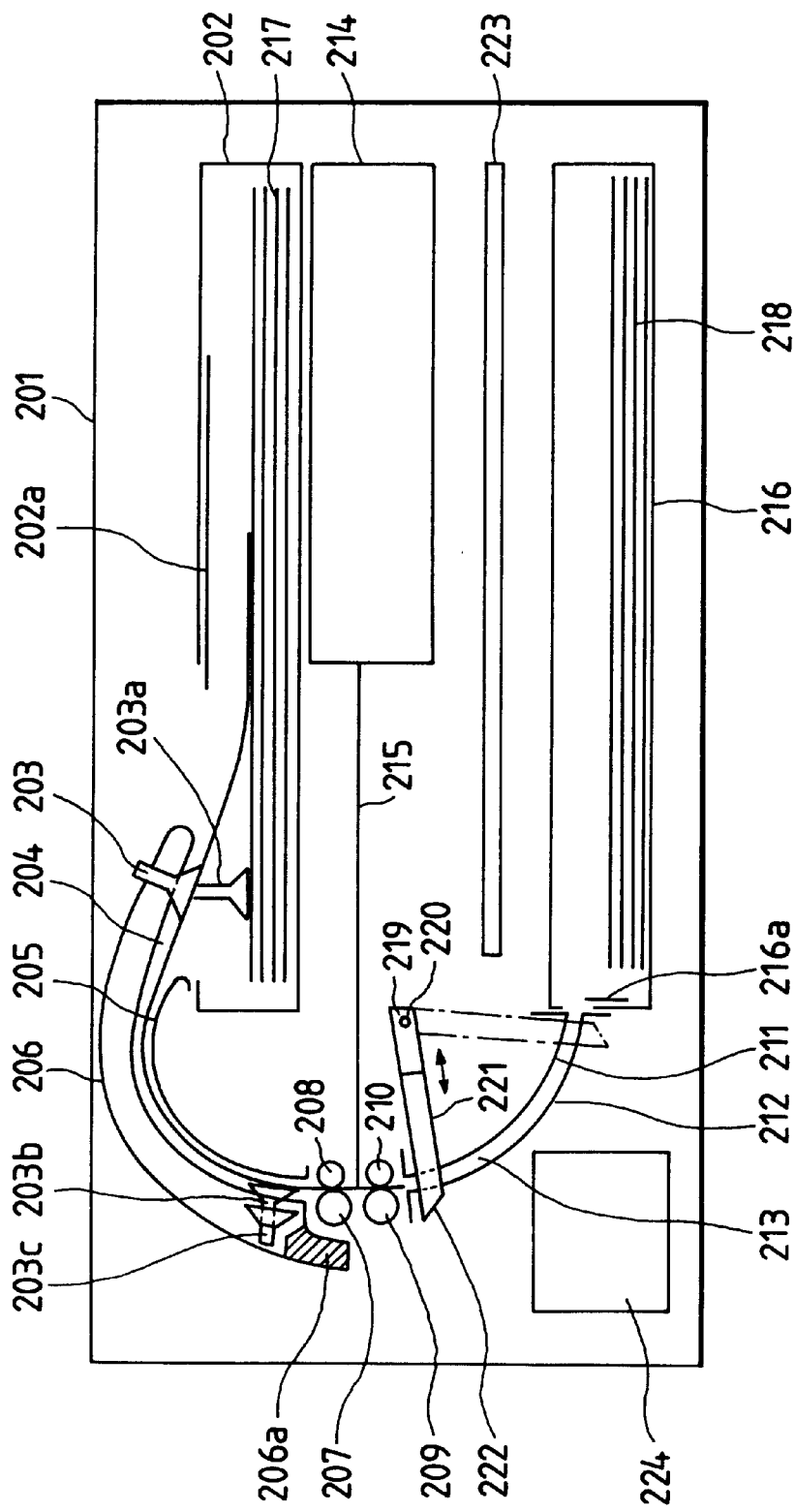
FIG. 11 is a schematic sectional view showing the arrangement according to the second embodiment of the present invention.
Figure 13:
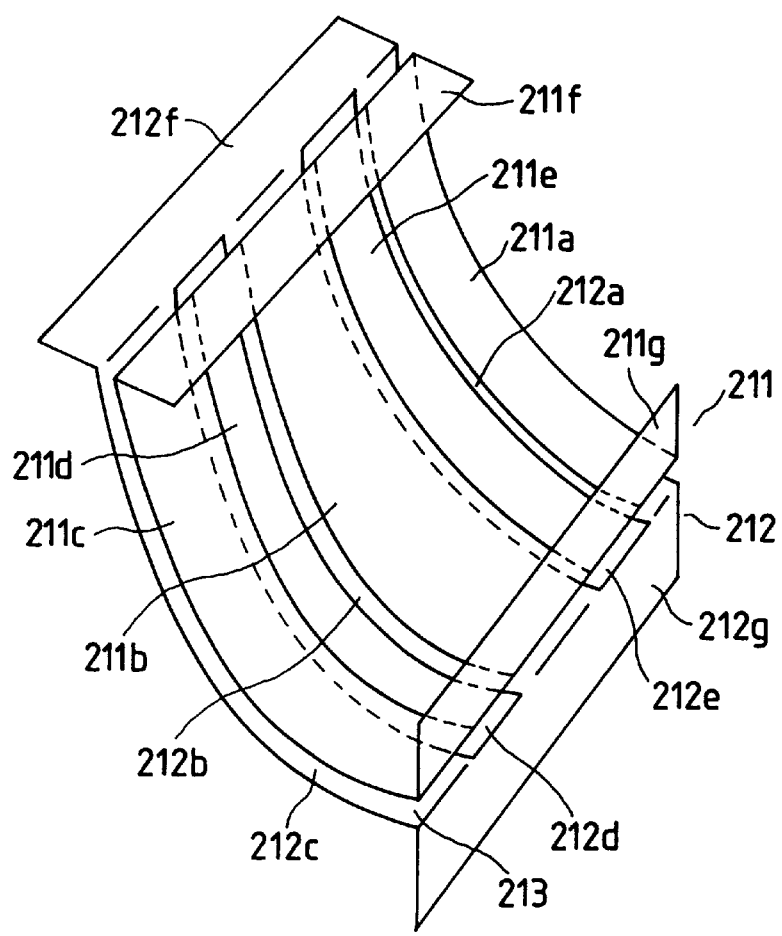
FIG. 13 is a partial detailed view of the sheet guide according to the second embodiment of the present invention.
Figure 14:
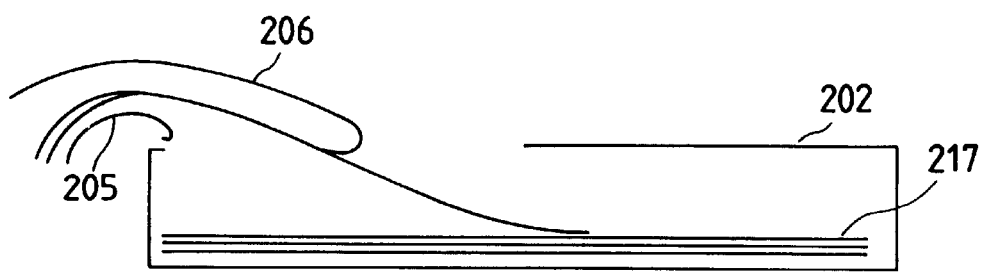
FIG. 14 is an explanatory view of the operation of the sheet guide according to the second embodiment of the present invention.

FIG. 11 is a schematic sectional view showing the second embodiment of the present invention, FIGS. 12 and 13 are partial detailed views of the second embodiment, and FIG. 14 is an explanatory view of the operation of the second embodiment. The arrangement of the apparatus will be briefly described below with reference to FIGS. 11 to 14. Referring to FIG. 11, an image recording apparatus main body 201 horizontally and parallelly incorporates, at upper and lower positions, a supply magazine 202 including stacked unused recording sheets 217 and a receive magazine 216 for storing recorded sheets 218. Each sheet 217 has an emulsion layer on only its lower surface, and an image can be recorded by radiating a very small light beam spot on the emulsion layer. Lids 202a and 216a are respectively attached to the supply and receive magazines 202 and 216 to freely open/close the openings of the magazines 202 and 216. When each lid is closed, the interior of the magazine is kept shielded from light. Therefore, both the magazines containing sheets can be unloaded outside the apparatus without exposing the sheets to external light. A suction disk 203 enters the interior of the supply magazine 202 by a mechanism (not shown), and sucks the uppermost one of the stacked unused sheets at a position 203a to take it outside the supply magazine 202. The suction disk 203 then moves along an arcuated path 204 while chucking the unused sheet. As described above, since the emulation layer is formed on only the lower surface (in FIG. 11) of the sheet, the suction disk 203 can pick up and move the sheet without contacting the emulsion layer. An inner guide plate 205 and an outer guide plate 206 define the above-mentioned path 204 as a gap through which a sheet passes. Note that the guide plate 206 is divided into a plurality of portions (206b, 206c) in a direction perpendicular to the plane of the drawing of FIG. 11, and has notches 206d, 206e, and 206f to allow movement of the suction disk, as shown in FIG. 12. The portions of the guide plate 206 are coupled by a hatched portion 206a, and the guide plate 206 is supported by a support member (not shown). Sub-scanning rollers 207, 208, 209, and 210 are pivoted by a driving source and a power transmission means (neither are shown), and perform a sub-scanning operation by clamping a sheet and feeding it downward in FIG. 11. The suction disk 203 moves along the path 204, and inserts the leading end of a sheet between the rollers 207 and 208 at a position 203b. After the leading end of the sheet is inserted between the rollers, the reduced pressure of the suction disk is released, and the suction disk is retracted from the sheet path 204 to a position 203c. Thus, the suction disk is separated from the sheet, and the rollers 207, 208, 209, and 210 begin to rotate, thus performing the sub-scanning operation. A means for driving the rollers 207, 208, 209, and 210 detects their rotation speeds using a rotation speed detection means (not shown), and maintains the rotation speeds of the rollers 207, 208, 209, and 210 constant using a servo means (not shown). An optical unit 214 performs a main scanning operation by deflecting and radiating a light beam 215 onto a sheet located between the rollers 208 and 210 in a direction substantially perpendicular to the sheet feed direction. As is apparent from FIG. 11, the light beam is radiated from the emulsion surface side of the sheet. If the base of the sheet is transparent, light may be radiated from the opposite side to achieve recording. However, when recorded image quality may deteriorate under the influence of reflection, refraction, scattering, and the like of light by the transparent layer, it is preferable to radiate the light from the emulsion surface side like in this embodiment. An inner guide plate 211 and an outer guide plate 212 define a gap 213 through which a sheet passes. Note that each of the paths 204 and 213 defines a gap having a width which is larger than the thickness of a sheet and is as small as 10 mm or less. A lever main body 219 is pivotal about a stationary shaft 220, and reciprocally moves between a position indicated by a solid line and a position indicated by a dashed line by a driving means (not shown). A lever 221 is supported on the distal end of the lever main body 219 to be slidable with respect to the lever main body 219, and is movable between a position extending through the path 213 and a position retracted from the path 213 by a driving means (not shown). The distal end portion of the lever 221 has a tapered portion, as shown in FIG. 11. The guide plates 211 and 212 are divided into a plurality of portions (211a, 211b, 211c, 212a, 212b, and 212c) in the direction perpendicular to the plane of the drawing of FIG. 11, as shown in FIG. 13, and have notches (211d, 211e, 212d, and 212e) where the lever 221 extends through and moves. The plurality of portions 211a, 211b, 211c, 212a, 212b, and 212c are coupled by coupling portions 211f, 211g, 212f, and 212g, and are supported by a support member (not shown). A control unit 223 controls the components in the main body 201. The main body 201 also includes a power supply 224.

The operation of this embodiment will be described below. The uppermost one of unused recording sheets 217 in the supply magazine 202 is picked up by the suction disk 203, and moves along the path 204 while being sucked by the suction disk. When the leading end of the sheet reaches the sub-scanning rollers 207 and 208, it is clamped therebetween. At this position, since the reduced pressure of the suction disk is released, the suction disk is detached from the sheet, and is retracted from the feed path. In this state, the sheet is fed downward in FIG. 11 while being transferred from the sub-scanning rollers 207 and 208 to the sub-scanning rollers 209 and 210, and during this interval, the light beam 215 is radiated to record an image on the sheet. At this time, the lever main body 219 is located at the position indicated by the solid line in FIG. 11, and the lever 221 is located at the position retracted from the path 213. When the leading end of the sheet is clamped between the rollers 209 and 210, the rollers may undergo a large variation in load and cause rotation speed nonuniformity. However, in this embodiment, the effective recording range on the sheet is started after the sheet is clamped between the rollers 209 and 210, thus avoiding this influence. As the recording operation progresses, the moving direction of the leading end of the sheet is gradually changed by the guide plate 212, and the sheet moves along the path 213. When the recording operation further progresses, the sheet is also regulated by the guide plate 211, and moves along the path 213 while maintaining the curvature defined by the guide plates 212 and 211. On the other hand, the trailing end of the sheet is present in the supply magazine at the beginning of recording, and slides along the next sheet as the recording operation progresses. Finally, as shown in FIG. 14, the trailing end of the sheet is separated from the next sheet and is lifted. In this case, the distal end portion of the guide plate 206 is formed, so that the sheet is deformed to slightly project downward immediately before its trailing end is separated from the next sheet, and the trailing end is smoothly separated from the next sheet while maintaining this deformation, thereby avoiding fluttering, leaping, and the like of the trailing end of the sheet. When the recording operation further processes, the trailing end of the sheet smoothly moves along the guide plate 206. During this interval, the sheet is also regulated by the guide plate 205, and moves along the path 204 while maintaining the curvature defined by the guide plates 205 and 206. Meanwhile, the leading end of the sheet has reached the receive magazine, and smoothly moves along a stack of already recorded sheets. When the trailing end of the sheet is released from the rollers 207 and 208, the rollers may undergo a large variation in load and cause rotation speed nonuniformity. However, in this embodiment, the optical unit 214 ends the recording operation on the effective recording region before the trailing end of the sheet is released from the rollers 207 and 208, thereby eliminating the influence of the rotation speed nonuniformity. When the trailing end of the sheet is released from the rollers 209 and 210, the trailing end of the sheet slightly moves along the path 213 by the gravity. Then, the lever 211 is expanded to cross the guide plates 211 and 212, and reaches the position indicated by the solid line in FIG. 11. At this position, the trailing end of the sheet contacts the distal end of the lever 211, and the sheet is pushed downward by a tapered portion 222 formed at the distal end of the lever. The lever 211 moves to the position indicated by the alternate long and two short dashed line in FIG. 11 while pushing the trailing end of the sheet, and the sheet is fed into the receive magazine 216 by its inertia. As described above, according to this embodiment, since the guide plates 206 and 212 are smoothly formed, the sheet can be prevented from being influenced by an abrupt variation in load in paths defined by the leading and trailing ends of the sheet during recording on the effective recording region.

Figure 15:
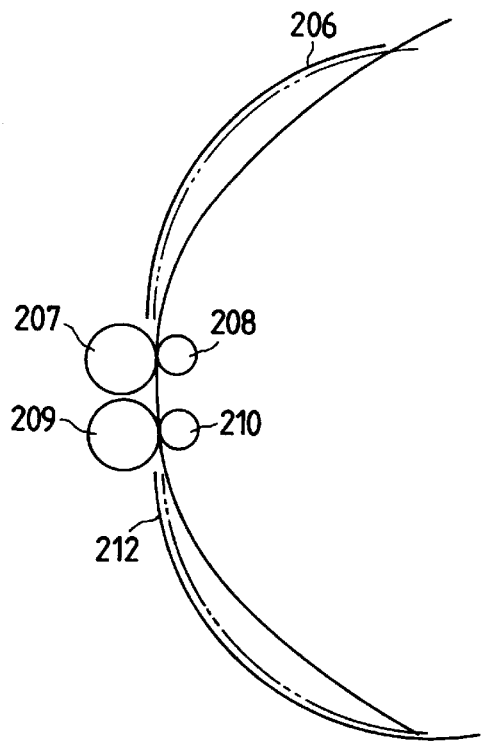
FIG. 15 is a view for explaining the effect of the second embodiment.
Figure 16A:
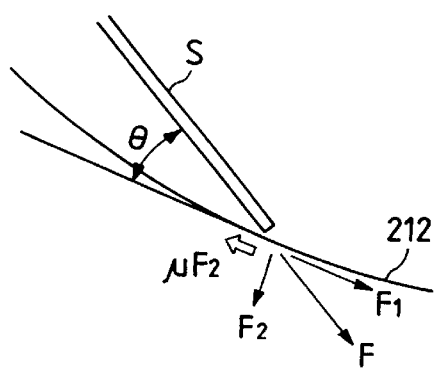
FIGS. 16A and 16B are views for explaining the effect of the second embodiment.
Figure 16B:
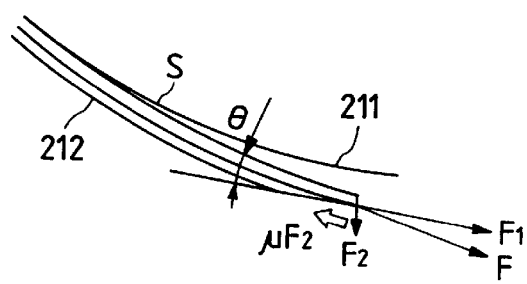

FIGS. 15 to 16B are views for explaining the effect of the inner guide plates 205 and 211. FIG. 15 shows a case wherein no inner guide plate is arranged. In this case, while the sheet is subjected to recording, it vibrates between a position indicated by a solid line in FIG. 15 and a position indicated by an alternate long and two short dashed line in FIG. 15, thus causing recording nonuniformity. FIGS. 16A and 16B show states wherein the leading end of a sheet S contacts the guide plate 212. FIG. 16A shows a case wherein no guide plate 211 is arranged, and FIG. 16B shows a case wherein the guide plate 211 is arranged. If the angle defined between the sheet S and the contact point of the sheet S and the guide plate 212 is represented by θ, the moving force of the leading end of the sheet is represented by F, the partial force of the force F in a direction tangent to the guide plate is represented by F1, the partial force of the force F in a direction normal to the guide plate is represented by F2, and the coefficient of friction between the leading end of the sheet and the guide plate is represented by p, because θ is large in FIG. 16A, μF2 also becomes large. Therefore, the sheet is easily influenced by a variation in load, and easily causes recording nonuniformity. Because θ is small in FIG. 16B, μF2 is also small, the variation in load can be reduced, and recording nonuniformity does not easily occur.

Figure 17:
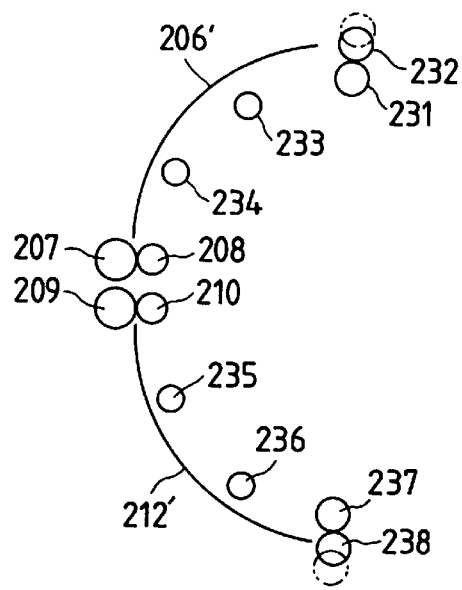
FIG. 17 is a partial detailed view of a modification of the second embodiment.

FIG. 17 is a partial explanatory view of a modification of the second embodiment, and shows only a portion of the section. Referring to FIG. 17, driving rollers 231 and 237 are rotated by a driving means (not shown). Nip rollers 232 and 238 respectively clamp a sheet between themselves and the driving rollers 231 and 237 to move the sheet. The nip rollers 232 and 238 escape to positions indicated by alternate long and two short dashed lines in FIG. 17 during recording, thereby preventing recording nonuniformity caused by an abrupt variation in load upon releasing of the trailing end of a sheet from the rollers 231 and 232 and upon insertion of the leading end of the sheet between the rollers 237 and 238. Guide plates 206' and 212' need not be divided unlike in FIG. 11, and are arranged across the widthwise direction of the sheet. Free rotation rollers 233 to 236 regulate the sheet to a predetermined curvature, and have the same functions as those of the guide plates 205 and 211 described above with reference to FIGS. 15 to 16B.

Note that some of the above-mentioned guide plates and rollers may be omitted depending on the stiffness of a sheet, and the allowable range of pitch nonuniformity upon recording/reading.

Figure 18:
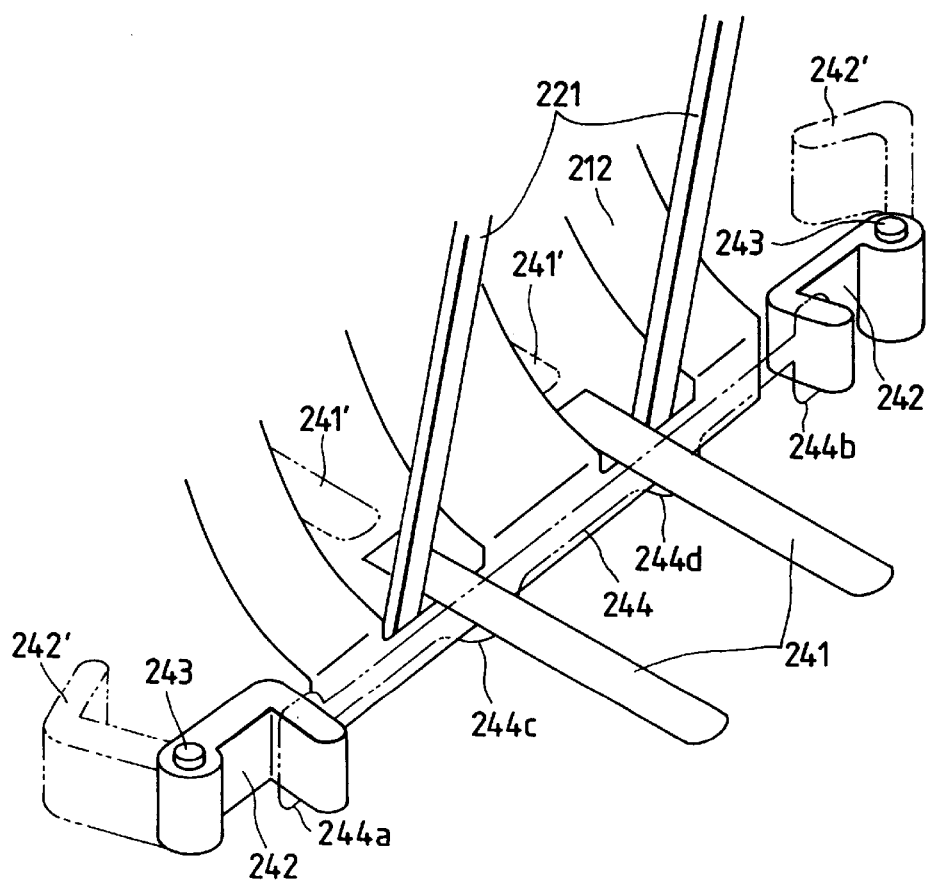
FIG. 18 is a partial detailed view of another modification of the second embodiment.
Figure 19:
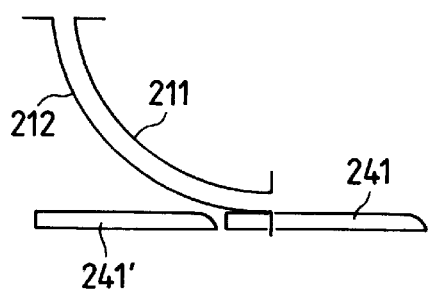
FIG. 19 is a partial detailed view of the modification shown in FIG. 18 of the second embodiment.

FIGS. 18 and 19 are explanatory views of the second modification of the second embodiment. FIG. 18 is a partial perspective view, and FIG. 19 is a partial sectional view.

In FIG. 18, the guide plate 211 is not illustrated for the sake of simplicity. Referring to FIG. 18, two right and left movable guides 241 are respectively movable by a driving means (not shown) between positions indicated by solid lines and positions (241') indicated by alternate long and two short dashed lines. The movable guides 241 enter the receive magazine to prevent a sheet from contacting already stored sheets or to shorten the contact distance when the sheet enters the receive magazine. Each of movable members 242 is pivotally supported by a corresponding shaft 243, and is movable by a driving means (not shown) between a position indicated by a solid line and a position (242') indicated by an alternate long and two short dashed line. Note that the movable members 242 and the shafts 243 are symmetrically arranged at two right and left positions. An opening 244 is formed in the receive magazine, and allows a sheet to pass therethrough. The opening 244 is widened at portions 244a and 244b which receive the movable members 242, and at portions 244c and 244d which receive the movable guides 241. When the sheet enters the receive magazine 216 while being subjected to recording, the movable guides 241 are located at the positions indicated by the solid lines, the movable members 242 are located at the positions 242', and the lever 221 is located at the position indicated by the solid line in FIG. 11 and retracted from the path 213. Upon completion of recording, the trailing end of the sheet is pushed by the lever 221 like in FIG. 11, and the sheet is pushed into the receive magazine 216. Then, the movable members 242 move from the positions 242' to the solid line positions, and push the trailing end of the sheet at that time, thereby completely pushing the sheet, which is stopped at the end portion of the receive magazine, into the receive magazine. When the movable guides 241 are retracted to the positions 241', the sheet is dropped due to its own weight, and is stacked on the already stored sheets. Therefore, when the sheet is stored, the sheets can be prevented from rubbing each other and being damaged. Thereafter, the lever 221 is returned to the solid line position in FIG. 11, and the movable guides 241 are returned to the positions indicated by the alternate long and two short dashed lines in FIG. 18.

Figure 20:
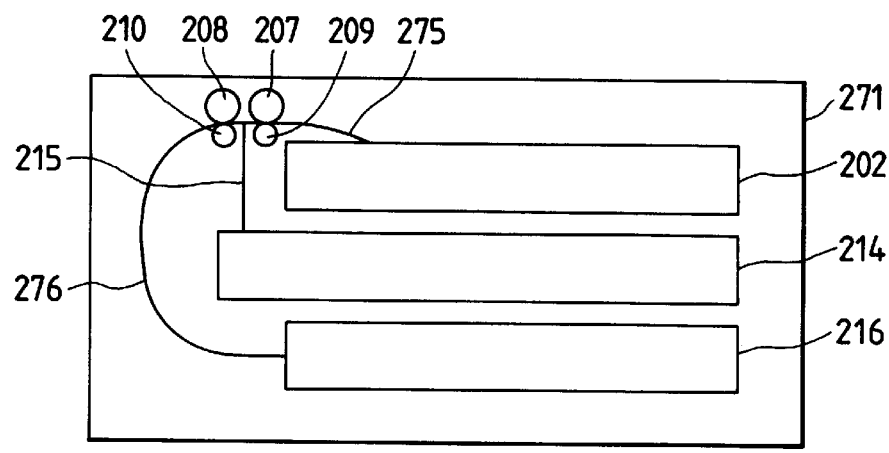
FIG. 20 is a sectional view showing the third embodiment of the present invention.
Figure 21:
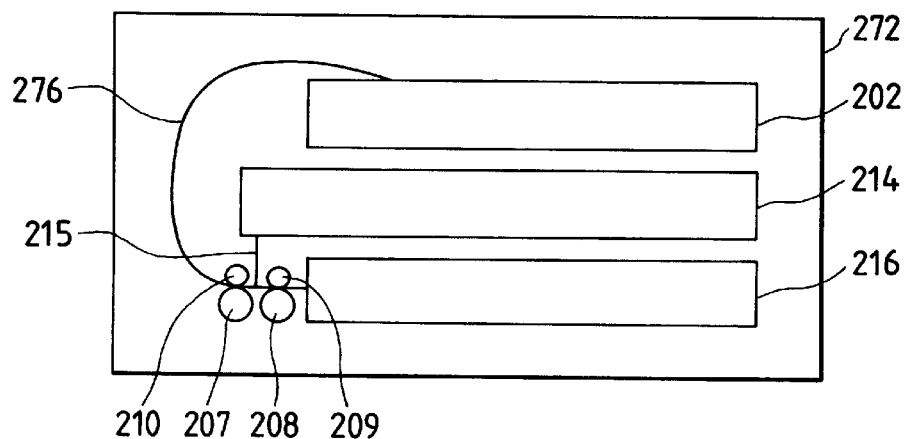
FIG. 21 is a sectional view showing the fourth embodiment of the present invention.

FIGS. 20 and 21 show embodiments with other arrangements. These embodiments respectively comprise image recording apparatus main bodies 271 and 272. Note that the same reference numerals in these embodiments denote the same parts as in the second embodiment.

In the embodiment shown in FIG. 20, the sub-scanning rollers 207, 208, 209, and 210 are arranged near the supply magazine 202, and a light beam is deflected upward by a mirror means (not shown) to record an image on a sheet immediately after the sheet is picked up from the supply magazine 202. The sheet is fed along feed paths 275 and 276. Upon completion of recording, the sheet is fed into the receive magazine 216 by means of rollers, a push-in lever, or the like as in the above embodiment and modifications. In the embodiment shown in FIG. 21, the sub-scanning rollers 207, 208, 209, and 210 are arranged near the receive magazine 216, and a sheet immediately before being fed into the receive magazine 216 is subjected to recording. A sheet is fed from the supply magazine 202 to the rollers 207 and 210 along the feed path 276 by mea n s of a suction disk, rollers, or the like as in the above embodiment and modifications. In FIG. 11 and FIGS. 20 and 21, the supply magazine is arranged at an upper position in the apparatus and the receive magazine is arranged at a lower position. Alternatively, the positions of these magazines may be reversed.

Figure 22:
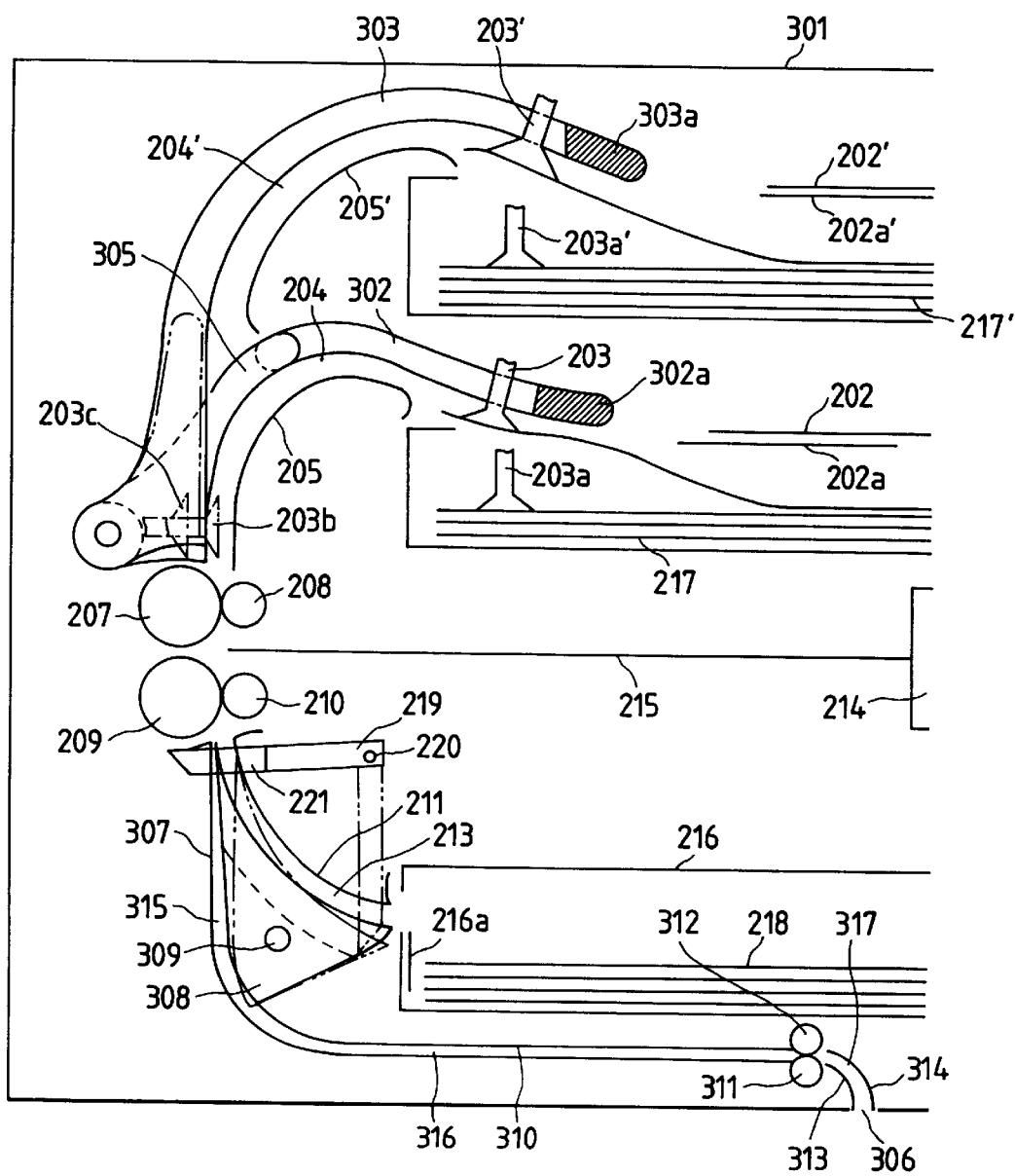
FIG. 22 is a schematic sectional view showing the arrangement according to the fifth embodiment of the present invention.
Figure 23:
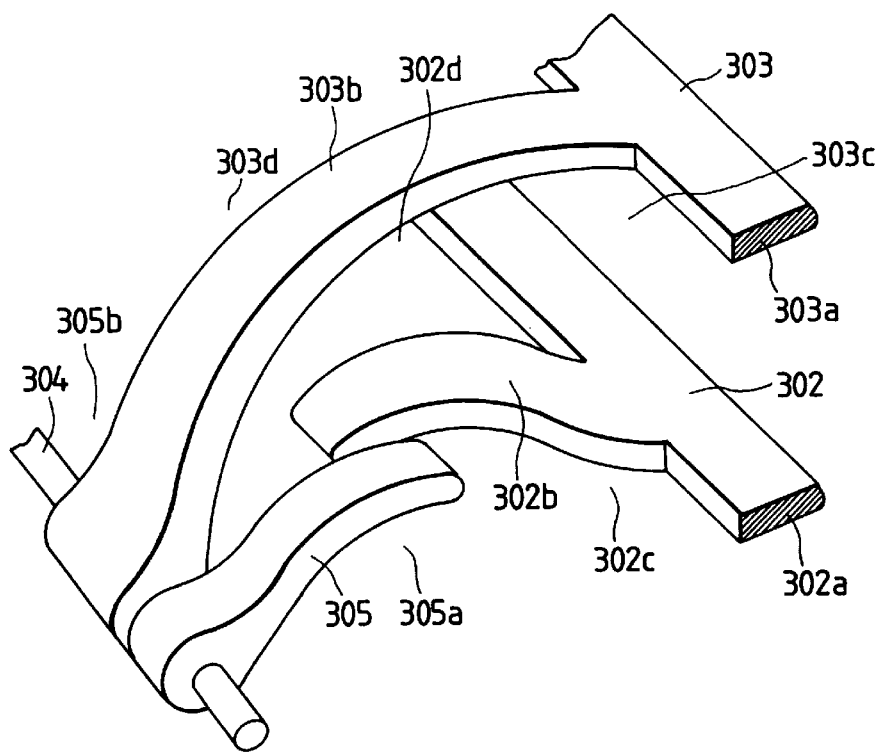
FIG. 23 is a partial detailed view of a sheet guide according to the fifth embodiment of the present invention.
Figure 24:
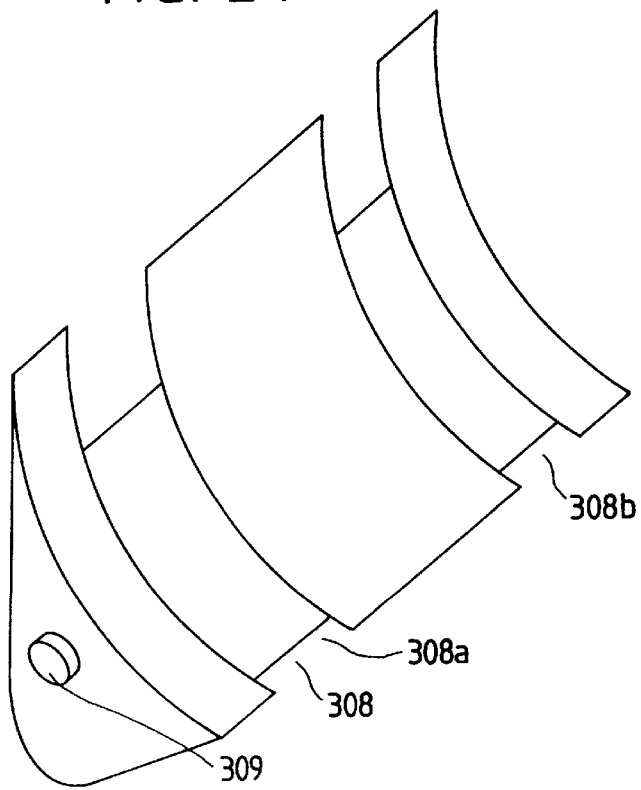
FIG. 24 is a partial detailed view of the sheet guide according to the fifth embodiment of the present invention.

Also, two supply magazines may be selectively loaded to the apparatus so as to be able to selectively use different types of sheets. Furthermore, the apparatus may be designed to be able to select whether a recorded sheet is stored in the receive magazine or is directly fed to an automatic developing machine to be subjected to developing processing. FIGS. 22 to 24 show such an embodiment. FIG. 22 is a schematic sectional view (illustrating only the left half) of this embodiment, and FIGS. 23 and 24 are partial detailed views of this embodiment. Referring to FIG. 22, an image recording apparatus 301 includes a second supply magazine 202' for storing sheets 217' of the second type, a lid 202a' which is attached to the magazine 202' to be freely opened/closed, a suction disk 203' which sucks a sheet at a position 203a', and a sheet path 204' defined by a guide plate 205' and the like. These members have the same functions and operations as those of the above-mentioned members 201, 202, 217, 202a, 203, and 203a. Guide plates 302 and 303 oppose the guide plates 205 and 205' to define the sheet paths 204 and 204' in the same manner as the guide plate 206 shown in FIG. 11. Note that the guide plate 302 has a shape disconnected at its intermediate portion as compared to the guide plate 303. Each of the guide plates 302 and 303 is divided into a plurality of portions (FIG. 23 illustrates only portions 302b and 303b) in a direction perpendicular to the plane of the drawing of FIG. 22, and has notches (FIG. 23 illustrates only notches 302c, 302d, 303c, and 303d) at portions where the suction disk moves. The guide plates 302 and 303 are respectively coupled by coupling portions 302a and 303a, and are supported by support members (not shown). A shaft 304 is rotatably supported by a support member (not shown), and a movable guide plate 305 is fixed to the shaft 304. The movable guide plate 305 is movable between a position indicated by a solid line in FIG. 22 and a position indicated by an alternate long and two short dashed line in FIG. 22 together with the shaft 304 by a driving mechanism (not shown). Although not shown, a plurality of movable guide plates 305 are arranged in a direction of the plane of the drawing of FIG. 22. Note that the movable guide plates 305 are not arranged on portions (FIG. 23 illustrates only 305a and 305b) where the suction disk moves. The other end of the guide plate 303 is engaged with the shaft 304. When the movable guide plates 305 are located at the positions indicated by the solid line, their surfaces facing the guide plate 205 are smoothly connected to the corresponding portions of the guide plate 302, thus forming the path 204 together with the opposing guide plate 205. When the movable guide plates 305 are located at the positions indicated by the alternate long and two short dashed line, the portions on the side of the path 204' are recessed from the guide plate 303 and do not disturb the path 204'.

The operation of the above-mentioned arrangement will be described below. When the sheet 217 is used, the movable guide plates 305 are located at the positions indicated by the solid line, and the suction disk 203 operates to insert the sheet 217 between the rollers 207 and 208, thus performing a recording operation. When the sheet 217' is used, the movable guide plates 305 are located at the positions indicated by the alternate long and two short dashed line, and the suction disk 203' operates to insert the sheet 217' between the rollers 207 and 208, thus performing a recording operation. The apparatus of this embodiment also includes guide plates 307, 310, 313, and 314. At least one of a pair of rollers 311 and 312 has a driving force, and has a function of feeding a sheet. The guide plates 307 and 310, and the guide plates 313 and 314 face each other to form thin sheet paths 316 and 317. An opening 306 is formed in the apparatus main body 301, is connected to a sheet feeding apparatus or an automatic developing machine (neither are shown), and allows a recorded sheet to pass therethrough. A movable guide plate 308 is pivotally supported by a stationary shaft 309, and is movable by a driving mechanism (not shown) between a position indicated by a solid line in FIG. 22 and a position indicated by an alternate long and two short dashed line in FIG. 22. The movable guide plate 308 has notches at portions (308a and 308b) where the lever 211 passes, as shown in FIG. 23. When the movable guide plate 308 is located at the solid line position, it faces the guide plate 211 and forms the thin sheet path 213 like in FIG. 11. In this case, a recorded sheet is stored in the receive magazine 216 as in FIG. 11. When the movable guide plate 308 is located at the position indicated by the alternate long and two short dashed line, it faces the guide plate 307, and forms a thin sheet path 315. In this case, a recorded sheet is clamped between the rollers 311 and 312 via the paths 315 and 316. Since the interval between the rollers 209 and 210 and the rollers 311 and 312 is slightly smaller than the length, in the feed direction, of the sheet, the sheet is clamped between the rollers 311 and 312 after recording on the effective recording region ends, thus preventing recording nonuniformity due to a variation in load upon clamping of the sheet between the rollers 311 and 312. Then, the sheet is fed into the sheet feeding apparatus or the automatic developing machine along the path 306. Since the operation of the apparatus of this embodiment is the same as that in the second embodiment, a detailed description thereof will be omitted. Like in the second embodiment, the guide plates face each other with a small interval, and have smooth surfaces facing the sheet path. Also, the surfaces, facing the sheet path, of joints of the guide plates are smoothly formed without any steps. For these reasons, recording nonuniformity can be avoided by the same effect as that described above with reference to FIGS. 15 to 16B.

Figure 25:
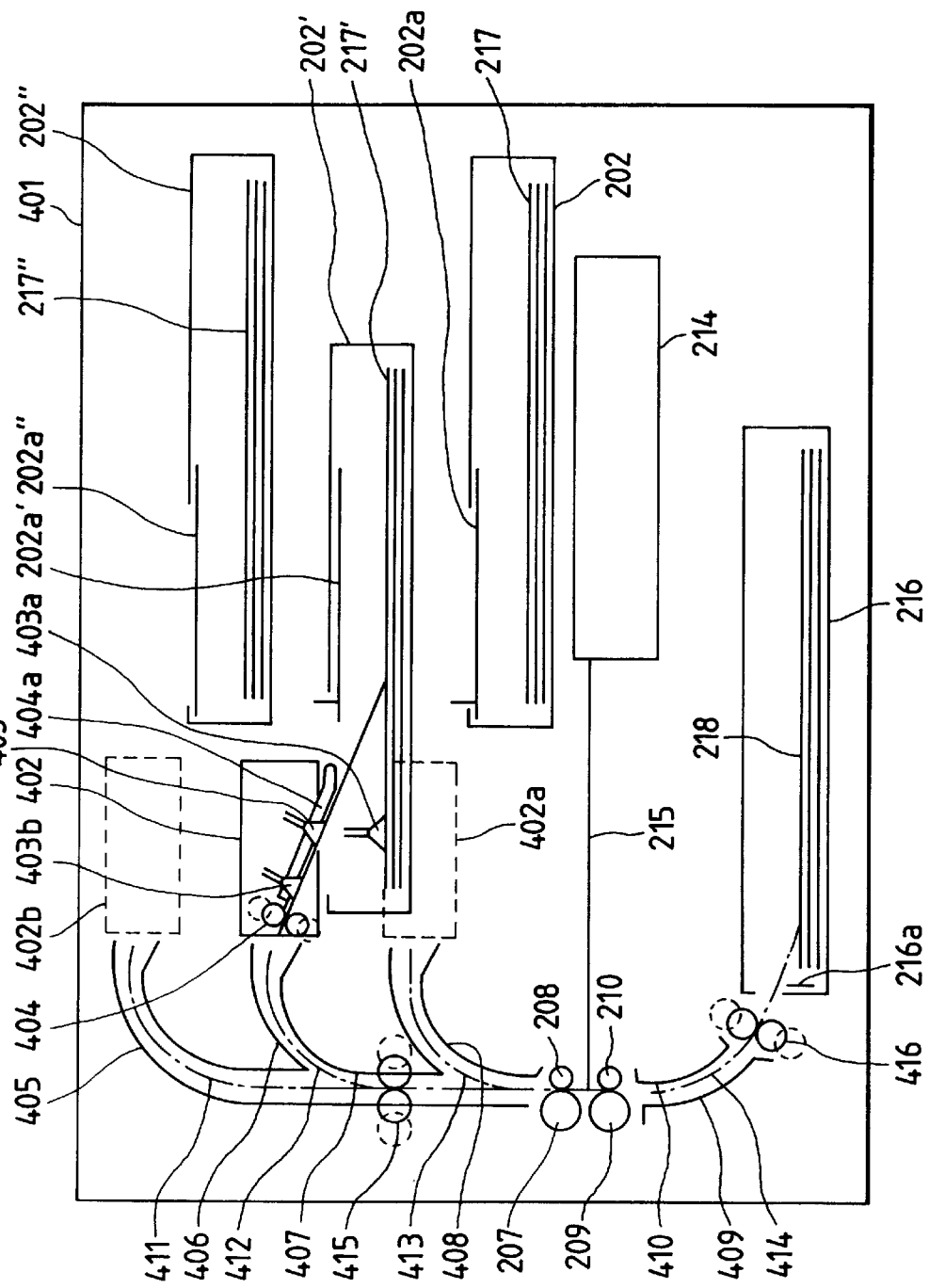
FIG. 25 is a schematic sectional view showing the arrangement according to the sixth embodiment of the present invention.

FIG. 25 shows the sixth embodiment that is achieved by further modifying the embodiment shown in FIG. 22 to allow loading of a plurality of supply magazines. Referring to FIG. 25, an image recording apparatus 401 includes a third supply magazine 202" which stores sheets 217" of the third type, a lid 202a" which is attached to the magazine 202" to be freely opened/closed, and a separation unit 402 which is movable by a driving means (not shown) between a solid line position (402) and broken line positions (402a and 402b) in FIG. 25. A suction disk 403, a pair of rollers 404 having a function of clamping and feeding a sheet, and a guide plate 404a are attached to the separation unit. The suction disk 403 is movable by a driving mechanism (not shown) between positions 403a and 403b in the separation unit 402. The rollers 404 are moved by a driving means (not shown) to broken line positions in FIG. 25 in the separation unit 402 during recording so as to release the clamping force to a sheet. The supply magazines 202, 202', and 202" are movable in the right-and-left directions in FIG. 25 by driving mechanisms (not shown). At the rightmost position (the illustrated positions of the supply magazines 202 and 202" in FIG. 25), the magazine is detached/attached, and at the leftmost position (the illustrated position of the supply magazine 202' in FIG. 25), a sheet is separated. Corresponding ones of guide plates 405 to 410 face each other to form sheet paths 411 to 414. Pairs of rollers 415 and 416 are used for clamping and feeding a sheet, and move to broken line positions in FIG. 25 by driving mechanisms (not shown) to release their clamping forces to the sheet. Note that the pair of rollers 415 are locally arranged in the depth direction of FIG. 25, and have notches at portions corresponding to the guide plates 405 and 407 so as not to interfere with these guide plates. When one of the first to third sheets is selected, the separation unit 402 moves to the position of the corresponding magazine, and then, the corresponding magazine moves to the separation position. Subsequently, the suction disk moves to the position 403a, sucks one sheet, and moves upward to the position 403 to separate the sheet from the remaining sheets. Thereafter, the suction disk moves to the position 403b to insert the sheet between the rollers 404. The sucking force of the suction disk is then released, and the rollers 404 and 415 are rotated to feed the sheet until the leading end of the sheet is clamped between the rollers 207 and 208. Then, the rollers 404 and 415 move to the broken line positions. At this time, the rollers 416 are located at the broken line positions. Thereafter, a recording operation is performed in the same manner as in the above embodiments, and a recorded sheet is stored in the receive magazine 216. Upon completion of recording, the rollers 416 move to the solid line positions to completely feed the sheet into the receive magazine. The same applies to recording of other types of sheets. Although omitted in this embodiment, movable guides similar to those in FIG. 22 may be arranged at a junction portion of the film paths from the respective supply magazines.

In addition, the present invention is not limited to the above embodiments, and various modifications may be made within the scope of the invention.

For example, the present invention is not limited to an image recording apparatus but may be applied to an image reading apparatus. In this case, the optical unit 14 is replaced by a known optical reading unit, and sheets stored in the supply magazine 2 are replaced by sheets on each of which an image to be read has already been recorded.

The supply magazine need not always be detachable from the main body. For example, the main body may incorporate a mechanism for removing a bright room loading pack, and a pack including a bundle of sheets may be directly loaded into the main body.

The receive magazine may be replaced by a stacker for temporarily stacking recorded sheets to be fed to an automatic developing machine.

Some of sheet trailing end guides in the feed path between the supply magazine to the recording position may be formed on the supply magazine.

Some of sheet trailing end guides may be retracted outside the supply magazine upon attachment/detachment of the magazine and upon opening/closing of the magazine lid, and may enter the supply magazine upon recording/reading of an image.

Sheet leading end guides in the feed path extending from the recording position to the receive magazine may be formed in the receive magazine.

A sheet guide on the side of the receive magazine may be translated from a position outside the magazine, and may enter the magazine.

The sub-scanning speed need not always be a constant speed, but an intermittent feeding operation may be performed.

According to the above-mentioned embodiments, the arrangement of the magazines and the feed paths can be further integrated, thus greatly reducing the size of the apparatus.

Figure 26A:
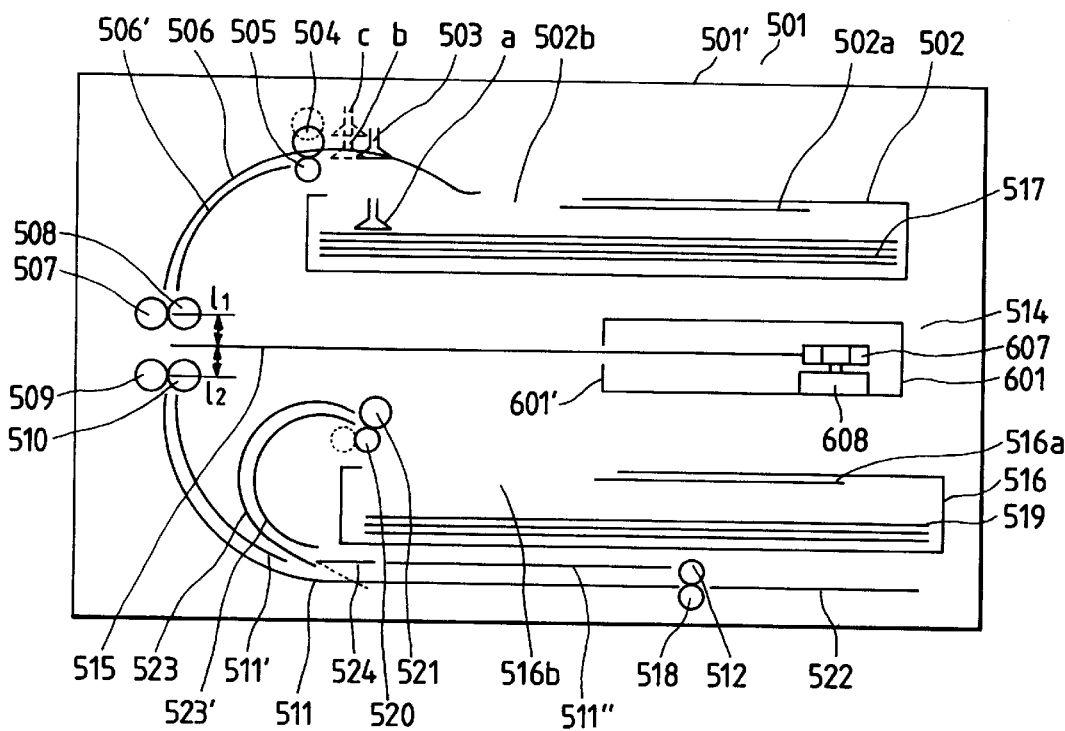
FIGS. 26A and 26B are respectively a front sectional view and a partial explanatory view of a recording apparatus according to the seventh embodiment of the present invention.
Figure 26B:
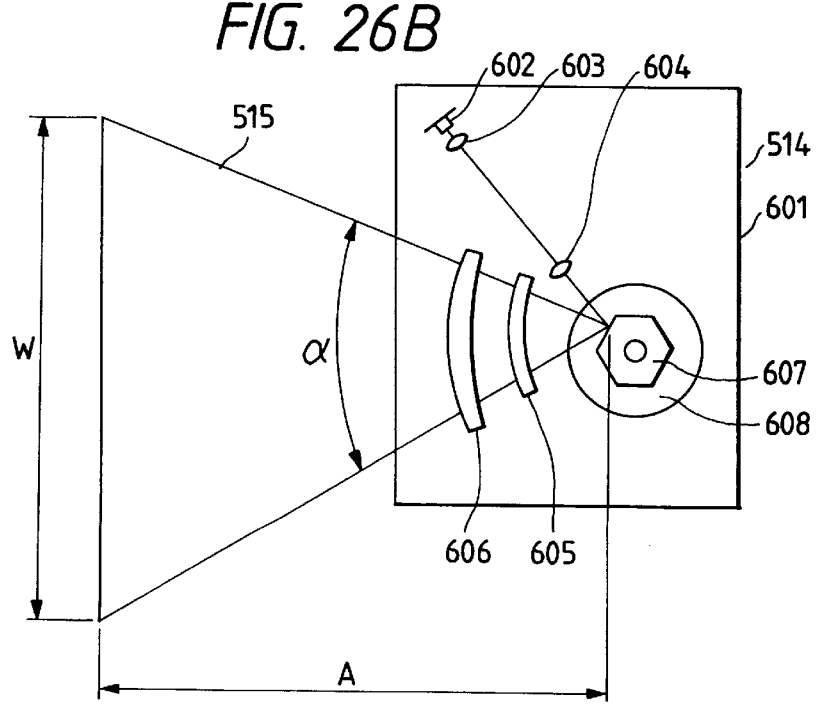
Figure 27:
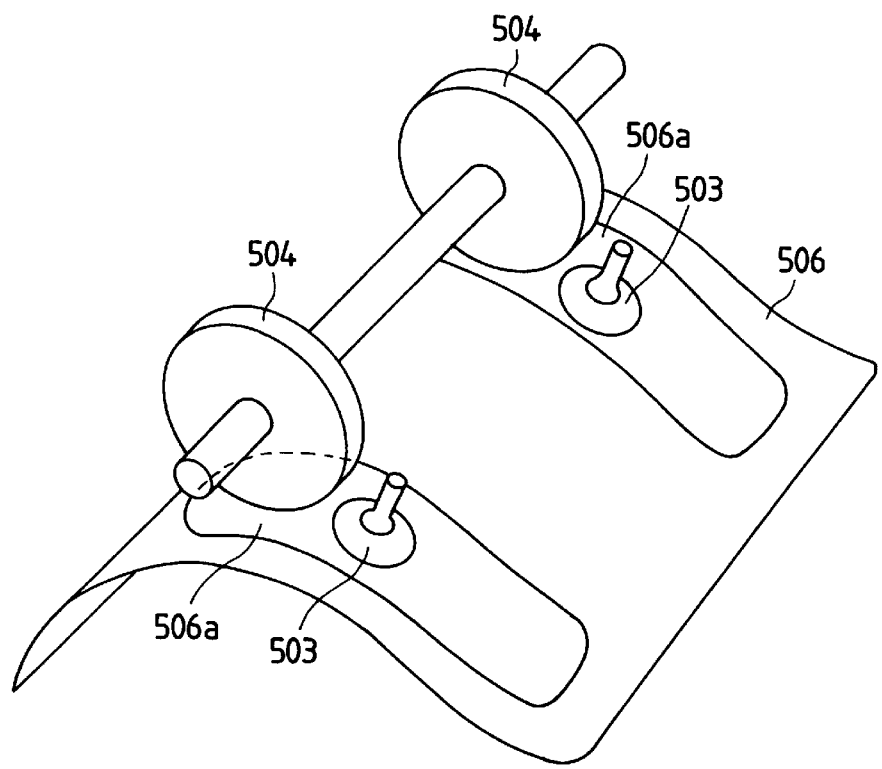
FIG. 27 is a partial explanatory view of the seventh embodiment.
Figure 28:
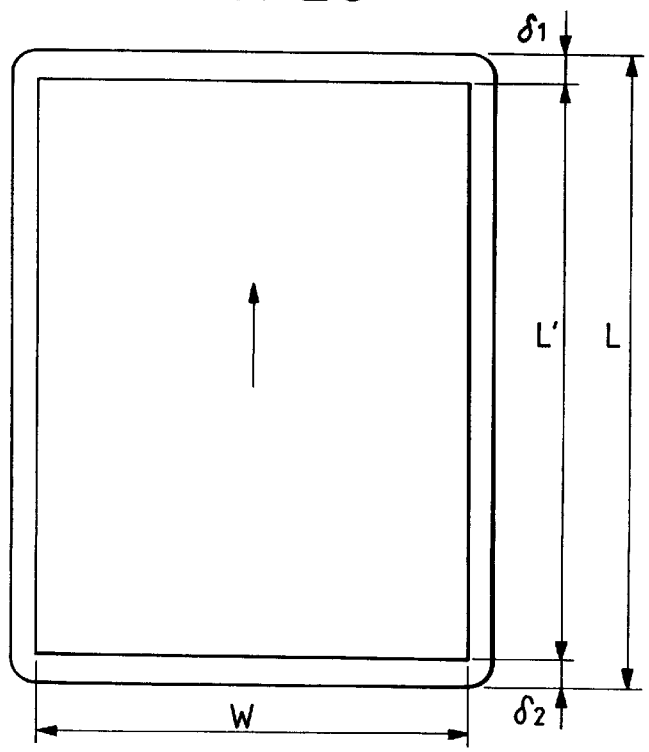
FIG. 28 is an explanatory view of a film sheet.
Figure 29:
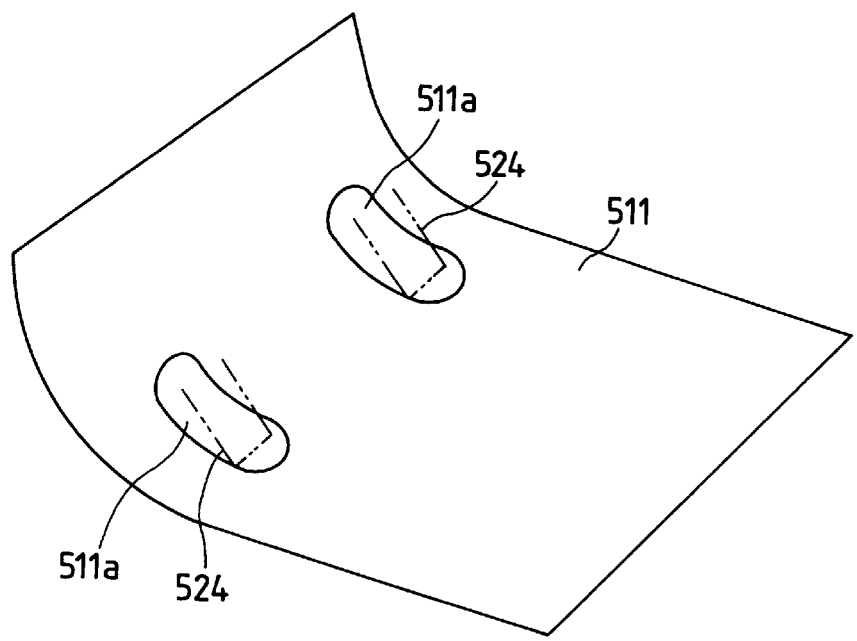
FIG. 29 is a partial detailed view of the seventh embodiment.

A recording apparatus according to the seventh embodiment of the present invention will be described below with reference to FIGS. 26A to 32B. FIG. 26A is a front sectional view of the seventh embodiment of the present invention, FIGS. 26B, 27, and 29 are partial detailed views, FIG. 28 is an explanatory view of a film, and FIGS. 30A to 32B are explanatory views of a sheet feed state.

The arrangement of the apparatus will be briefly described below with reference to FIGS. 26A to 32B. Referring to FIGS. 26A to 32B, an image recording apparatus main body 501 horizontally and parallelly incorporates a supply magazine 502 including stacked unused films 517 and a receive magazine 516 for storing recorded films 519. A cover 501' covers the main body 501 in a light-shielding state. Each film 517 has a silver chloride emulsion layer on only its lower surface. A latent image is formed on the emulsion layer by radiating a very small laser beam spot on the emulsion layer, and an image is formed by developing the latent image using another developing means (in only the description of the following embodiments, radiation of a laser beam will be simply referred to as recording).

The supply and receive magazines respectively have openings 502b and 516b which allow films to enter or come out from the magazines, and lids 502a and 516a are respectively attached to the supply and receive magazines 502 and 516 to be freely opened/closed. When each lid is closed, the interior of the magazine is kept shielded from light. Therefore, both the magazines including films can be unloaded outside the apparatus without exposing the films to external light. A suction disk 503 is movable by a mechanism (not shown), so that the suction disk 503 enters the interior of the supply magazine 502 by a mechanism (not shown), sucks the uppermost one of stacked unused films to pick it up outside the supply magazine 502, and inserts the leading end of the film between a pair of feed rollers 504 and 505.

In this embodiment, since the suction disk contacts a film surface opposite to the emulsion surface, it does not influence the emulsion surface. In some cases, such an influence need not be considered depending on the characteristics of films or the material of the suction disk. In such a case, the suction disk may contact the emulsion surface.

As shown in FIG. 27, a plurality of (two in this embodiment) suction disks 503 are arranged in a direction perpendicular to the film feed direction. The feed rollers 504 and 505 are pivoted by a driving source (not shown) to feed the film to the left in FIG. 26A. The roller 504 has steps, and consists of a plurality of (two in this embodiment) portions (roller portions) contacting a film in the direction perpendicular to the film feed direction, as shown in FIG. 27. The roller 504 can be retracted from the film feed path to a position indicated by a dotted line in FIG. 26A by a mechanism (not shown). A guide plate 506 regulates the position and feed direction of the film during feeding of the film. As described above, since the film has a certain stiffness, when the film is fed by the rollers 504 and 505, the leading end of the film moves along the guide plate 506. The guide plate 506 continuously extends from a position near sub-scanning rollers 507 and 508 (to be described later) to a position above the opening 502b of the supply magazine to have a smoothly curved shape, and notches 506a formed in the guide plate allow the roller portions of the roller 504 and the suction disks to be retracted from the inner side (film feed path) of the guide plate. In place of forming the notches, the guide plate 506 may be divided into a plurality of portions in the sub-scanning direction to avoid portions of the roller portions 504 and the suction disks 503.

A guide plate 506' is arranged between the rollers 505 and 508 to face the guide plate 506, and the guide plates 506 and 506' form a gap (film passage path) through which the film passes. The gap is larger than the thickness of the film but is as small as 10 mm or less. The length of the film passage path connecting between the rollers 504 and 505, and the rollers 507 and 508 is smaller than the length, in the feed direction, of the film. Therefore, the apparatus can be made compact.

Pairs of sub-scanning rollers 507, 508, 509, and 510 can be pivoted by driving sources and power transmission means (not shown), and perform a sub-scanning operation by clamping and feeding a film downward in FIG. 26A. The rollers 507, 508, 509, and 510 undergo high-accuracy servo control, so that they are rotated at uniform speeds. However, in order to obtain high image quality, a variation in load must be minimized. For this reason, when the frictional resistance upon feeding of a film is large, if the load varies at a predetermined rate, the value of the variation in load becomes large. Therefore, in order to minimize the variation in load, it is advantageous to decrease the frictional resistance. For this reason, it is preferable that the surfaces, contacting a film, of the guide plate 506, and the like are designed to have a small frictional resistance upon contacting the film.

An optical unit 514 performs a main scanning operation by deflecting and scanning a light beam 515 onto a film located between the sub-scanning rollers 508 and 510 in the direction substantially perpendicular to the film feed direction. FIG. 26B is a top view of the optical unit 514. Referring to FIG. 26B, a cover 601 covers the optical unit for the purpose of protection and dust-proof of the optical unit. An opening 601' is formed on the cover 601 not to disturb passage of a light beam. A laser 602 radiates a light beam which is intensity-modulated in accordance with image data. Lenses 603 to 606 convert the light beam into light having predetermined characteristics. A rotary polygonal mirror 607 is rotated by a motor 608 at a predetermined speed, thereby scanning the light beam 515 to form a substantially fan-shaped path. If a scanning angle a is too large, the beam shape may be deformed under the influence of aberrations of an optical system, or the defocus amount may increase. For this reason, the scanning angle is normally set to be 30° to 40°. Therefore, a length A, in the light propagation direction, of a path (scanning plane) where light reflected by the rotary polygonal mirror passes until it reaches a film, is about 45 to 50 cm if a 35×43 (cm) film is scanned in the direction of 35 cm, and if an effective width W (FIG. 28) is assumed to be 33 cm. Therefore, the length A becomes equal to or larger than the length, in the feed direction, of the film. Although light can be deflected by, e.g., a mirror in the middle of the scanning plane, a small number of mirrors are preferably used in consideration of an increase in the number of components, the influence of oscillation of mirrors on image quality, and the influence of nonuniformity of the reflection surfaces of mirrors on image quality.

In this embodiment, the scanning plane is arranged parallel to the magazines, and recording is performed at substantially the central portion of a first semi-circular feed path (to be described later). Since the optical unit is arranged in a space defined by the length of the magazine and the radius of the first semi-circular feed path in the right-and-left direction in FIGS. 26A and 26B, and more particularly, the propagation direction of a beam from the light source to the rotary polygonal mirror, and the rotation direction of the rotary polygonal mirror are substantially parallel to the magazine, the apparatus can be rendered compact without arranging any mirrors between the rotary polygonal mirror and the film.

In this embodiment, particularly, since the optical elements of the optical unit can be efficiently arranged in a plane substantially parallel to the supply and receive magazines 502 and 516 in an empty space between the supply and receive magazines 502 and 516, the apparatus can be rendered compact. At the same time, since the feed path from the supply magazine 502 to the receive magazine 516 can be directly utilized as a feed path to the recording position without arranging another feed path to the recording position, the space factor can be improved in this respect as well.

As can be seen from FIG. 26A, the laser beam is radiated on the film from the emulsion surface side. If the base of a film is transparent, recording can also be performed by radiating light from a side opposite to the emulsion surface. In this case, however, since recorded image quality deteriorates under the influence of reflection, refraction, scattering, and the like of light by the transparent layer, light is radiated from the emulsion surface side in this embodiment. For this reason, since the optical unit is arranged between the magazines, the scanning plane is arranged to be parallel to the magazines, and recording is performed at substantially the central portion of the first semi-circular feed path (to be described later), as shown in FIGS. 26A and 26B, the surface, contacting the suction disks, of a film, which is stored in the supply magazine 502 with the emulsion surface facing down, can be a surface opposite to the emulsion surface, and a light beam can be radiated from the emulsion surface side.

FIG. 28 is an explanatory view showing an example of a recorded film. Referring to FIG. 28, the arrow indicates the feed direction of a film, L is the length, in the feed direction, of the film, L' is the length, in the film feed direction, of an effective image region, 61 and 82 are the lengths, in the film feed direction, of the film outside the effective region, and W is the length, in the sub-scanning direction, of the effective image region. In FIG. 26A, a length Q1, in the film feed direction, between the contact point of the rollers 507 and 508, and a point irradiated with the light beam is smaller than the length δ2, and a length l2, in the film feed direction, between the point irradiated with the light beam and the contact point of the rollers 509 and 510 is smaller than the length δ1. For this reason, both a portion irradiated with the light beam at an instance when the leading end of the film is clamped between the rollers 509 and 510, and a portion irradiated with the light beam at an instance when the trailing end of the film is released from the rollers 507 and 508, can be set outside the length L'. At the instance when the leading end of the film is clamped between the rollers 509 and 510, and at the instance when the trailing end of the film is released from the rollers 507 and 508, a large variation in load occurs, and uniformity of the sub-scanning speed is lost, thus causing image nonuniformity. However, with the above-mentioned arrangement, the portions which cause image nonuniformity can be set outside the length L'.

Pairs of feed rollers 512, 518, 520, and 521 are pivoted by driving sources (not shown), and can feed a film. The roller 520 can move to a position indicated by a dotted line in FIG. 26A by a mechanism (not shown). At this position, the roller 520 does not contact the roller 521, and do not clamp a film.

Figure 33A:
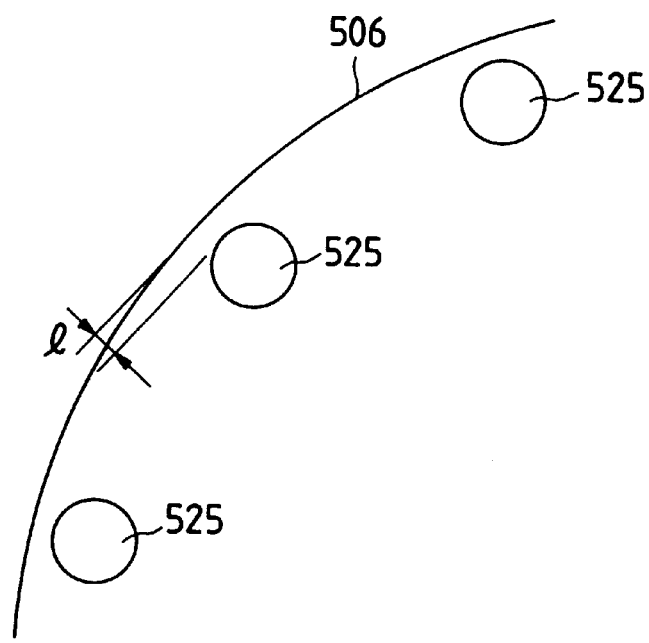
FIGS. 33A and 33B are partial detailed views for explaining a modification of the seventh embodiment.

Film guides (guide plates) 511, 522, and 523 regulate the position and feed direction of a film upon feeding of the film. The film guide 511 is continuously arranged between a position near the rollers 509 and 510 and a position near the rollers 512 and 518. A portion, near the rollers 509 and 510, of the film guide 511 is curved, a portion near the rollers 512 and 518 extends horizontally, and these portions are smoothly continuously formed as a whole. A length, along the guide plate, between the rollers 509 and 510, and the rollers 512 and 518 is smaller than L, and is larger than L−δ2−l2. With this arrangement, a recording nonuniformity portion caused by a variation in load at an instance when the leading end of the film is clamped between the rollers 512 and 518 can be set outside the length L'. Guide plates 511' and 511" are respectively arranged between the roller 510 and movable guides 524 (to be described later) and between the movable guides 524 and the roller 512 to face the guide plate 511, and the guide plates 511, 511', and 511" form a gap through which a film passes. This gap is larger than the thickness of a film but is as small as 10 mm or less. Since the length, along the film guide 511 itself, of the curved portion of the film guide 511 is smaller than the length, in the feed direction, of the film, the apparatus can be rendered compact. A guide plate 523' is arranged between the movable guides 524 and the roller 520 to face the guide plate 523, and the guide plates 523 and 523' form a gap through which a film passes. This gap is larger than the thickness of a film but is as small as 10 mm or less. These guide plates arranged inside the film passage path may be replaced by free rotation rollers 525, as shown in FIG. 33A. In this case as well, when a gap l between the outer circumferential surface of each roller and the inner surface of the guide plate is set to be larger than the thickness of a film but is as small as 10 mm or less, the same effect as that which will be described later with reference to FIG. 31 can be obtained. When the free-rotation rollers are used, since the frictional resistance among a film, the guide plate 506', and the like can be remarkably reduced, such an arrangement is advantageous for elimination of image quality nonuniformity for the reason to be described later.

A substantially right half portion of the film guide 511 and the film guide 522 form a linear film feed path having a length substantially equal to that of one film. Each of the movable guides 524 is movable to a position indicated by a dotted line in FIG. 26A by a driving means (not shown). The film guide 511 has notches 511a at portions corresponding to the movable guides 524 so as not to interfere with the movement of the movable guides 524 (FIG. 29). In place of forming the notches, the film guide 511 may be divided into a plurality of portions in the sub-scanning direction to avoid the portions of the movable guides 524. When the movable guides 524 are located at the dotted line positions and a film located on the right side (FIG. 26A) of the movable guide 524 is pushed by the rollers 512 and 518, the leading end of the film is deflected by the movable guides 524, and moves along the guide plate 523. Note that the guide plate 523 may also be divided into a plurality of portions in the sub-scanning direction.

With the above-mentioned arrangement, the guide plates 506, 506', and 511', and the curved portion of the guide plate 511 form a first semi-circular film feed path connecting the supply magazine 502 and the linear feed path (formed by the guide plate 511" and the linear portion of the guide plate 511), and the guide plates 523 and 523' form a second semi-circular film feed path connecting the linear feed path and the receive magazine 516. Recording is performed at substantially the central portion of the first semi-circular feed path. As is apparent from FIG. 26A, the height of the apparatus is mostly accounted for by the first semi-circular film feed path, and within this height range, the supply magazine, the optical system and its scanning plane, and the receive magazine are parallelly arranged. As described above, in order to reduce a variation in load upon recording, the frictional load between a film and the guide plates must be decreased. As can be estimated from the description of FIGS. 32A and 32B (to be described later), it is advantageous that the guide plates have a larger curvature. More specifically, when the supply magazine, the optical unit, the receive magazine, and the linear feed path are arranged in this order, and the first semi-circular film feed path is arranged to connect the supply magazine at the uppermost position and the linear feed path at the lowermost position, as shown in FIG. 26A, the compact apparatus can be realized by decreasing the height of the apparatus, while the influence of recording nonuniformity upon feeding of a film along the semi-circular feed path can be minimized. Furthermore, the linear feed path and the receive magazine are connected via the second semi-circular feed path. Since a film passes this path after recording, the influence on recording need not be taken into consideration, and the frictional resistance of this path can be set in consideration of only a feeding operation. For this reason, the radius of curvature of this path can be set to be smaller than that of the first semi-circular feed path. Thus, as shown in FIG. 26A, when the second semi-circular feed path is arranged inside the first semi-circular feed path so as not to cross the scanning plane, the height of the apparatus can be decreased.

The operation of this embodiment will be described below with reference to FIG. 26A. When recording is instructed from an instruction means (not shown), the suction disks 503 enter the interior of the supply magazine (position a), and suck and pick up the uppermost film. At this time, the roller 504 is located at the solid line position, and the suction disks insert the leading end of the film between the rollers 504 and 505 (position b). Then, the suction forces of the suction disks are released, the suction disks move to a position c, and the film is separated from the suction disks. The rollers 504 and 505 are rotated, and the film moves along the guide plate 506 upon rotation of the rollers. The film is then clamped between the rollers 507 and 508. The roller 504 is moved to the dotted line position, and the rollers 507 and 508 begin to rotate to insert the leading end of the film between the rollers 509 and 510. Immediately thereafter, the optical unit 514 radiates a laser beam modulated in accordance with an image signal, and recording is performed. In this case, the leading end portion of the film is not irradiated with the laser beam, and becomes transparent after development. When the leading end portion of the film is to be developed in black, a laser beam without an image signal is radiated from a timing immediately before the leading end of the film crosses the laser beam 515. The leading end of the film moves along the guide plate 511 while performing a sub-scanning operation. At this time, the movable guides 524 are located at the solid line position. As described above, since the length, along the film feed path, between the recording portion and the linear feed path is smaller than the length, in the feed direction, of the film, the leading end of the film reaches the linear feed path during recording. Since the curved portion and the linear portion of the film guide 511 are smoothly connected, the film can be prevented from causing recording nonuniformity under the influence of an abrupt variation in load.

Figure 30D:
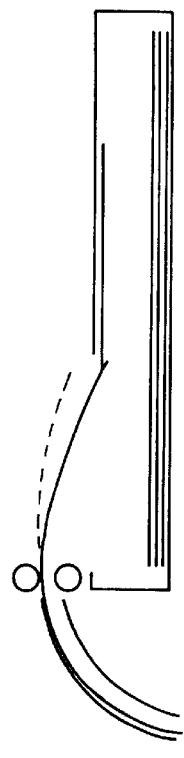
FIGS. 30A to 30E are explanatory views of the feed state of the seventh embodiment.
Figure 30E:
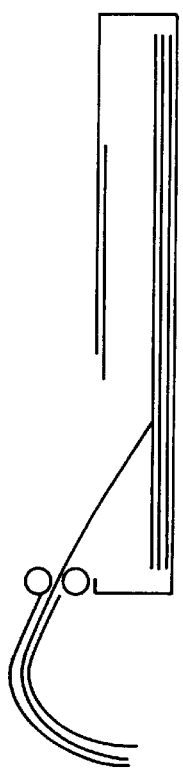
Figure 30A:
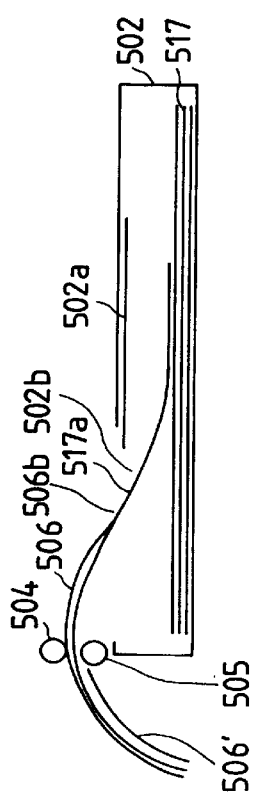
Figure 30B:
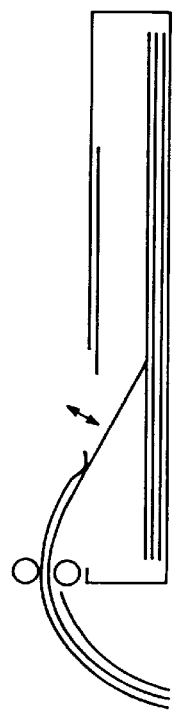
Figure 30C:
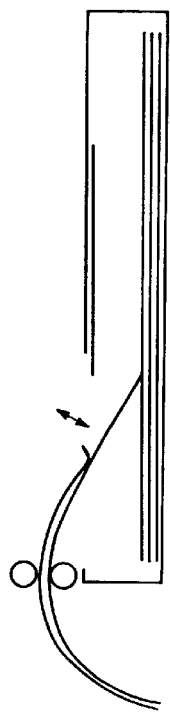

FIGS. 30A to 30E are views for explaining the effect of the guide plate 506. Referring to FIG. 30A, a film 517a is in recording. As described above, since the length of the film feed path connecting the rollers 507 and 508, and the rollers 504 and 505 is smaller than the length, in the feed direction, of the film, the trailing end of the film is still present in the supply magazine at the beginning of recording. As recording progresses, the trailing end of the film slides along the surface of the second film (FIG. 30A), and is finally separated and lifted from the second film. In this case, as shown in FIG. 30A, since the guide plate 506 extends to a proper position on the right side of the center of the opening 502b of the supply magazine to bring its right end 506b close to the magazine, the state of the trailing end portion of the film immediately before the film is separated from the second film (FIG. 30B) can be substantially the same as the state of the trailing end of the film after the film is separated (FIG. 30C) in the direction of an arrow in FIGS. 30B and 30C. Thus, when the film in recording is separated from the second film, it can be prevented from fluttering in the direction of the arrow in FIGS. 30B and 30C, thereby avoiding recording nonuniformity. FIG. 30D shows a case wherein the guide plate 506 does not extend to a position above the opening of the magazine. In this case, image quality nonuniformity is caused by a shock and frictional resistance generated when the trailing end contacts the distal end of a shutter of the magazine, and a shock generated by leaping of the trailing end, as indicated by a dotted line in FIG. 30D, when the trailing end leaves the distal end of the shutter. The right end 506b of the guide plate can also prevent the trailing end of the film from contacting the distal end of the shutter. When the guide plates 506 and 506' are formed to have shapes, as shown in FIG. 30E, i.e., when portions, adjacent to the rollers 504 and 505, of the guide plates 506 and 506' are designed to have shapes for directing the film feed path toward the magazine, the same effect as described above can be obtained. In this case, the film feed path locally has a small curvature, and the resistance may slightly increase. However, since the guide plate 506 does not cover the opening of the magazine, a film which jams in the magazine can be easily removed.

As recording further progresses, the trailing end of the film moves along the guide plate 506. As described above, since the guide plate 506 smoothly and continuously extends from the position near the rollers 507 and 508 to the right end 506b of the guide plate, the trailing end of the film can be prevented from receiving a shock that influences recording when the trailing end of the film moves along the guide plate 506.

Figure 31:
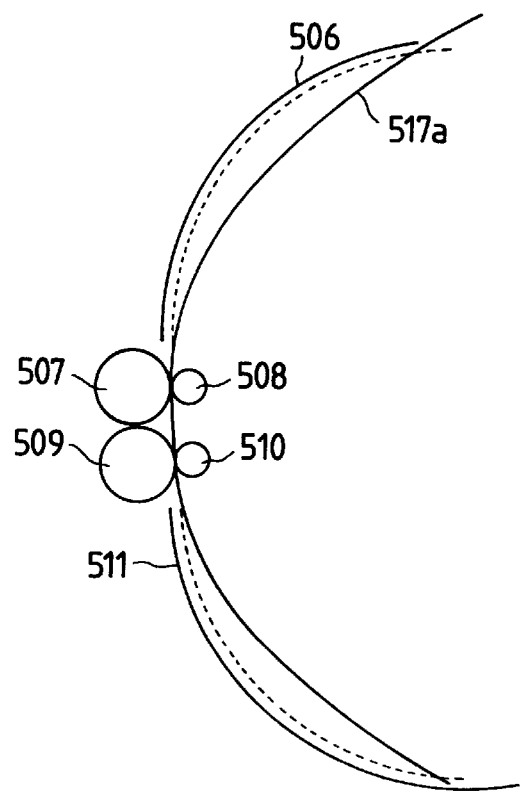
FIG. 31 is a comparative view for explaining the effect of the seventh embodiment.
Figure 32A:
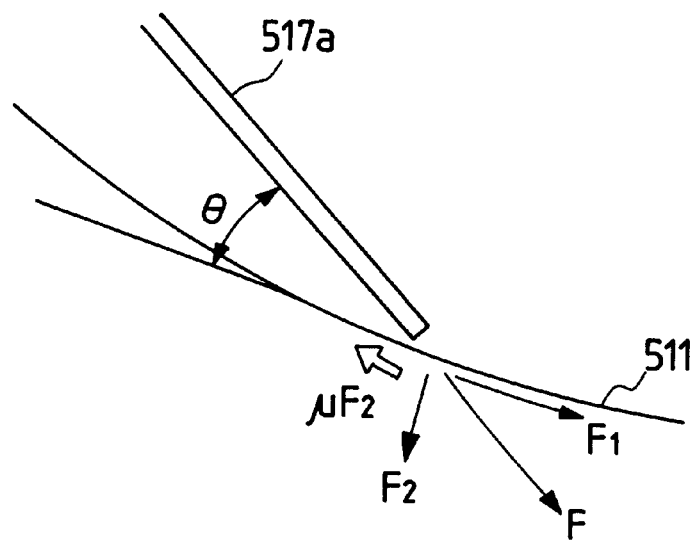
FIGS. 32A and 32B are comparative views for explaining the effect of the seventh embodiment.
Figure 32B:
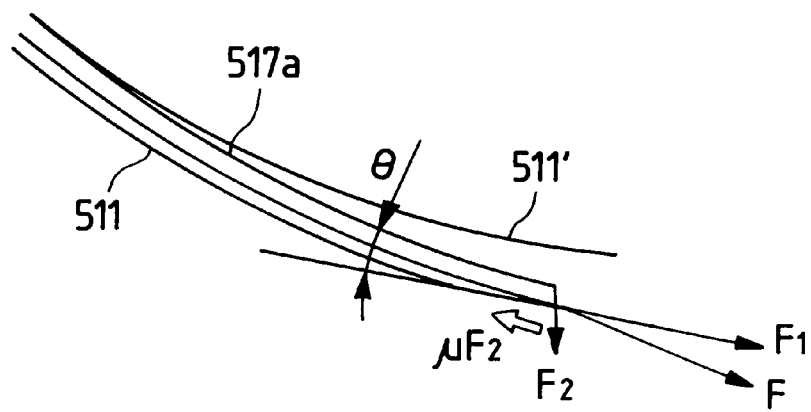

FIGS. 31 to 32B are views for explaining the effect of the inner guide plates 506', 511', and 511". FIG. 31 shows a case wherein no inner guide plates are arranged. In this case, while the film is subjected to recording, the film vibrates between a solid line and a dotted line in FIG. 31, thus causing recording nonuniformity. FIGS. 32A and 32B show states wherein the leading end of the film contacts the film guide 511. FIG. 32A shows a case wherein no film guide 511' is arranged, and FIG. 32B shows a case wherein the film guide 511' is arranged. If the angle defined between the film and the guide plate is represented by θ, the moving force of the leading end of the film is represented by F, the partial force of the force F in a direction tangent to the guide plate is represented by F1, the partial force of the force F in a direction normal to the guide plate is represented by F2, and the coefficient of friction between the leading end of the film and the guide plate is represented by $\mu$, since θ is large in FIG. 32A, $\mu$F2 also becomes large. Therefore, the film is easily influenced by a variation in load, and easily causes recording nonuniformity. Because θ is small in FIG. 32B, $\mu$F2 is also small, the variation in load can be reduced, and recording nonuniformity does not easily occur. As for the guide plate 523', it need not always be arranged since the film is not subjected to recording. However, the guide plate 523' can decrease the frictional resistance during feeding if it is arranged. In some cases, these inner guide plates may be omitted depending on the characteristics of the film, and the allowable range of recording nonuniformity. In such a case, these guide plates can be omitted.

Referring back to FIG. 26A, the radiation of the laser beam ends immediately before the leading end of the film reaches the rollers 512 and 518. If the trailing end portion of the film is to be developed in black, a laser beam without an image signal is successively radiated. As described above, immediately before the trailing end of the film is released from the rollers 509 and 510, the leading end of the film is clamped between the rollers 512 and 518, and the trailing end of the film is fed to the right in FIG. 26A until it passes the position of the movable guides 524.

When a detection means (not shown) detects that the trailing end of the film has passed the position of the movable guides 524, the movable guides 524 move to the dotted line positions, the rollers 512 and 518 are rotated in the reverse direction to feed the film to the left in FIG. 26A, and the leading end of the film moves along the guide plate 523. At this time, the roller 520 is located at the solid line position, and the leading end of the film is clamped between the rollers 520 and 521. Since the rollers 520 and 521 are still being rotated in a direction to feed the film to the right, they feed the film into the receive magazine. When the film is completely fed into the receive magazine, it normally drops into the receive magazine by the gravity. However, in some cases, the trailing end of the film may be caught between the rollers 520 and 521 due to a strong frictional resistance, and the film may not drop into the magazine. In order to reliably drop the film into the receive magazine even in such a case, the roller 520 moves to the dotted line position.

When recording is to be continuously performed, the same operations as described above are repeated. Alternatively, when the trailing end of the film has passed the rollers 504 and 505 during recording on the film, the suction disks may be moved to the position a to start the separation operation of the next film. Thus, the number of films to be processed per unit time (throughput) can be improved.

When the predetermined recording operation ends, the receive magazine 516 is unloaded and is subjected to developing processing in another automatic developing machine.

Figure 33B:
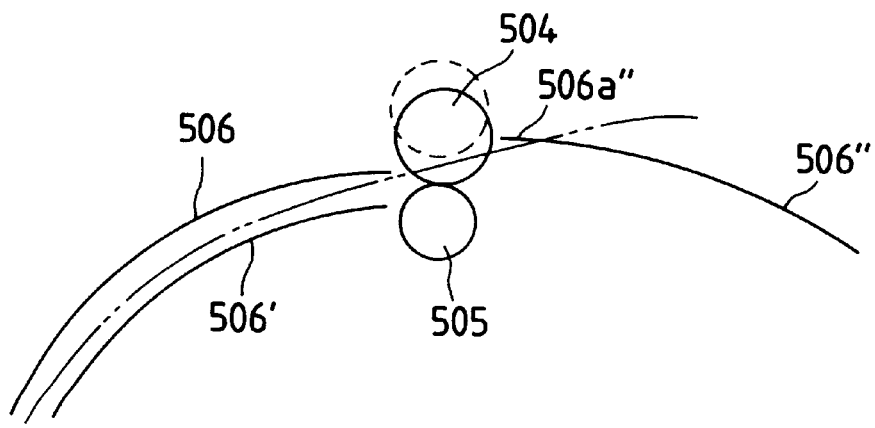

FIG. 33B shows a modification of the arrangement near the rollers 504 and 505. Referring to FIG. 33B, the roller 504 comprises a roller having the same diameter in the main scanning direction in place of the roller with steps. The guide plate 506 is divided at the position of the roller 504, and its right portion (FIG. 33B) corresponds to a guide plate right end portion 506" which is arranged at a level slightly higher than that of the guide plate 506. An alternate long and two short dashed line indicates the path of the trailing end of a film formed when the guide plate right end portion 506" is not arranged. When an end portion 506"*a* at the side of the roller 504 of the guide plate right end portion 506" is arranged to extend outside the above-mentioned path, the trailing end of the film can be prevented from immediately leaping when it leaves the guide plate right end portion 506" during recording (the roller 504 is located at the dotted line position).

Figure 34A:
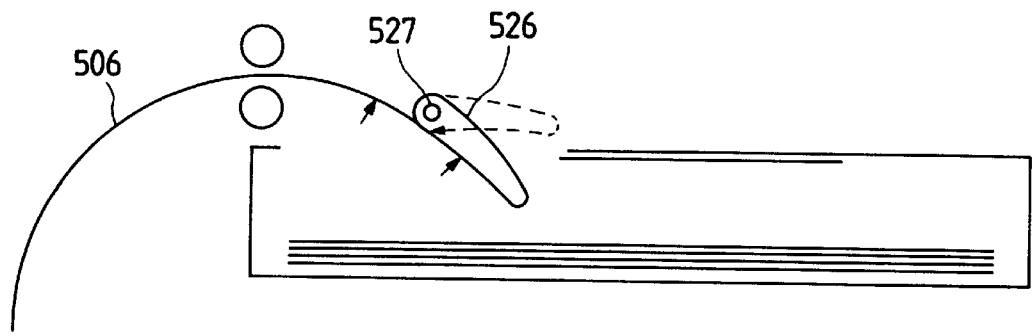
FIGS. 34A and 34B are partial detailed views for explaining another modification of the seventh embodiment.
Figure 34B:
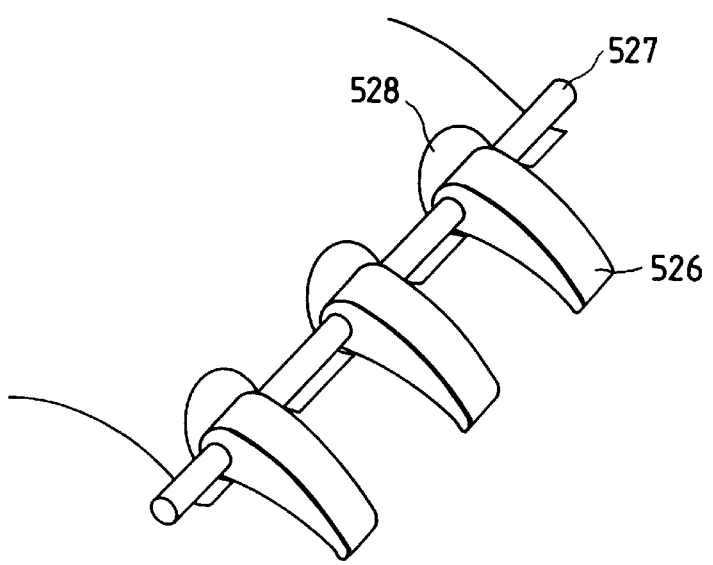

FIGS. 34A and 34B are explanatory views of another modification of the arrangement near the opening of the supply magazine. FIG. 34A is a partial sectional view of the supply magazine portion, and FIG. 34B is an explanatory view of a guide member portion. Guide members 526 are fixed to a shaft 527 which can be pivoted by a driving means (not shown), and are movable to a dotted line position in FIG. 34A. When the supply magazine is attached/detached, and when the shutter is closed, the guide members 526 are located at the dotted line position, and when the shutter is opened and the film is fed, the guide members 526 move to the solid line position. At this position, the guide members 526 form a surface (a surface indicated by an arrow in FIG. 34A) smoothly continuous with the guide plate 506.

Figure 36:
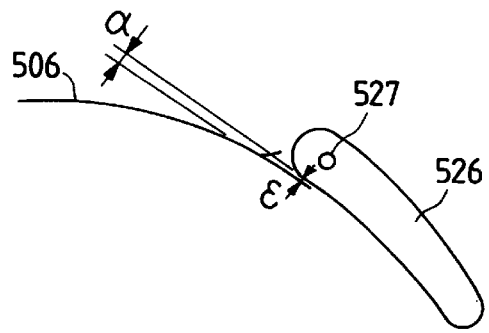
FIG. 36 is a partial detailed view for explaining the modification in FIGS. 34A and 34B.

When such a guide member is added, the effect described above with reference to FIG. 30 can be further assured although a mechanism is slightly complicated. More preferably, as shown in FIG. 34B, notches 528 are formed in the guide plate 506, and have a nest relationship with the guide members 526. With this arrangement, the surfaces, contacting the film, of the guide plate 506 and the guide members 526 can be smoothly connected. As a simpler arrangement, as shown in the side view of FIG. 36, the guide member 506 and the guide members 526 may be separated from each other when viewed from the front side of FIG. 36. In this case, a stagger e between the surfaces, contacting the film, of the guide plate 506 and the guide members 526 is set to be very small, and the angle defined between the surfaces contacting the film is set to be an angle close to 0°, thereby obtaining substantially the same effect as described above.

Figure 35A:
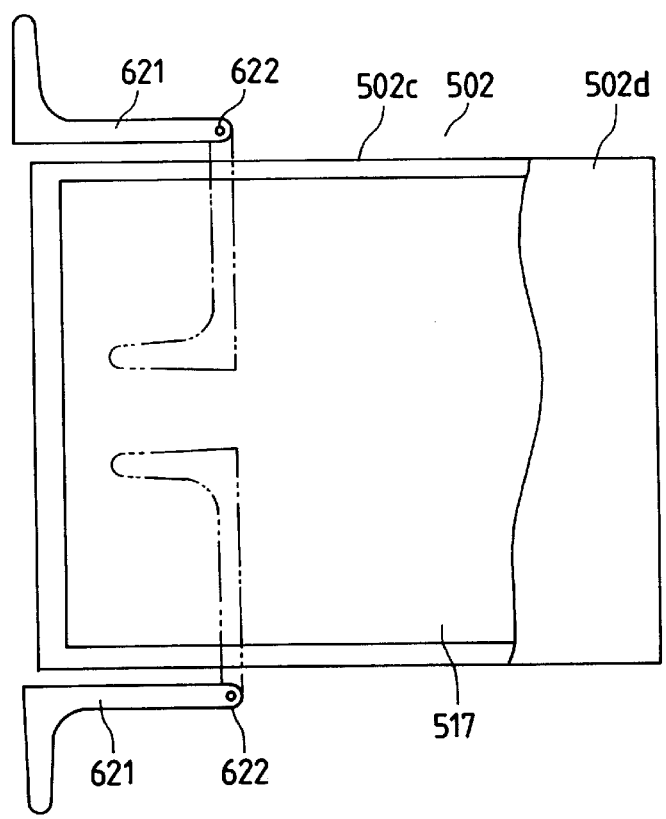
FIGS. 35A to 35C are partial detailed views for explaining still another modification of the seventh embodiment.
Figure 35B:
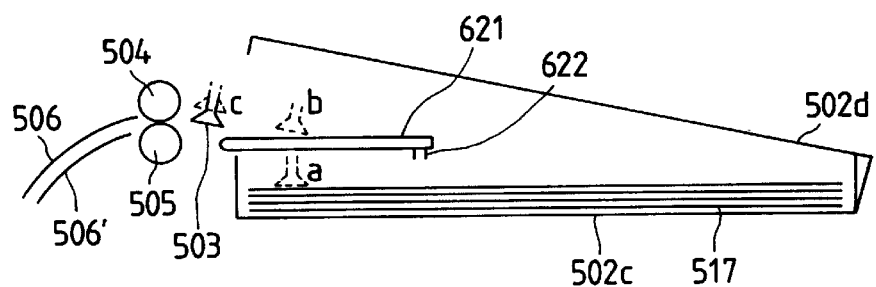
Figure 35C:
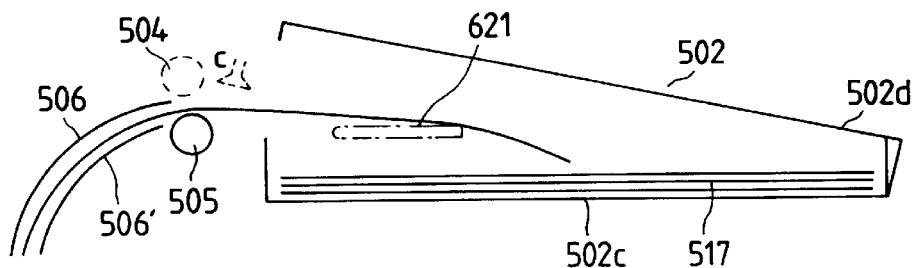

FIGS. 35A to 35C are explanatory views showing still another modification of the arrangement near the supply magazine. FIG. 35A is a top view, and FIGS. 35B and 35C are explanatory side views of the feed state. Referring to FIGS. 35A to 35C, the supply magazine 502 is constituted by a box-like member 502*c* with an upper opening, and a lid 502*d* pivotally attached to the right side of the member 502*c*. When the lid is closed, the interior of the magazine is kept shielded from light, and in this state, the magazine is attached/detached to/from the main body 501. When the lid is opened, films can be placed in the supply magazine or removed from it. Inside the main body 501, the lid 502*d* is lifted up by a mechanism (not shown), as shown in FIG. 35B, and in this state, the suction disks are movable from the solid line position to positions a, b, and c in turn by a mechanism (not shown). Levers 621 are pivoted about shafts 622 by a mechanism (not shown), and are movable to positions indicated by alternate long and two short dashed lines in FIG. 35A. The two pairs of the levers 621 and the shafts 622 may be arranged at the two sides of the magazine, as shown in FIG. 35A, or either one pair may be arranged. Initially, each lever 621 is located at the solid line position.

When recording is instructed, the lid 502*d* is lifted up, and the suction disks move to the position a to chuck and pick up the uppermost film in the magazine. The suction disks then insert the picked-up film between the rollers 504 and 505 at the solid line position via the position b, and the suction forces of the suction disks are released at that position. At the same time, the suction disks move to the position c, and the film is separated from the suction disks. The rollers 504 and 505 are rotated to move the film along the guide plate 506 and to insert the leading end of the film between the rollers 507 and 508. Then, the shafts 622 move to the position indicated by the alternate long and two short dashed line so as to be located below the film, and the roller 504 moves to the dotted line position, as shown in FIG. 35C. In this state, the film is lifted up by the levers 621, and its trailing end is separated from the next film. Alternatively, the trailing end of the film lightly contacts the next film even if it is not separated therefrom. The rollers 507, 508, 509, and 510 are rotated to perform recording. In this case, unlike in FIG. 26A, since the trailing end of the film does not contact the next film or it lightly contacts it, the frictional resistance can be further decreased, and hence, a variation in load is reduced, thus effectively eliminating recording nonuniformity. When the trailing end of the film leaves the levers 621, since the film is gradually lifted up due to its stiffness, it will not immediately leap.

Figure 37:
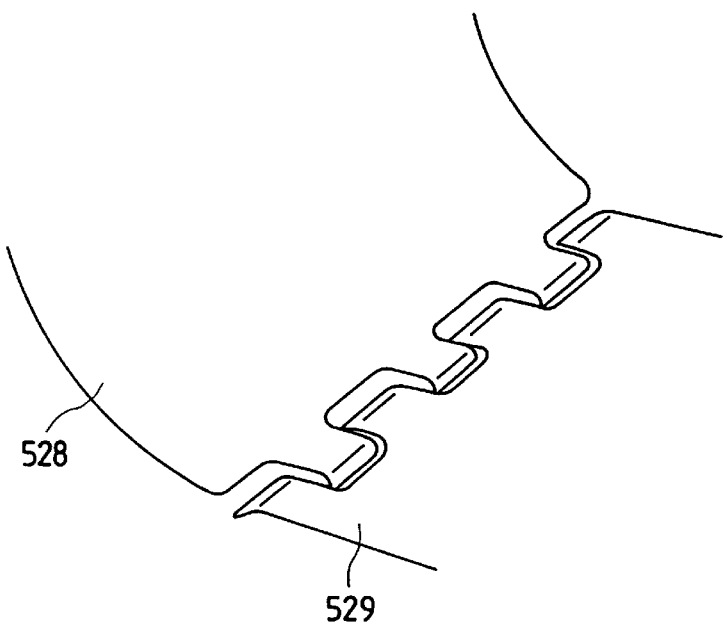
FIG. 37 is a partial detailed view for explaining still another modification of the seventh embodiment.
Figure 38:
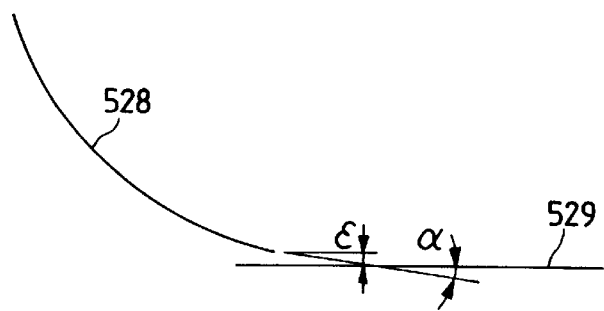
FIG. 38 is a partial detailed view for explaining the modification shown in FIG. 37.

FIG. 37 is an explanatory view showing still another modification of the arrangement near the joint portion between the arcuated portion and the linear portion of the film guide 511. In this modification, the film guide 511 is divided into an arcuated portion 528 and a linear portion 529 in place of the film guide 511 in FIG. 26A. The film guide 511 has a considerably large size, and is inconvenient for handling. However, when the film guide 511 is divided into two portions in this manner, ease in parts handling, assembling, and services can be improved. In this case, as in FIG. 34B, the joint portions of the portions 528 and 529 are formed to have a nest relationship, so that their film contact surfaces are smoothly continuous with each other, thus obtaining substantially the same effect as that obtained using the integrated film guide. Also, as shown in the side view of FIG. 38, the portions 528 and 529 may be separated from each other when viewed from the front side of FIG. 38. In this case, a stagger e between the surfaces of the two portions is set to be very small, and the angle defined between the surfaces is set to be an angle close to 0°, thereby obtaining substantially the same effect as described above.

Figure 39:
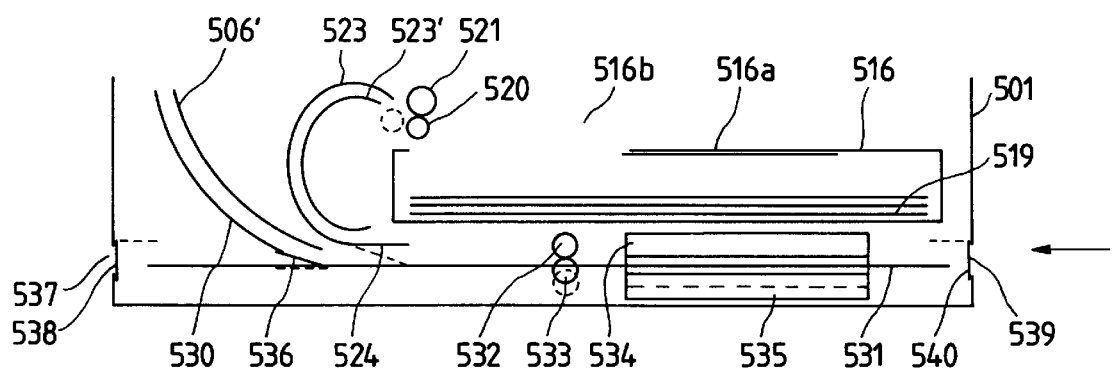
FIG. 39 is a partial detailed view for explaining still another modification of the seventh embodiment.
Figure 40:
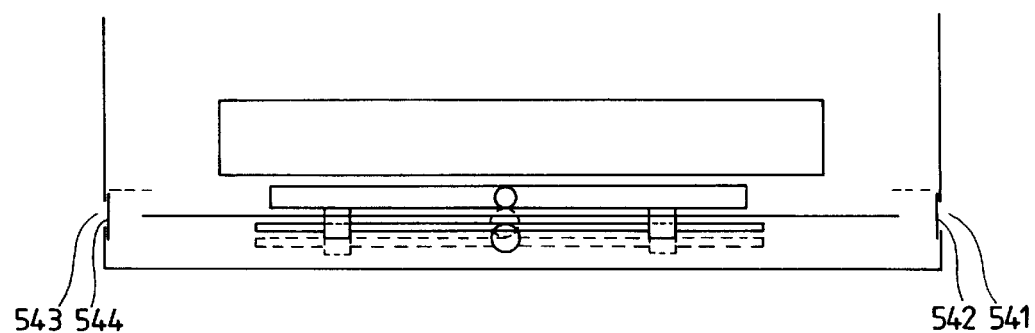
FIG. 40 is a partial detailed view for explaining the modification shown in FIG. 39.
Figure 41:
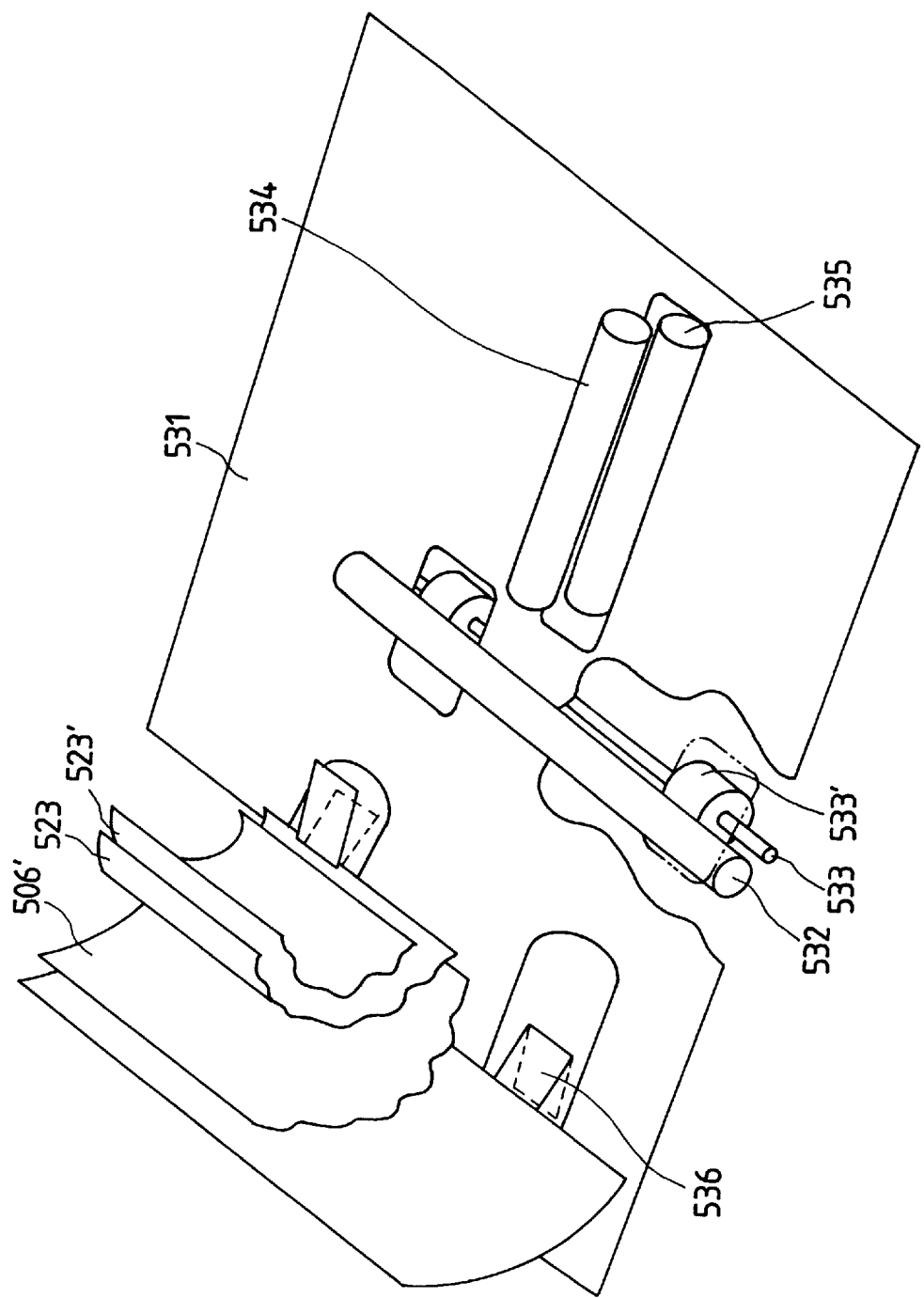
FIG. 41 is a partial detailed view for explaining the modification shown in FIG. 39.

FIGS. 39 to 41 are views showing still another modification of the partial arrangement. FIG. 39 is a view substantially corresponding to a lower ⅓ portion of FIG. 26A, FIG. 40 is a view when viewed from the direction of an arrow in FIG. 39, and FIG. 41 is a partial perspective view. A guide plate 530 has the same function as the film guide 511 but is constituted by only a curved portion. A guide plate 531 corresponds to a combination of the linear portion of the film guide 511 and the film guide 522, and is extended to the left side (FIG. 39) of the apparatus. Rollers 532 and 533 have the same function as the rollers 512 and 518, and are arranged at positions closer to the left end of the apparatus than those of the rollers 512 and 518. In the case of FIG. 26A, the size of a film to be used must be the same in the feed direction of the film. However, in the case of FIG. 39, a film which has a smaller dimension in the feed direction of the film, e.g., an 8×10 (inch) film can be utilized. The length, along the film feed path, between the rollers 509 and 510, and the rollers 532 and 533 is set to be smaller than the length, in the feed direction of the 8×10 (inch) film, e.g., 10 inches. In the roller 533, only a plurality of roller portions 533' arranged in the main scanning direction project upward from the guide plate. The guide plate 531 has notches at portions corresponding to the roller portions 533', as shown in FIG. 41. The roller 533 is movable to a dotted line position in FIG. 39 by a driving mechanism (not shown). At this position, the roller portions 533' are retracted below the guide plate. A pair of feed rollers 534 and 535 are rotated by a driving mechanism (not shown) and are used for feeding a film in a direction perpendicular to the feed direction of the rollers 532 and 533. The roller 535 is movable to a dotted line position in FIG. 39 by a driving mechanism (not shown), and at the solid line position, the roller 535 is retracted below the guide plate 531. The roller 535 contacts the roller 534 at the dotted line position. The guide plate 531 has a notch at a portion corresponding to the roller 535, as shown in FIG. 41. Movable guide plates 536 are movable to dotted line positions by a driving mechanism (not shown). The guide plate 531 has notches at portions corresponding to the movable guide plates 536, as shown in FIG. 41. At the solid line positions, the movable guide plates 536 smoothly connect the guide plates 530 and 531. At the dotted line positions, the movable guide plates 536 are retracted below the guide plate 531. Openings 537, 539, 541, and 543 are formed in the cover 501' which covers the main body 501 in a light-shielding state, and allow a film to pass therethrough. Shutters 538, 540, 542, and 544 respectively cover the openings 537, 539, 541, and 543 in a light-shielding state, and are movable to dotted line positions in FIG. 39 by a driving mechanism (not shown). When a film passes the corresponding opening, each shutter is located at the dotted line position. An automatic developing machine for developing a recorded film, or a feeding unit for feeding a film to the automatic developing machine is connected to one of the openings, so that a recorded film can be automatically developed. Normally, the automatic developing machine is connected to one of the four openings, and other openings are not arranged or are always closed.

The operation of this modification will be described below. A user selects in advance using a control apparatus whether a recorded film is stored in the receive magazine or is directly fed to the connected automatic developing machine. Other operations up to the beginning of recording are the same as those described above with reference to FIG. 26A. During recording, the roller 533 is located at the dotted line position to prevent an abrupt variation in load occurring when a film which is being recorded is clamped between the rollers 532 and 533. At this time, the roller 535 is located at the solid line position (a position where the rollers are retracted below the guide plate), and the movable guide plates 536 and the movable guides 524 are also located at the solid line positions.

Upon completion of recording, the roller 533 moves to the solid line position, and subsequently feeds the film to the right until the trailing end of the film passes the position of the movable guides 524. When the receive magazine is selected, the movable guides 524 move to the dotted line positions, the rollers 532 and 533 feed the film to the left, and the leading end of the film is clamped between the rollers 520 and 521 along the guide plate 523. Thereafter, the film is fed into the receive magazine in the same manner as in FIG. 26A.

When the automatic developing machine is selected, after the trailing end of the film passes the position of the movable guides 524, the film is fed as follows depending on the connected direction of the automatic developing machine. When the automatic developing machine is connected to the left side in FIG. 39 of the apparatus main body 501, the movable guide plates 536 and the shutter 538 move to the dotted line positions. The rollers 532 and 533 are rotated in the reverse direction to feed the film to the left in FIG. 39, and the film is fed to the automatic developing machine or the feeding unit via the opening 537.

When the automatic developing machine is connected to the right side in FIG. 39 of the apparatus main body 501, the shutter 540 moves to the dotted line position. Then, the rollers 532 and 533 successively feed the film to the right in FIG. 39, and the film is fed to the automatic developing machine or the feeding unit.

When the automatic developing machine is connected to the rear side in FIG. 39 (the right side in FIG. 40) of the apparatus main body 501, the rollers 532 and 533 stop after they move the film to a position corresponding to the opening 541, and thereafter, the rollers 533 and 535 move to the dotted line positions. Then, the shutter 542 moves to the dotted line position, and the rollers 534 and 535 begin to rotate to move the film to the rear side in FIG. 39 of the apparatus main body 501. As a result, the film is fed to the automatic developing machine or the feeding unit via the opening 541.

When the automatic developing machine is connected to the front side in FIG. 39 (the left side in FIG. 40) of the apparatus main body 501, the rollers 532 and 533 stop after they move the film to a position corresponding to the opening 543, and thereafter, the rollers 533 and 535 move to the dotted line positions. Then, the shutter 544 moves to the dotted line position, and the rollers 534 and 535 begin to rotate to move the film to the front side in FIG. 39 of the apparatus main body 501. As a result, the film is fed to the automatic developing machine or the feeding unit via the opening 543.

When only a 35×43 (cm) film is used, the rollers 532 and 533 may be arranged at the same positions as the rollers 512 and 518 in FIG. 26A, and the rollers 534 and 535 may be arranged on the left side of the rollers 532 and 533.

In FIG. 26A, the positions of the magazines and the feed path may be reversed vertically.

Figure 42:
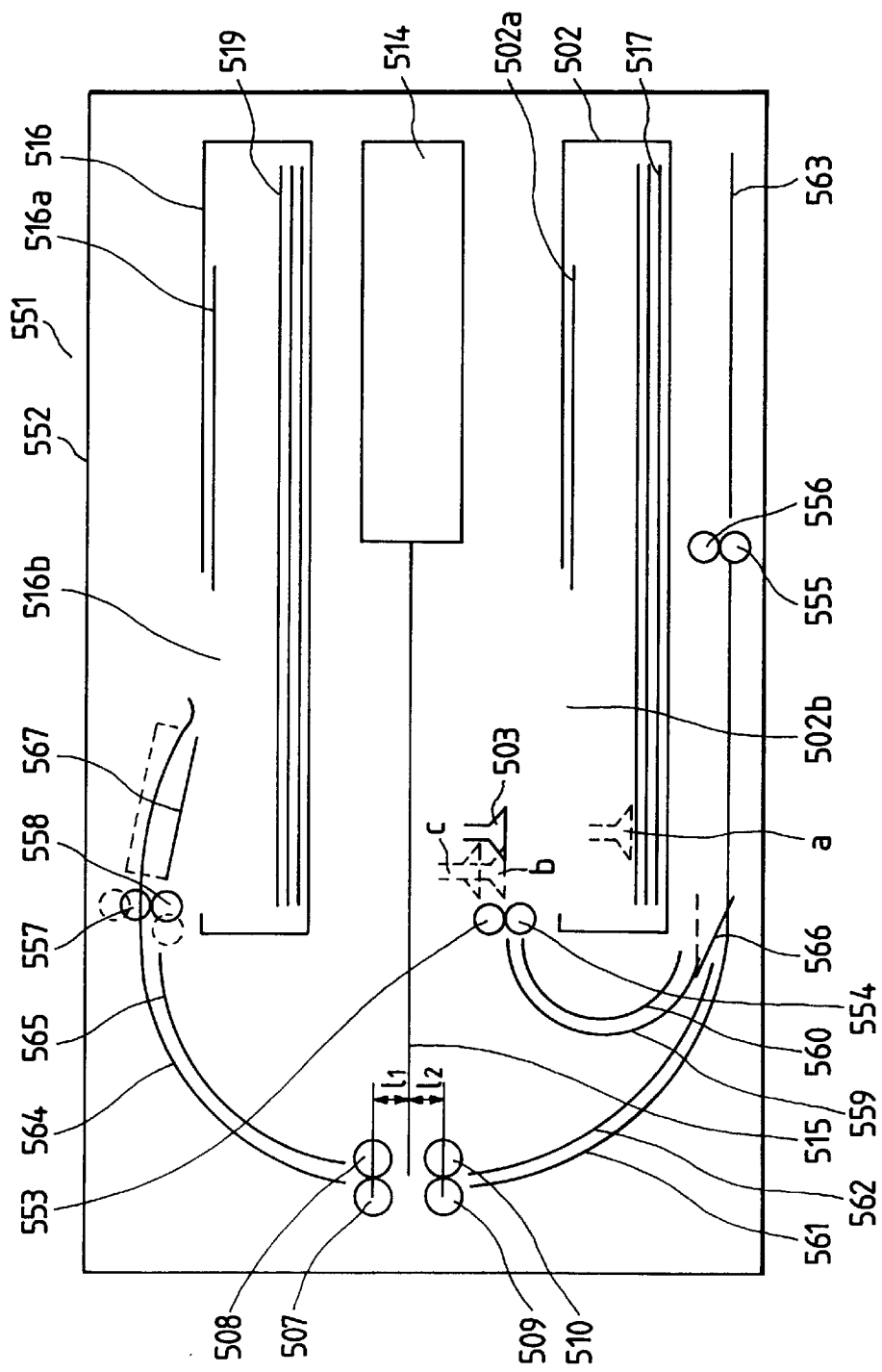
FIG. 42 is a front sectional view showing the eighth embodiment of the present invention.
Figure 43:
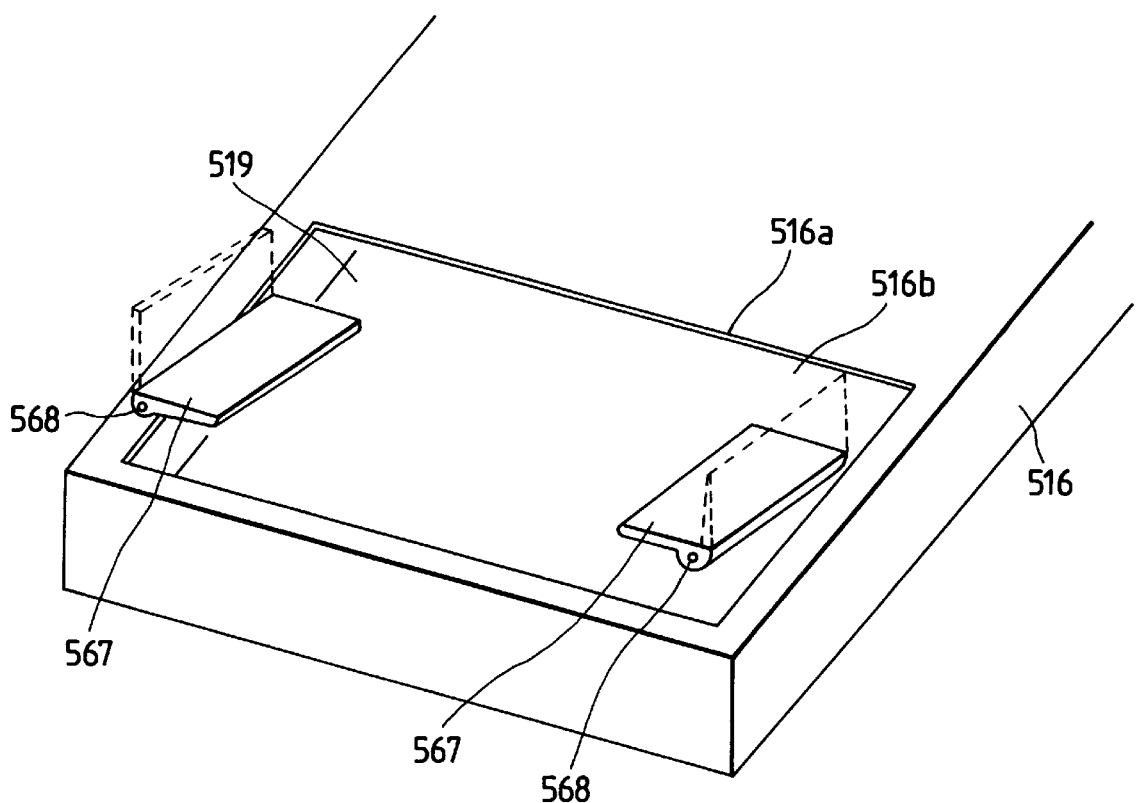
FIG. 43 is a partial detailed view of the eighth embodiment.

FIG. 42 is a schematic sectional view showing the arrangement of an image recording apparatus according to the eighth embodiment of the present invention. Referring to FIG. 42, an image recording apparatus main body 551 includes a cover 552 for covering the entire main body 551 in a light-shielding state, and pairs of feed rollers 553 and 554, 555 and 556, and 557 and 558 which are rotated by a driving means (not shown) and are used for feeding a film. The rollers 557 and 558 are respectively movable to dotted line positions in FIG. 42 by another driving means. Pairs of opposing guide plates 559 and 560, 561 and 562, and 564 and 565 form a film feed path having a small width in the same manner as the guide plates 506 and 506' in FIG. 26A. A guide plate 563 guides a film. Note that the length, along the guide plate, between the rollers 555 and 556, and the rollers 509 and 510 is smaller than L in FIG. 28, and is larger than (L−δ1−l2). With this arrangement, recording nonuniformity caused by a variation in load can be prevented from occurring within L'. Note that the guide plate 564 extends to a position above the opening 516b beyond the positions of the rollers 557 and 558. The roller 557 has steps as in the roller 504 in FIG. 26A, i.e., has a plurality of portions (roller portions) contacting a film in a direction perpendicular to the film feed direction. The guide plate 564 has notches at portions corresponding to the roller portions. A plurality of movable guide plates 566 are locally arranged in the depth direction in FIG. 42, and are movable to a dotted line position in FIG. 42 by a driving means (not shown). Note that the guide plate 561 has notches at portions corresponding to the movable guide plates 566. FIG. 43 is a partial explanatory view of a portion near the opening of the receive magazine. Movable guide plates 567 are rotatable about shafts 568, and are movable to dotted line positions in FIG. 43 by a driving means (not shown). Note that portions, corresponding to the movable guide plates 567, of the guide plates 564 have a smaller width, so that these movable plates do not interfere with each other. When the movable guide plates 567 are located at the solid line positions, they support a film so as not to drop into the receive magazine, and when the plates 567 are located at the dotted line positions, the film is allowed to drop into the receive magazine.

The operation of this embodiment will be described below. When recording is instructed by an instruction means (not shown), the suction disks 503 move to the position a to suck the uppermost film. Then, the suction disks 503 pick up the film while sucking it, and move to the position b to insert the leading end of the film between the rollers 553 and 554. Thereafter, the suction forces of the suction disks are released, the suction disks move to the position c, and the film is released from the suction disks. Then, the rollers 553 and 554 begin to rotate to move the leading end of the film along the guide plate 559. At this time, the movable guide plates 556 are located at the solid line positions, and the leading end of the film is fed to the right in FIG. 42 along the guide plates 559, 561, and 563. At this time, the rollers 555 and 556 also begin to rotate to successively feed the film to the right in FIG. 42, and stop when the trailing end of the film has passed the movable guide plates 566. Thereafter, the movable guide plates 566 move to the dotted line positions, and the rollers 555 and 556 are rotated in the reverse direction, thereby feeding the film to the left in FIG. 42. Subsequently, the leading end of the film moves along the curved portion of the guide plate 561, and is clamped between the rollers 509 and 510. Immediately thereafter, the optical unit 514 radiates a laser beam modulated in accordance with an image signal, and recording is performed in the same manner as in FIG. 26A. In this embodiment, at the beginning of recording, the film completely exits from the supply magazine 2, is also separated from the rollers 555 and 556, and contacts only the guide plates 561 and 562, except for the rollers 507, 508, 509, and 510. Therefore, if the guide plates 561 and 562 are smoothly formed, no recording nonuniformity occurs.

Prior to recording, the roller 557 is located at the dotted line position, the roller 558 is located at the solid line position, and the movable guide plates 567 are located at the solid line positions. As recording progresses, the leading end of the film moves along the guide plate 564 and enters the receive magazine 516. In this case, although the leading end of the film gradually directs downward due to the gravity, the leading end of the film is regulated by the movable guide plates 567 to have a predetermined contact angle or less to a recorded film 519. When this angle is large, recording nonuniformity occurs due to a shock upon contacting of the films. When this angle is set to be a predetermined value or less, recording nonuniformity can be prevented. The movable guide plates 567 and the guide plate 564 form a narrow gap (film feed path), and prevent recording nonuniformity by the same effect as that described above with reference to FIG. 31. Also, the movable guide plates 567 decrease the contact area between a film which is being recorded and another film in the receive magazine, and hence, reduce the frictional load, so that recording nonuniformity does not easily occur. Immediately before the trailing end of the film is released from the rollers 507 and 508, the radiation of the laser beam is finished. Thereafter, the roller 557 moves to the solid line position and is rotated to successively feed the film into the receive magazine. When the trailing end of the film has reached a position where it is separated from the rollers 557 and 558, the roller 558 moves to the dotted line position to completely separate the trailing end of the film from the rollers. At the same time, the movable guide plates 567 move to the dotted line positions, and the film drops into the receive magazine by its dead weight.

As in the above embodiments, some of guide plates may be omitted, and inner guide plates may be replaced by free-rotation rollers. The guide plate 564 may be terminated before the roller 557. In this case, the roller 557 may extend across the widthwise direction of the film.

Figure 44:
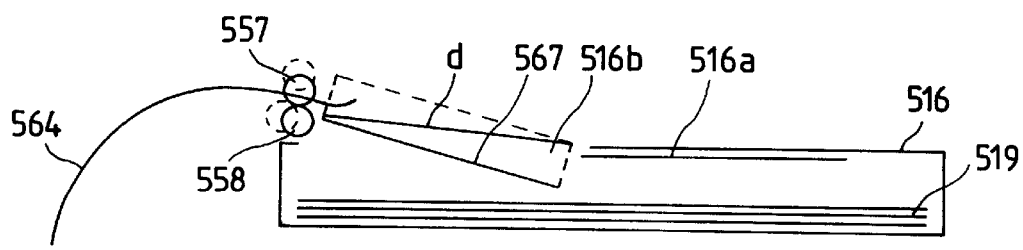
FIG. 44 is a partial detailed view for explaining a modification of the eighth embodiment.

FIG. 44 is an explanatory view showing a modification of the arrangement near the receive magazine in the embodiment shown in FIG. 42. In this modification, the movable guide plates 567 extend to a position inside the magazine, and are movable to a position d by a mechanism (not shown). When the magazine is attached/detached, and when the shutter is opened/closed, the movable guide plates 567 are located at the position d; when the film enters the magazine, the plates 567 move to the solid line position; and when the film is caused to drop into the receive magazine, the plates 567 move to the dotted line position. With this arrangement, although the mechanism is slightly complicated, the effect of decreasing the contact angle between the films and the effect of decreasing the contact area between the films can be enhanced.

FIG. 45 is an explanatory view showing still another modification of the arrangement near the receive magazine of the embodiment shown in FIG. 42. The arrangement shown in FIG. 45 includes feed rollers 569 and 570, and guide plates 571 and 572. The guide plate 564 is terminated before the rollers 557 and 558, as shown in FIG. 45, and instead, the guide plate 572 extends beyond the rollers 557 and 558. The length, along the guide plate, between the rollers 507 and 508 (FIG. 42), and the rollers 569 and 570 is smaller than L described above and is larger than L−δ2−l1. When the length of the film is larger than L−β2−l1, the roller 570 is moved downward by a mechanism (not shown) during recording, and is retracted below the movable guide plates 567 at the position d. The guide plate 572 has notches at portions corresponding to the roller portion of the roller 557. A movable guide plate 573 connects the guide plates 564 and 572. A plurality of movable guide plates 573 are locally arranged in the depth direction of FIG. 45. The movable guide plates 573 are movable to a dotted line position in FIG. 45 by a driving mechanism (not shown). The guide plate 572 has notches at portions corresponding to the movable guide plates 573. The position d to which the movable guide plates 567 move is suitable for guiding the leading end of the film to a position between the rollers 569 and 570. Openings 574 and 576 are formed in the cover 552 of the apparatus main body 551 to allow the film to pass therethrough. Shutters 575 and 577 respectively close the openings 574 and 576 in a light-shielding state, and are movable to dotted line positions by a driving mechanism (not shown). When a film passes, the shutters are located at the dotted line positions.

An automatic developing machine or a film feeding unit connected to the automatic developing machine can be connected to the openings 574 and 576, so that a recorded film can be automatically developed. In FIG. 45, the automatic developing machine can be connected to both the right and left openings. However, normally, the automatic developing machine is connected to one of these openings. In this case, only a necessary pair of an opening and shutter need only be arranged accordingly. The operation of this modification will be described below. A user selects in advance using a control apparatus (not shown) whether a recorded film is fed to the automatic developing machine or the receive magazine. Prior to recording, the movable guide plates 573 are located at the solid line positions, the roller 557 is located at the dotted line position, and the roller 558 is located at the solid line position. When a recorded film is to be fed to the receive magazine, the movable guide plates 567 are located at the solid line positions, and the film is fed into the receive magazine in the same manner as in FIG. 42. When a recorded film is to be fed to the automatic developing machine, if the automatic developing machine is connected to the right opening in FIG. 45, the movable guide plates 567 move to the position d prior to recording. The shutter 575 is located at the dotted line position. Thus a recorded film is fed to the automatic developing machine by the rollers 557, 558, 569, and 570 via the opening 574.

When the automatic developing machine is connected to the left opening in FIG. 45, the movable guide plates 567 are located at the position d, and the film temporarily stops when it has passed the movable guide plates 573. Then, the movable guide plates 573 move to the dotted line positions, and the rollers are rotated in the reverse direction to move the film to the left in FIG. 45. The shutter 577 is located at the dotted line position in advance, and the film is fed to the automatic developing machine via the opening 576.

Alternatively, the movable guide plates 567 may be located at the solid line positions to temporarily store the film in the receive magazine 516. When the trailing end of the film has passed the movable guide plates 573, the film temporarily stops. Then, the rollers are rotated in the reverse direction to feed the film to the left in FIG. 45. In this case, the rollers 569 and 570 and the guide plate 571 may be omitted.

In FIG. 42, the positions of the magazines and the feed path may be reversed vertically.

In addition, the automatic developing machine or a feeding unit connected to the automatic developing machine may be connected to the front or rear side in FIG. 45 by the same mechanism as that shown in FIGS. 39 to 41, and a film may be fed thereto.

FIG. 46 is a schematic explanatory view of the ninth embodiment of the present invention. In each of embodiments to be described hereinafter, since the arrangement is substantially the same as that of the seventh embodiment shown in FIG. 26A, except for some components, only a characteristic feature portion will be simply illustrated. Referring to FIG. 46, an image recording apparatus main body 581 includes a linear feed path 583 having a length more than that of one film, a first semi-circular feed path 582 connecting the supply magazine 502 and the linear feed path 583, and a second semi-circular feed path 584 connecting the linear feed path and the receive magazine. The members 582, 583, and 584 are constituted by the same mechanisms as the corresponding members in the seventh embodiment although a detailed description thereof will be omitted. As compared to the seventh embodiment, in this embodiment, a film is fed into the receive magazine 516 in the initial feed direction without being reversed along the linear feed path 583. For this reason, the reverse mechanism can be omitted. In the seventh embodiment, in order to avoid collision of films, recording of the next film is started after the current film almost exits from the linear feed path. However, in this embodiment, as soon as recording of the current film ends, recording of the next film can be started, thus improving the throughput. In addition, this embodiment does not require any switching guide plate unlike in the second embodiment, and the mechanism can be simplified accordingly.

In this embodiment, the positions of the supply and receive magazines 502 and 516 may be replaced without modifying the feed paths. In this case, the feed direction of the film is reversed.

The linear feed path 583 is arranged in the lower portion of the apparatus main body. However, the positions of the magazines and the feed paths may be reversed vertically. In addition, the same mechanism as described above with reference to FIGS. 39 to 41 may be arranged near the linear feed path 583, a mechanism for switching the feed direction of a film from the linear feed path 583 to the front, rear, right, and left sides of the apparatus may be arranged, and automatic developing machines may be connected to these directions.

Figure 47:
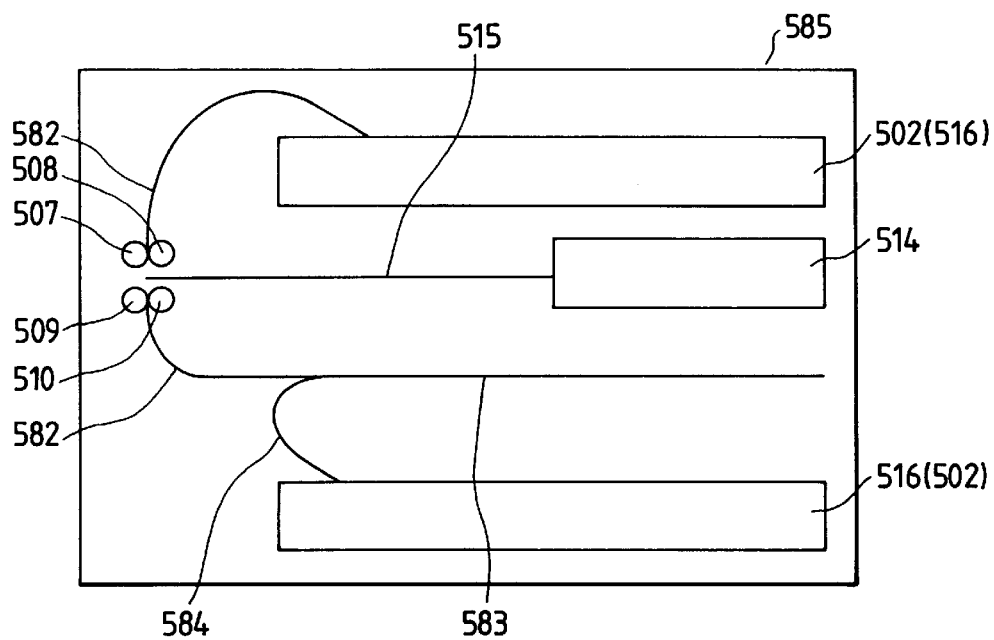
FIG. 47 is an explanatory view of the 10th embodiment of the present invention.

FIG. 47 is an explanatory view of the 10th embodiment of the present invention. Referring to FIG. 47, an image recording apparatus main body 585 is arranged. In the seventh embodiment, the first semi-circular feed path has a possible large radius of curvature, thereby reducing the frictional load between a film and the guide plate and preventing recording nonuniformity during recording. Even when the radius of curvature is slightly small, if its influence on recording is negligible, the receive magazine 516 may be arranged below (outside) the semi-circular feed path 582, as shown in FIG. 47. In this case, the semi-circular feed path 584 feeds the film downward in FIG. 47.

In this embodiment as well, the positions of the supply and receive magazines 502 and 516 may be replaced. In this case, the feed direction of the film is reversed, so that a film picked up from the supply magazine temporarily enters the linear feed path, and thereafter, the film is fed in the reverse direction to be subjected to recording.

The linear feed path 583 is arranged below the optical unit. Alternatively, the positions of the magazines and the feed paths may be reversed vertically. In addition, as in the above embodiments, feed paths from the linear feed path 583 to automatic developing machines may be arranged in respective directions so as to feed a film to each automatic developing machine.

Figure 48:
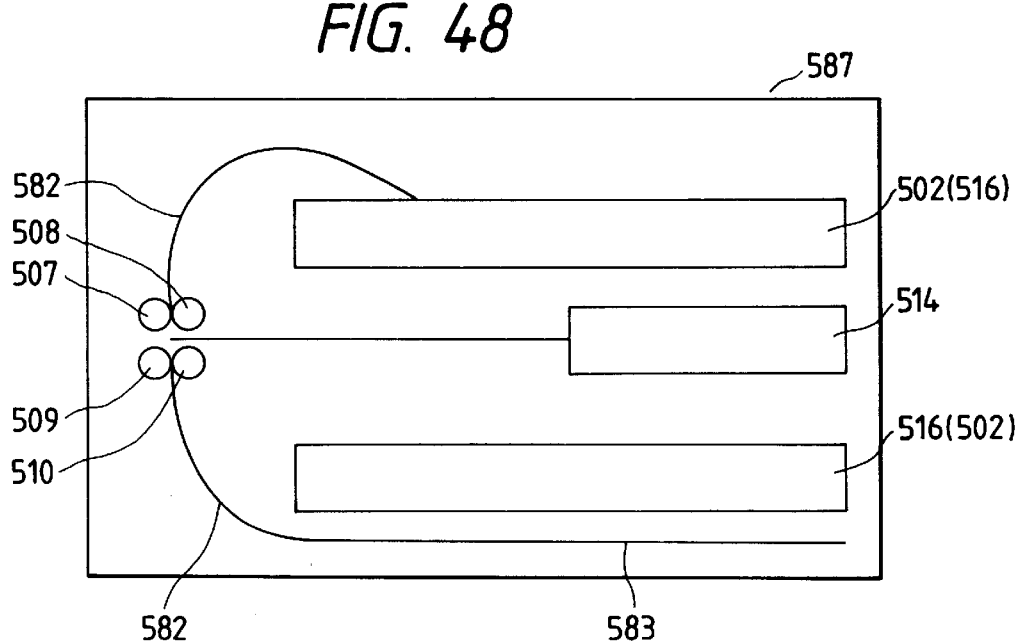
FIG. 48 is an explanatory view of the 11th embodiment of the present invention.
Figure 49:
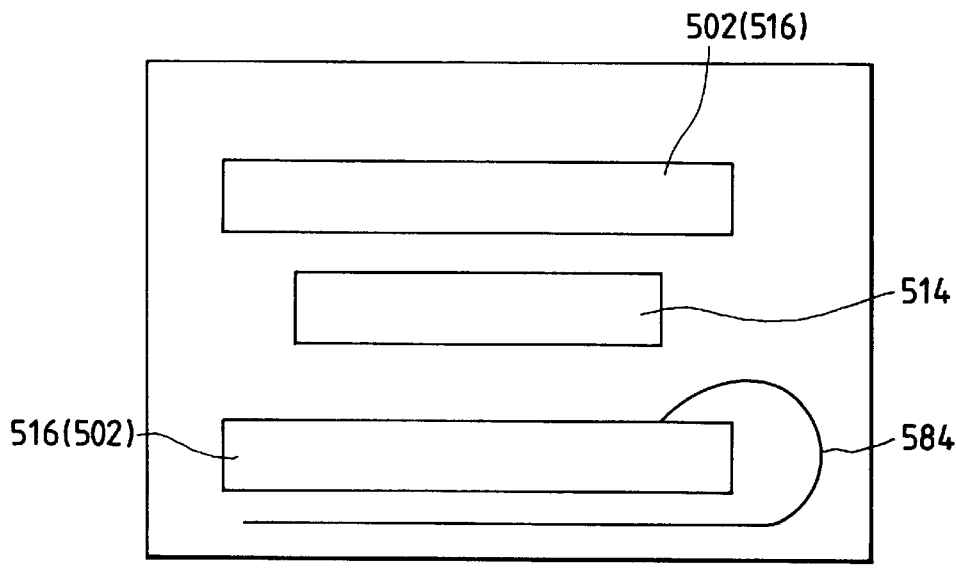
FIG. 49 is an explanatory view of the 11th embodiment.

FIGS. 48 and 49 are explanatory views of the 11th embodiment of the present invention. FIG. 48 is a front sectional view, and FIG. 49 is a side sectional view. Referring to FIGS. 48 and 49, in an image recording apparatus main body 587, the second semi-circular feed path 584 is arranged in a direction perpendicular to the first semi-circular feed path 582. Upon completion of recording, a film which is temporarily fed into the linear feed path 583 moves in the rear-side direction in FIG. 48, and makes a U turn on the second semi-circular feed path 584. Thereafter, the film is fed into the receive magazine 516.

The film feed direction can be switched by the same mechanism as in FIGS. 39 to 41. In this embodiment, the positions of the supply and receive magazines may be replaced. In this case, a film picked up from the supply magazine is temporarily fed into -the linear feed path, and after its feed direction is changed at a right angle, the film is subjected to recording.

The linear feed path 583 is arranged below the optical unit. Alternatively, the positions of the magazines and the feed paths may be reversed vertically. In addition, as in the above embodiments, feed paths from the linear feed path 583 to automatic developing machines may be arranged in respective directions so as to feed a film to each automatic developing machine.

Figure 50:
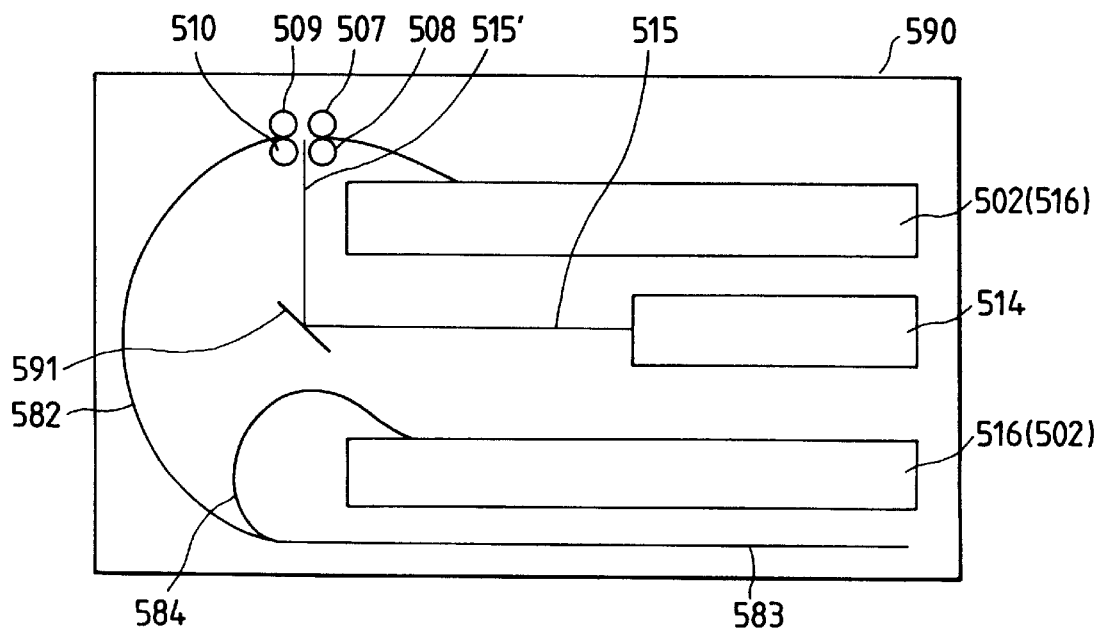
FIG. 50 is an explanatory view of the 12th embodiment of the present invention.

FIG. 50 is an explanatory view of the 12th embodiment of the present invention. Referring to FIG. 50, an image recording apparatus main body 590 includes a mirror 591. In this embodiment, a sub-scanning unit is arranged near the supply magazine, and a film is directly clamped between the rollers 507 and 508 from the suction disks. A light beam is deflected at a substantially right angle by the mirror 591, and is radiated as a beam 515' onto the film.

In this embodiment, the number of pairs of rollers can be decreased by one as compared to the seventh embodiment. In this case as well, the effect of eliminating image quality nonuniformity by the film trailing end position regulating means described above with reference to FIG. 33B, FIG. 34, and FIGS. 35A to 35C can be expected.

Figure 51:
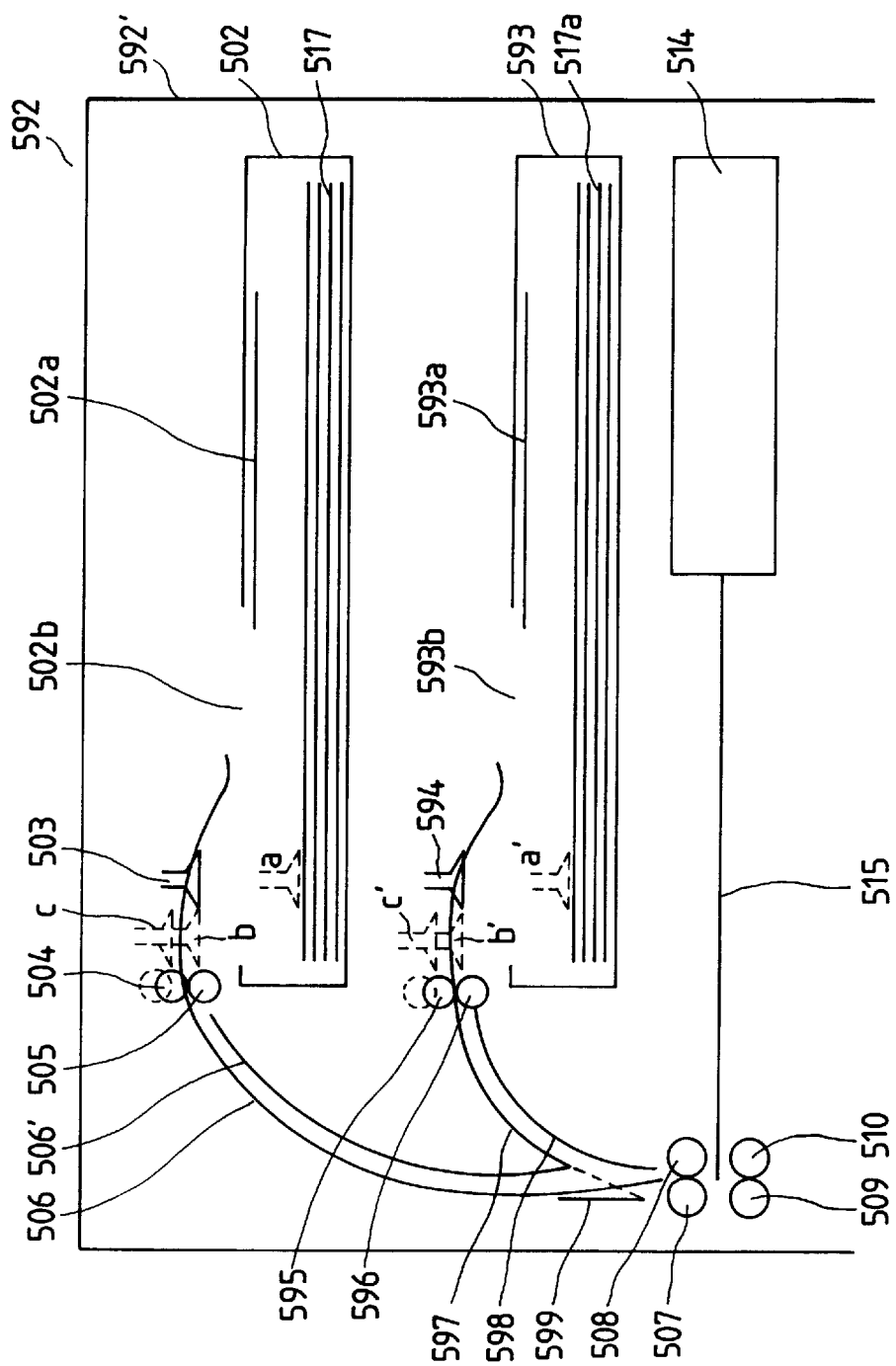
FIG. 51 is a front sectional view of an upper portion of the 13th embodiment of the present invention.
Figure 52:
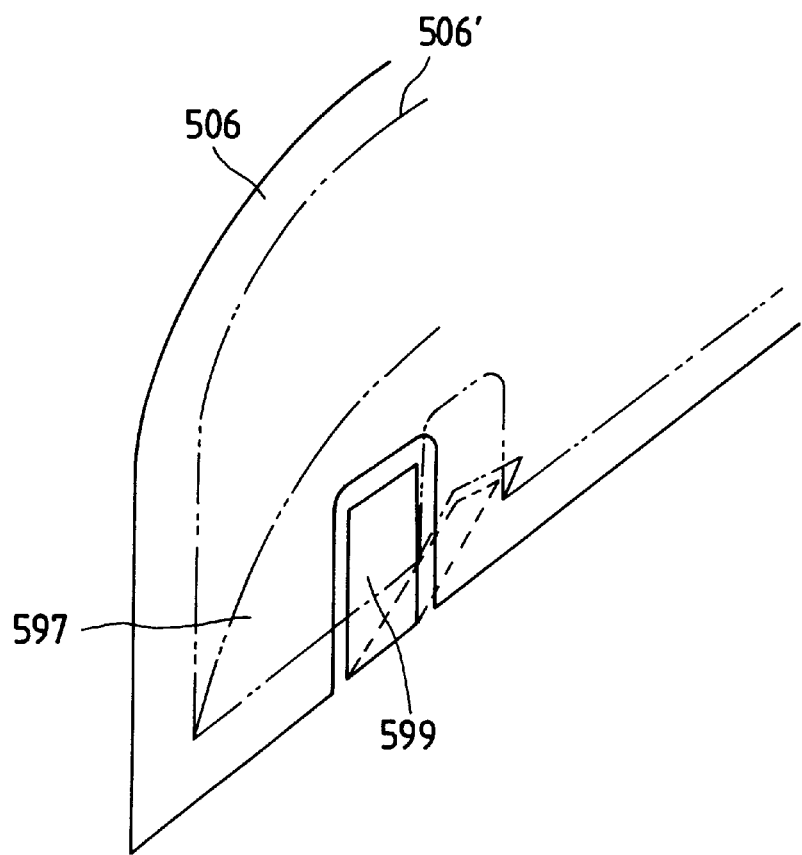
FIG. 52 is a partial detailed view of the 13th embodiment.

FIGS. 51 and 52 are explanatory views of the arrangement of the 13th embodiment as a modification of the upper portion in the seventh embodiment. FIG. 51 is a front sectional view, and FIG. 52 is a partial perspective view. Referring to FIGS. 51 and 52, an image recording apparatus main body 592 includes a cover 592' for covering the interior of the main body 592 in a light-shielding state, and a second supply magazine 593 including unused films 517a of the second type. The unused film 517a may be the same film as the film 517, a film having the same characteristics as those of the film 517 but having a different size, or a film having the same size but having different characteristics. In addition, the film 517a may be a film which is used for another purpose. Members 593a, 593b, 594, 595, 596, 597, and 598 are members having the same arrangements and functions as those of the members 502a, 502b, 503, 504, 506, and 506'. Also, positions a', b', and c' of suction disks 594 are those in the same path as the positions a, b, and c of the suction disks 503. A plurality of movable guide plates 599 are divisionally arranged in the depth direction of FIG. 51, and are movable to dotted line positions by a driving mechanism (not shown). The guide plates 506, 506', and 597 have notches at portions corresponding to the movable range portions of the movable guide plate 599, as shown in FIG. 52, so as not to disturb the movement of the movable guide plates. When the movable guide plates 599 are located at the solid line positions, they are retracted outside the feed path, and when the plates 599 are located at the dotted line positions, they are smoothly connected to the guide plate 597. With this arrangement, the trailing ends of both the films 517 and 517a can be prevented from leaping and receiving an abrupt vibration, and hence, recording nonuniformity can be avoided. Upon operation of the apparatus with the above-mentioned arrangement, a user selects and instructs using a control apparatus (not shown) whether a film is supplied from either the supply magazine 502 or 593. When a film is to be fed from the supply magazine 502, the movable guide plates 599 are set at the solid line positions; when a film is to be fed from the magazine 593, the movable guide plates 599 are set at the dotted line positions. Thereafter, the suction disks and rollers on the side of the selected supply magazine are driven, thereby feeding a film, as described above.

In FIG. 51, since the lower arrangement of the apparatus is the same as that in FIG. 26A, a detailed description thereof will be omitted.

Similarly, three or more supply magazines may be parallelly arranged. The operation of the apparatus in this case is substantially the same as that in the embodiment shown in FIG. 26A, except that a film to be used is selected in advance prior to recording.

In FIG. 26A and the like, the direction upon attachment/detachment of each magazine can be either the front or right side of the plane of the drawing. However, when the magazines are attached/detached from the right side in FIG. 46, the film feed path 584 disturbs this operation. For this reason, upon attachment/detachment of the magazines, members constituting this path must be retracted from the attachment/detachment path. When each magazine is attached/detached from the front side, since all film feed paths face the front side, film jam can be easily restored, and guide plates can be easily accessed in maintenance.

In FIG. 26A and the like, the main scanning direction corresponds to the widthwise direction of a film. Of course, the main scanning direction may be the longitudinal direction of a film. In this case, however, since the optical path length is prolonged for the reason described above with reference to FIG. 26B, the size of the apparatus slightly increases as compared to those in the above embodiments, or an extra reflection mirror is required. However, this does not lead to loss of the merits of the present invention. Rather, in this case, since the front side in FIG. 26A and the like corresponds to the widthwise direction of a film, the width of the apparatus can be decreased, and such an arrangement is advantageous in arrangement space factor.

In FIG. 26A and the like, when the sub-scanning direction is set to be the widthwise direction of a film, as shown in the drawings, if each magazine is attached/detached from the right side in the plane of the drawing, and the right side in the plane of the drawing is defined as the front side of the apparatus, the width of the apparatus can be decreased more than that in the above-mentioned case. In addition, the optical path length is not prolonged as compared to the above-mentioned case. However, in this case, since the sub-scanning unit is located at the rear side of the apparatus and the film feed paths are located at the rear side, ease in film removal upon film jam, and accessibility to the guide plates and the sub-scanning unit in maintenance are slightly impaired.

As the direction of the apparatus and the attachment/detachment direction of each magazine, directions suitable for environmental situations such as an automatic developing machine to be connected, or directions that can flexibly cope with a change in environmental situation should be selected. In any case, the present invention can provide a compact apparatus having a high degree of freedom associated with such selections, and high space factor.

In the embodiment shown in FIG. 26A and the like, rollers are used as film feed means and direction switching means. However, such means are not limited to rollers, except for the rollers (507, 508, 509, and 510) in the sub-scanning unit. For example, these means may be achieved by any of a method of pressing the trailing end of a film by a lever, a method of moving a film while chucking it by suction disks, a method of moving a film with one end of the film being held by a holding means such as a clipper, a method of feeding a film using a belt, and the like. In any of these methods, a known arrangement which can prevent the vibration of a film and an abrupt variation in load during recording is preferably adopted. For example, the lever, suction disks, clipper, or belt is retracted from the film feed path or is smoothly connected to the film feed path without any steps.

Figure 53:
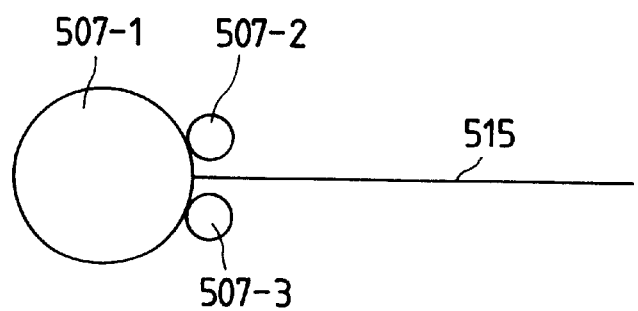
FIG. 53 is a detailed view for explaining a modification of the 13th embodiment.

In the embodiment shown in FIG. 26A and the like, two pairs of rollers (507, 508, 509, and 510) are used as rollers in the sub-scanning unit. However, only one pair of rollers may be used depending on required accuracy of image recording, or in place of these rollers, as shown in FIG. 53, small-diameter rollers 507-2 and 507-3 may be arranged on a roller 507-1 having a relatively large diameter, and a scanning beam 515 may be radiated from a position between these rollers.

Figure 54:
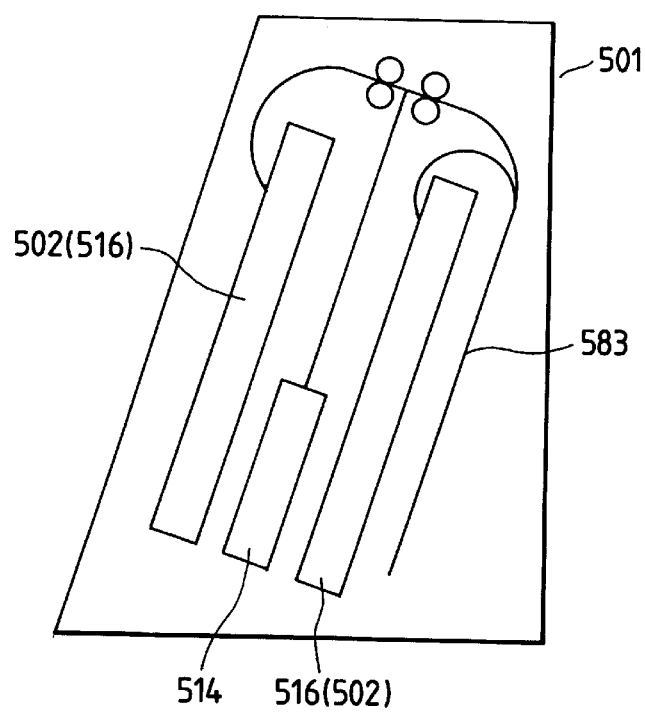
FIG. 54 is an explanatory view of the 14th embodiment of the present invention.
Figure 56:
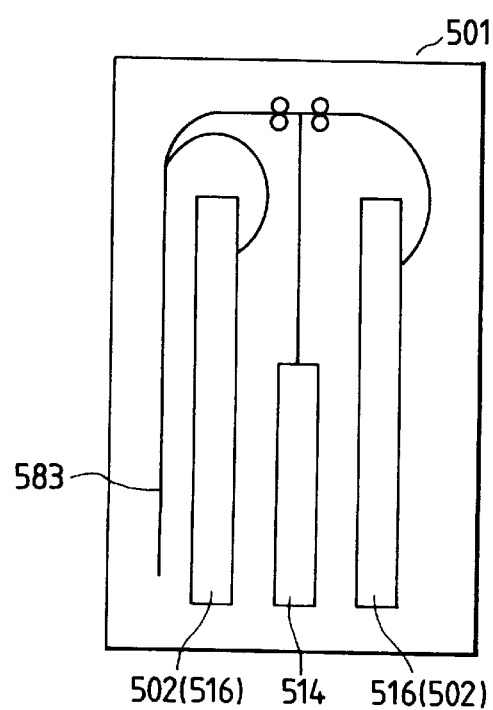
FIG. 56 is an explanatory view of the 16th embodiment of the present invention.
Figure 55A:
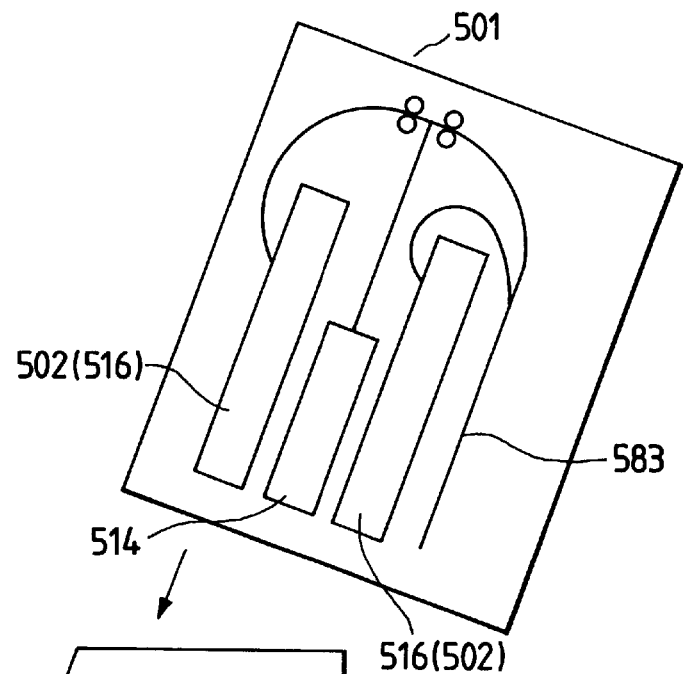
FIGS. 55A and 55B are explanatory views of the 15th embodiment of the present invention.
Figure 55B:
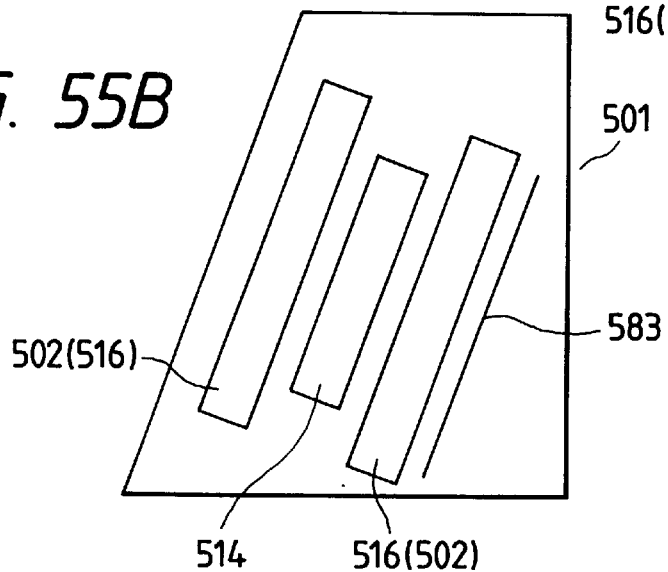
Figure 57A:
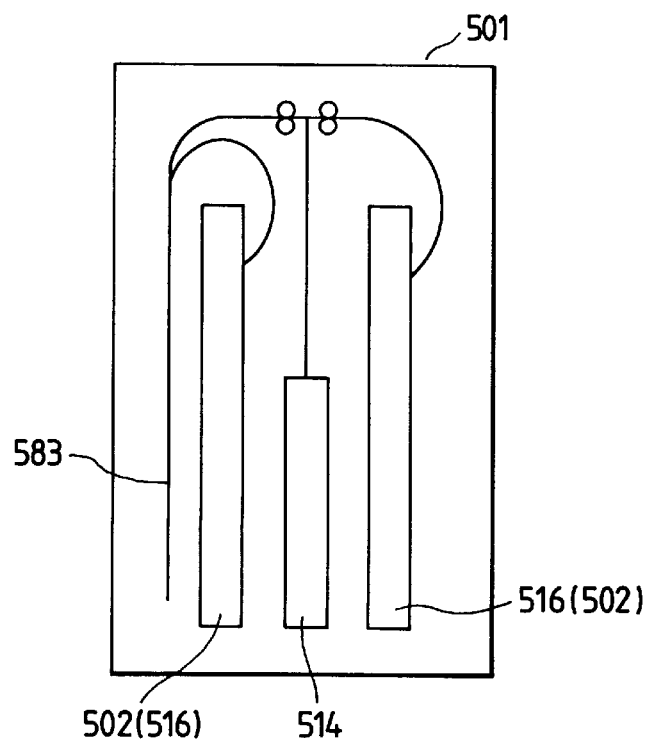
FIGS. 57A and 57B are explanatory views of the 17th embodiment of the present invention.
Figure 57B:
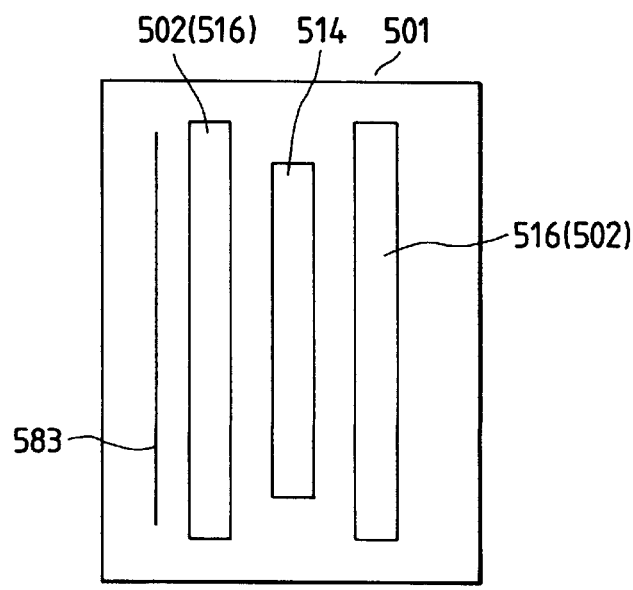

In the embodiment shown in FIG. 26A and the like, all the magazines, scanning plane, and linear feed path are horizontally arranged. However, as shown in FIGS. 54 to 57B, these members may be obliquely or vertically arranged. FIG. 54 is a front sectional view of an embodiment wherein an oblique arrangement is adopted, and a semi-circular feed path is arranged in the upper portion of the apparatus. FIGS. 55A and 55B are explanatory views of an embodiment wherein an oblique arrangement is adopted, and a semi-circular feed path is arranged on the side of the side surface of the apparatus. FIG. 55A is a front sectional view and FIG. 55B is a sectional view taken along the direction of an arrow in FIG. 55A. FIG. 56 is a front sectional view of an embodiment wherein a vertical arrangement is adopted, and a semi-circular feed path is arranged on the upper side of the apparatus. FIGS. 57A and 57B are explanatory views of an embodiment wherein a vertical arrangement is adopted, and a semi-circular feed path is arranged on the side of the side surface of the apparatus. FIG. 57A is a front sectional view and FIG. 57B is a top sectional view. These drawings schematically illustrate the arrangements since the details of the members are the same as those in the seventh embodiment.

In each of these embodiments, the magazines, the optical unit including the scanning plane, and the linear feed path are arranged to substantially overlap each other when they are projected in a direction normal to the film surface in the magazine, thus making the apparatus compact.

In the embodiment shown in FIG. 26A and the like, films are placed in the supply magazine in, e.g., a dark room, and the supply magazine is loaded into the apparatus in a light-shielding state. Alternatively, a drawer which can store films may be arranged at the position of the supply magazine. When films are loaded, the drawer is opened and films are set in the drawer. Thereafter, the drawer is closed into the apparatus, and the same operation as in FIG. 26A and the like may be performed at this position. In this case, films are set in the drawer in a state wherein the films are packed in a light-shielding bag, and after the drawer is closed and the apparatus is set in a light-shielding state, the bag is removed to unwrap the films. A known arrangement for unwrapping films in a light-shielding state can be used.

In FIG. 26B, the optical system using the rotary polygonal mirror has been exemplified. In addition to this arrangement, for example, a light beam may be scanned using a single-plane mirror (so-called a galvano mirror) which swings and oscillates about a rotation shaft parallel to the mirror surface. That is, such an arrangement is effective for a method that requires a scanning plane as wide as a film upon scanning of a light beam.

The above-mentioned embodiments and modifications may be combined. The present invention is not limited to a case wherein a medical image is to be recorded on a silver chloride film, and is effective for a case wherein a film or sheet has a certain stiffness, and recording free from non-uniformity is required.

Figure 58:
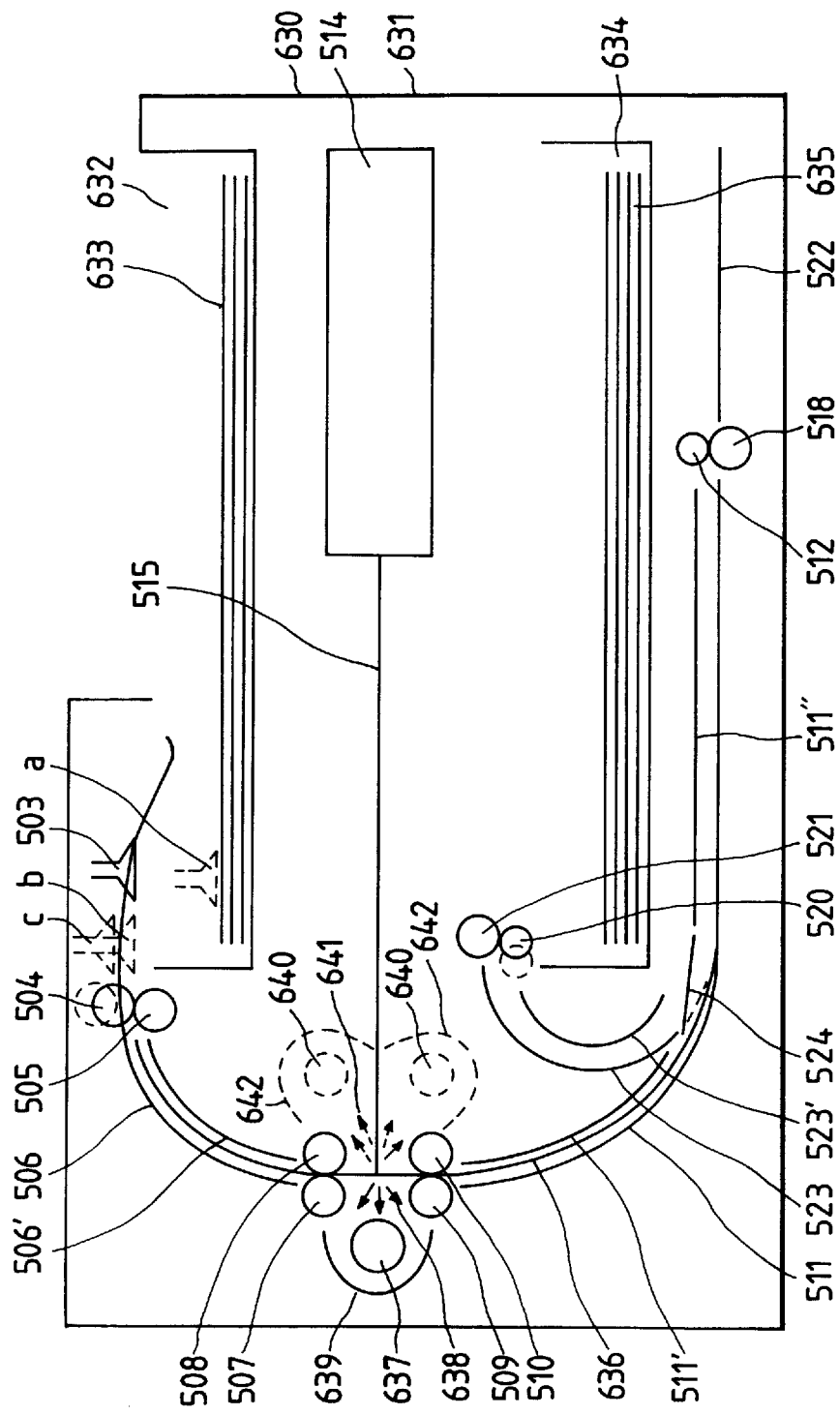
FIG. 58 is a front sectional view of a reading apparatus according to the 18th embodiment of the present invention.

FIG. 58 is a sectional view showing the arrangement of an embodiment wherein the present invention is applied to an image reading apparatus. Referring to FIG. 58, an image reading apparatus main body 630 reads an image from an X-ray film on which an image is formed by, e.g., an analog X-ray photography method, and forms a digital image signal. A cover 631 covers the main body 630. Films 633 from which images are to be read are stacked on a supply tray 632. Read films 635 are stored in a receive tray 634. The supply tray 632 has an upper or front opening, and can receive films to be read via the upper or front opening. The receive tray has a front opening, and read films can be picked up from the front opening. An optical unit 514 is the same as that shown in FIG. 26A. In this case, since a light beam need not be intensity-modulated, light having a uniform intensity is scanned, and is radiated onto a film 636 which is fed by sub-scanning rollers. A means 637 receives light 638 which is transmitted through and scattered by a film, and converts the received light into an electrical signal corresponding to its intensity. In this embodiment, the means 637 comprises a photomultiplier. A reflection mirror 639 has a function of efficiently directing the scattered light 638 toward the photomultiplier 637. Means 640 receive light 641 which is reflected and scattered by a film, and convert the received light into electrical signals corresponding to its intensity. In this embodiment, the means 640 comprise photomultipliers. A reflection mirror 642 has a function of efficiently directing the scattered light 641 toward the photomultipliers 640. Since the scattered light components 638 and 641 change in correspondence with the density of a very small portion, irradiated with a beam 515, on a film, a time-serial digital image signal can be obtained by two-dimensionally scanning the beam 515 on the film, as in FIG. 26A. One of the photomultipliers 637 and 640 may be arranged, or both the photomultipliers may be arranged like in this embodiment. When the two photomultipliers are arranged, since two electrical signals are obtained, image signals of transmitted and reflected light components may be respectively generated based on these electrical signals, or a single image signal may be generated based on a combination of the two electrical signals. Although FIG. 58 illustrates two photomultipliers 640, either one of them may be used.

Unlike in the above embodiments, in this embodiment, a beam is scanned on a film at a position between a pair of rollers 507 and 508, and a pair of rollers 509 and 510, thereby reading an image. Since other arrangements and operations of this embodiment are the same as those in FIG. 26A, a detailed description thereof will be omitted.

Figure 59:
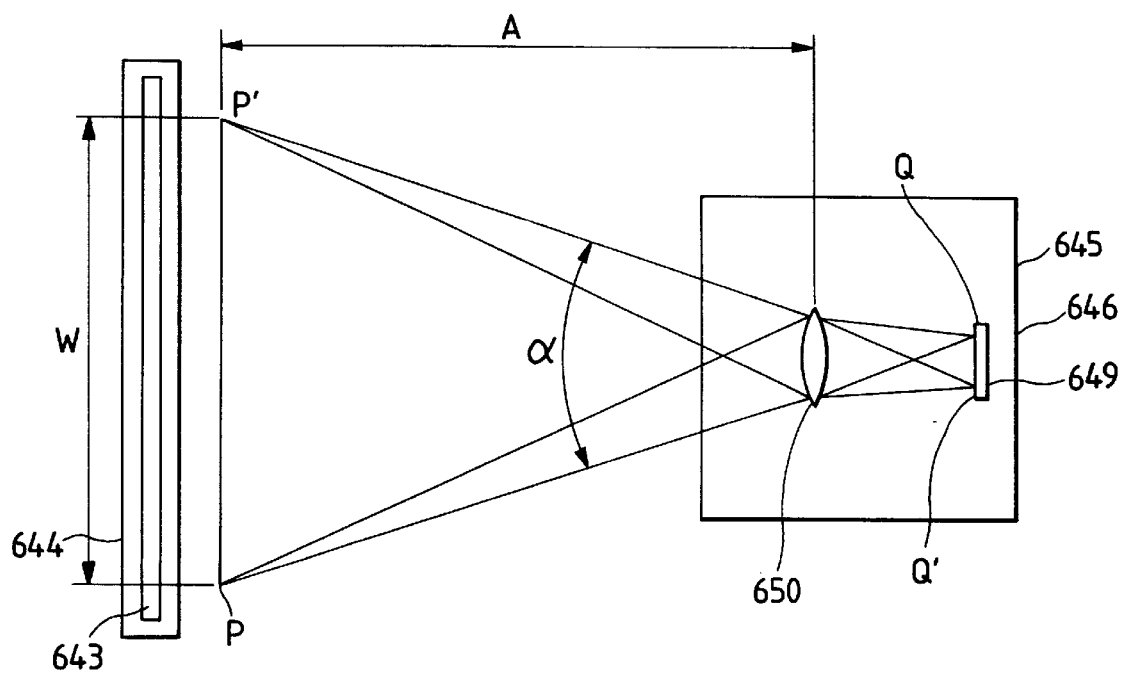
FIG. 59 is a partially detailed top view of a modification of the 18th embodiment.
Figure 60:
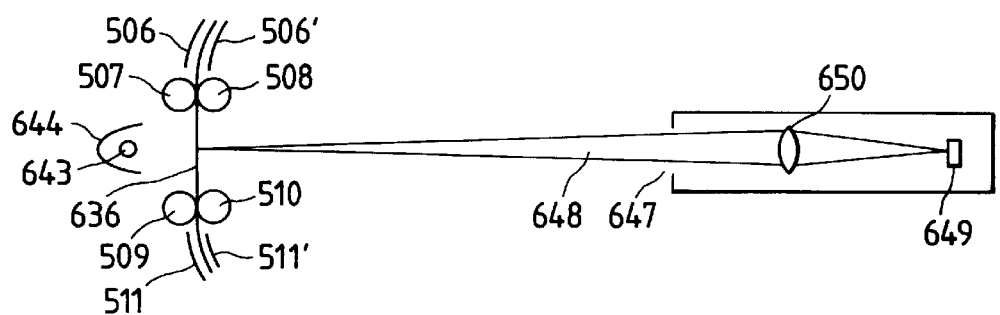
FIG. 60 is a front view of the modification shown in FIG. 59.

FIGS. 59 and 60 are respectively a top view and a side view of a modification of the arrangement of an optical system portion including the optical unit and the photomultipliers in the embodiment shown in FIG. 58. Referring to FIGS. 59 and 60, an illumination means 643 such as a halogen lamp, a fluorescent lamp, or the like is arranged near the position of the photomultiplier 637 in the embodiment shown in FIG. 58, and linearly illuminates the film 636 at uniform illuminance. A reflection mirror 644 has a function of efficiently directing light from the illumination means 643 onto the film. An optical unit 645 is arranged at the position of the optical unit 514 in FIG. 58, and is covered by a cover 646 in a substantially light-shielding state. An opening 647 allows a light beam 648 from the film to pass therethrough. A linear CCD 649 comprises, e.g., 2,000 to 5,000 elements which are densely arranged at equal intervals. An optical system 650 images points P to P' on the film onto the elements Q to Q' on the CCD. FIGS. 59 and 60 illustrate only one lens as the optical system 650. However, in practice, the optical system 650 comprises a plurality of lenses. With the above-mentioned arrangement, electrical signals corresponding to the densities of very small spots at the points P to P' at a certain instance are obtained at a pitch obtained by dividing one line into 2,000 to 5,000 intervals. Therefore, when the film 636 is fed at a constant speed, and electrical signals are obtained from the CCD at predetermined time intervals, a digital image signal corresponding to a two-dimensional image can be obtained. In this embodiment, optical scanning is realized by scanning on the circuit of the CCD.

As in the description of FIG. 26B, in the optical system shown in FIGS. 58 to 60, if the scanning angle a is too large, uniformity of imaging characteristics is impaired. Therefore, the angle a is preferably set to be about 30° to 40° or less. If the angle α is 40°, and W is set to be 35 cm, A is about 48 cm. The optical path may be deflected by reflection mirrors. However, the number of mirrors is preferably reduced in consideration of the influence of cost of the mirrors, oscillation of the mirrors, reflection nonuniformity of mirrors, and the like.

For this reason, when the arrangement shown in FIG. 58 is adopted, the arrangement of the optical system with a small number of mirrors can be realized by efficiently utilizing an available space without increasing the apparatus size.

In the above embodiments, the recording and reading apparatuses have been independently described. The recording apparatus may be replaced by a reading apparatus by attaching members required for reading such as the photomultiplier 637, the mirror 639, and the like, and inhibiting modulation of light from a light source. Also, the reading apparatus may be replaced by a recording apparatus by removing these members, and modulating light from a light source.

As described above, according to the above embodiments, a recording or reading apparatus which can be rendered compact while preventing a film to be fed from being overloaded as much as possible can be realized.

What is claimed is:

1. An apparatus for performing recording processing or reading processing on a sheet, comprising:
   a supply magazine for storing non-processed sheets;
   a receive magazine for storing processed sheets, the supply magazine being arranged to be parallel to the receive magazine;
   an optical scanner having a scanning mirror, disposed between said supply magazine and said receive magazine, for scanning a light beam directly on the sheet while the sheet is moving, wherein a scanning plane of the light beam defined by the optical scanner is substantially parallel with said supply magazine and with said receive magazine and extends between them; and
   a sheet feeder for feeding one of the sheets from said supply magazine to said receive magazine along a feed path at which the light beam is directly scanned on the sheet, said sheet feeder including a pair of rollers for pinching and moving the sheet,
   wherein said supply magazine, said receive magazine, said sheet feeder and said optical scanner are arranged such that a trailing end of the sheet is within said supply magazine when said optical scanner begins the recording or reading, or arranged such that a leading end of the sheet is within said receive magazine when said optical scanner completes the recording or reading.

2. An apparatus according to claim 1, wherein said sheet comprises an emulsion layer on one side.

3. An apparatus according to claim 1, wherein said non-processed sheet storage portion and said processed sheet storage portion substantially horizontally store sheets.

4. An apparatus according to claim 3, wherein said optical unit comprises a rotary polygonal mirror for scanning a light beam within a substantially horizontal plane.

5. An apparatus according to claim 1, wherein said sheet feed mechanism comprises a feed path which is substantially U-shaped.

6. An apparatus according to claim 1, wherein said sheet feed mechanism feeds a sheet, so that surfaces of the sheet are reversed between said non-processed sheet storage portion and said processed sheet storage portion.

7. An apparatus according to claim 1, wherein said optical unit optically scans a sheet at a position immediately after the sheet is picked up from said non-processed sheet storage portion or at a portion immediately before the sheet is fed into said processed sheet storage portion.

8. An apparatus according to claim 1, further comprising:
   means for damping a shock generated when a sheet fed by said sheet feed mechanism contacts a sheet stored in said processed sheet storage portion.

9. An apparatus according to claim 1, further comprising:
   means for preventing a trailing end of a sheet from leaping when the sheet is picked up by said sheet feed mechanism from said non-processed sheet storage portion.

10. An apparatus according to claim 1, wherein said non-processed sheet storage portion comprises a plurality of sheet storage magazines.

11. An apparatus according to claim 1, further comprising:
   a path for feeding a processed sheet into a developing machine.

12. An apparatus according to claim 1, further comprising:
   a space portion which is parallel to said non-processed sheet storage portion or said processed sheet storage portion and is at least as wide as the sheet, and
   wherein said sheet feed mechanism feeds a sheet through said space portion from said non-processed sheet storage portion to said processed sheet storage portion.

13. An apparatus according to claim 12, wherein said sheet feed mechanism feeds the sheet processed by said sheet processing unit to said space portion.

14. An apparatus according to claim 12, wherein said sheet feed mechanism feeds out a sheet from said space portion in a direction perpendicular to a direction in which the sheet is fed into said space portion.

15. An apparatus according to claim 12, wherein said sheet feed mechanism feeds out a sheet from said space portion in a direction in which the sheet is fed into said space portion.

16. An apparatus according to claim 12, wherein said space portion is arranged between said non-processed sheet storage portion and said processed sheet storage portion.

* * * * *

UNITED STATES PATENT AND TRADEMARK OFFICE
CERTIFICATE OF CORRECTION

PATENT NO. : 6,262,752 B1
DATED : July 17, 2001
INVENTOR(S) : Kenichi Suzuki et al.

It is certified that error appears in the above-identified patent and that said Letters Patent is hereby corrected as shown below:

Column 5,
Line 43, "pivotal" should read -- pivoted --.

Column 7,
Line 10, "has" should read -- have --.
Line 40, "emulation" should read -- emulsion --.

Column 9,
Line 59, "p," should read -- $\mu$, --.

Column 11,
Line 14, "mea n s" should read -- means --.

Column 15,
Line 59, "a" should read -- $\propto$ --.

Column 16,
Line 8, "Q1" should read -- 11 --.
Line 55, "61 and 82" should read -- $\delta1$ and $\delta2$ --.

Column 17,
Line 13, "do" should read -- does --.

Column 20,
Line 5, "O," should read -- $\theta$, --.
Line 14, "e" should read -- $\theta$ --.

Column 21,
Line 40, "e" should read -- $\epsilon$ --.

Column 22,
Line 43, "e" should read -- $\epsilon$ --.

Column 26,
Line 41, "L-$\beta$2-11" should read -- L-$\delta$2-11 --.

UNITED STATES PATENT AND TRADEMARK OFFICE
CERTIFICATE OF CORRECTION

PATENT NO.    : 6,262,752 B1
DATED         : July 17, 2001
INVENTOR(S)   : Kenichi Suzuki et al.

It is certified that error appears in the above-identified patent and that said Letters Patent is hereby corrected as shown below:

Column 28,
Line 62, "-the" should read -- the --.

Column 31,
Line 53, "(so-called a" should read -- (a so-called --.

Column 33,
Lines 11 and 13, "a" should read -- $\propto$ ---.

Signed and Sealed this

Twenty-sixth Day of February, 2002

Attest:

JAMES E. ROGAN
*Attesting Officer*    *Director of the United States Patent and Trademark Office*